(12) United States Patent
Shinjo

(10) Patent No.: US 10,010,929 B2
(45) Date of Patent: Jul. 3, 2018

(54) APPARATUS TO PRODUCE SELF-PIERCING AND CLINCH NUT AND METHOD OF PRODUCING SELF-PIERCING AND CLINCH NUT

(71) Applicant: Shinjo Holdings Co., Ltd., Osaka-shi (JP)

(72) Inventor: Tadashi Shinjo, Kishiwada (JP)

(73) Assignee: SHINJO HOLDINGS CO., LTD., Osaka-Shi (JP)

( * ) Notice: Subject to any disclaimer, the term of this patent is extended or adjusted under 35 U.S.C. 154(b) by 307 days.

(21) Appl. No.: 14/996,228

(22) Filed: Jan. 15, 2016

(65) Prior Publication Data

US 2016/0303643 A1    Oct. 20, 2016

(30) Foreign Application Priority Data

Apr. 14, 2015 (JP) .................................. 2015-082111
Apr. 14, 2015 (JP) .................................. 2015-082112

(51) Int. Cl.
*B21K 27/04* (2006.01)
*B21K 1/70* (2006.01)
(Continued)

(52) U.S. Cl.
CPC .............. *B21K 1/702* (2013.01); *B21J 9/022* (2013.01); *B21K 27/04* (2013.01); *B21D 53/24* (2013.01); *B23P 15/00* (2013.01)

(58) Field of Classification Search
CPC ... B21J 5/02; B21J 9/022; B21J 13/02; B21K 1/64; B21K 1/66; B21K 1/70;
(Continued)

(56) References Cited

U.S. PATENT DOCUMENTS 2,207,391 A * 7/1940 Wilcox .................... B21K 1/64
                                                          470/21
2,814,812 A * 12/1957 Stern ....................... B21K 1/64
                                                          470/2
(Continued)

FOREIGN PATENT DOCUMENTS

EP    1477250    11/2004
EP    2532455    12/2012
(Continued)

OTHER PUBLICATIONS

Extended European Search Report for corresponding EP Application No. 16150860.1-1702, dated Aug. 18, 2016.
(Continued)

*Primary Examiner* — Edward Tolan
(74) *Attorney, Agent, or Firm* — Mori & Ward, LLP

(57) ABSTRACT

An apparatus to produce a self-piercing and clinch nut includes a first forging die assembly, a second forging die assembly, a third forging die assembly, a transfer mechanism, and a controller. The first forging die assembly subjects a blank to first processing. The second forging die assembly is adjacent to the first forging die assembly, and subjects the blank, which has undergone the first processing in the first forging die assembly, to second processing. The third forging die assembly is adjacent to the second forging die assembly, and subjects the blank, which has undergone the second processing in the second forging die assembly, to third processing. The transfer mechanism transfers the blank between two adjacent forging die assemblies among the first to third forging die assemblies. The controller controls operations of the first to third forging die assemblies and the transfer mechanism.

12 Claims, 55 Drawing Sheets

(51) Int. Cl.
*B21J 9/02* (2006.01)
*B21D 53/24* (2006.01)
*B23P 15/00* (2006.01)

(58) Field of Classification Search
CPC ........ B21K 1/702; B21K 27/02; B21K 27/04; B23P 15/00; B21D 53/24
See application file for complete search history.

(56) References Cited

U.S. PATENT DOCUMENTS

| | | | | |
|---|---|---|---|---|
| 2,871,492 | A | * | 2/1959 | Sciullo .................... B21K 1/64 470/25 |
| 3,711,931 | A | | 1/1973 | Ladouceur et al. |
| 3,793,658 | A | * | 2/1974 | Ladouceur ............ B21K 1/702 411/179 |
| 4,690,599 | A | * | 9/1987 | Shinjo .................. F16B 37/068 411/180 |
| 7,013,550 | B2 | | 3/2006 | Shinjo |
| 8,899,089 | B1 | | 12/2014 | Shinjo |
| 2012/0316001 | A1 | | 12/2012 | Shinjo |

FOREIGN PATENT DOCUMENTS

| | | |
|---|---|---|
| JP | 52-048757 | 4/1977 |
| JP | 3933605 | 11/2004 |
| JP | 2010-201471 | 9/2010 |
| JP | 2012-250279 | 12/2012 |
| JP | 5686490 | 3/2015 |

OTHER PUBLICATIONS

Japanese Notice of Allowance for corresponding JP Application No. 2015-082112, dated Sep. 8, 2015.
Japanese Office Action for corresponding JP Application No. 2015-082111, dated Aug. 26, 2015.
Japanese Notice of Allowance for corresponding JP Application No. 2015-082111, dated Sep. 18, 2015.

* cited by examiner

FIG. 8
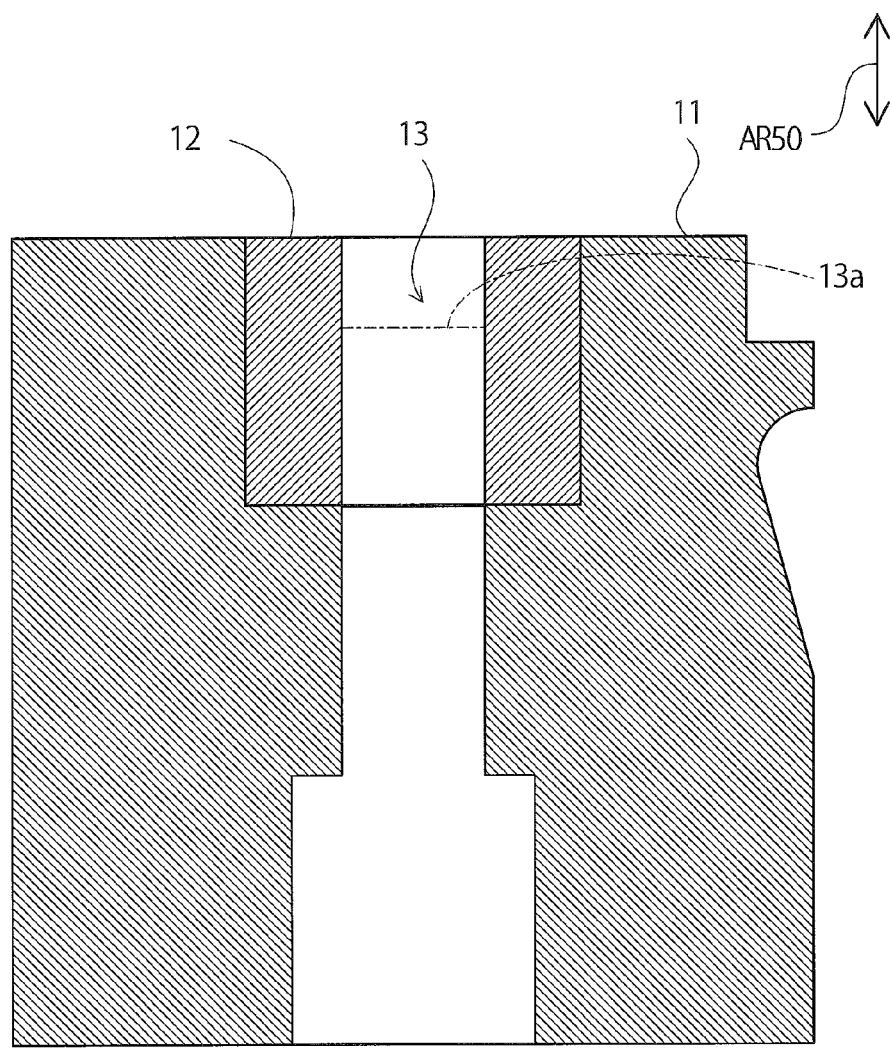
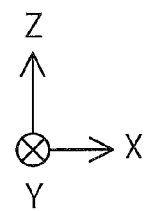

APPARATUS TO PRODUCE SELF-PIERCING AND CLINCH NUT AND METHOD OF PRODUCING SELF-PIERCING AND CLINCH NUT

CROSS-REFERENCE TO RELATED APPLICATIONS

The present application claims priority under 35 U.S.C. § 119 to Japanese Patent Application No. 2015-082111, filed on Apr. 14, 2015 and Japanese Patent Application No. 2015-082112, filed on Apr. 14, 2015. The contents of these applications are incorporated herein by reference in their entirety.

BACKGROUND OF THE INVENTION

Field of the Invention

The present invention relates to an apparatus to produce a self-piercing and clinch nut and a method of producing a self-piercing and clinch nut.

Discussion of the Background

Japanese Patent No. 3933605 discloses a technique for producing a rectangular self-piercing and clinch nut by a nut former for general use.

SUMMARY OF THE INVENTION

According to one aspect of the present invention, an apparatus to produce a self-piercing and clinch nut includes a first forging die assembly, a second forging die assembly, a third forging die assembly, a transfer mechanism, and a controller. The self-piercing and clinch nut includes a main body and a pilot portion. The main body includes a central portion and flanges on both sides of the central portion. The pilot portion protrudes from the central portion. The main body and the pilot portion have a through hole in a center of the main body and the pilot portion. The main body has a rectangular external shape in a direction perpendicular to a penetration direction of the through hole. The external shape of the main body has approximately the same area in each portion of the main body. The pilot portion has a rectangular external shape in the direction perpendicular to the penetration direction. The external shape of the pilot portion has an area that increases as a distance from the main body increases. The first forging die assembly is configured to subject a blank to first processing and includes a first die, a first pin, and a first punch. The first die includes a first insertion hole. The first insertion hole includes a first movement hole and a first fitting hole. The first punch is movable in the first movement hole. The first movement hole has a rectangular first region in a direction perpendicular to a movement direction of the first punch defined as a first movement direction. The first region has approximately the same area in each portion of the first movement hole. The first pin is fitted in the first fitting hole. The first fitting hole has a rectangular second region in the direction perpendicular to the first movement direction. The second cross-section has approximately the same area in each portion of the first fitting hole. The area of the first region is larger than the area of the second cross-section at a position where the first movement hole is connected to the first fitting hole. The first pin is fitted in the first insertion hole so as to define a first processing space for processing the blank. The first pin includes a first pin shank and a first platform on one end of the first pin shank. The first pin is fitted in the first fitting hole to make the first platform opposed to the blank. An inner surface of the first die that faces the first fitting hole and first inclined walls on both sides of the first platform define first processing grooves. The first punch is movable relative to the first processing space. The second forging die assembly is adjacent to the first forging die assembly and configured to subject the blank, which has undergone the first processing in the first forging die assembly, to second processing. The second forging die assembly includes a second die, a second pin, a first support, a first biasing portion, and a second punch. The second die includes a second insertion hole including a second movement hole and a second fitting hole. The second punch is movable in the second movement hole. The second movement hole has a rectangular third region in a direction perpendicular to a movement direction of the second punch defined as a second movement direction. The third cross-section has approximately the same area in each portion of the second movement hole. The second pin is fitted in the second fitting hole. The second fitting hole has a rectangular fourth region in the direction perpendicular to the second movement direction. The fourth cross-section has approximately the same area in each portion of the second fitting hole. The area of the third cross-section is larger than the area of the fourth cross-section at a position where the second movement hole is connected to the second fitting hole. The second pin is fitted in the second insertion hole so as to define a second processing space for processing the blank. The second pin includes a second pin shank, a second platform, and a first protrusion. The second platform is on one end of the second pin shank. The first protrusion protrudes from the second platform. The second pin is fitted in the second fitting hole to make the first protrusion and the second platform opposed to the blank. The first support supports the second pin. The first biasing portion has one end secured to the second die and the other end secured to the first support. The second punch is movable relative to the second processing space. The second punch includes a second punch shank and a second protrusion. The second protrusion protrudes from one end of the second punch shank. The second punch is movable in the second movement hole to make the second protrusion opposed to the blank. An inner surface of the second die that faces the second fitting hole and second inclined walls on both sides of the second platform define second processing grooves. The third forging die assembly is adjacent to the second forging die assembly and configured to subject the blank, which has undergone the second processing in the second forging die assembly, to third processing. The third forging die assembly includes a third die, a fourth punch, and a third punch. The third die has a third insertion hole including a third movement hole and a third fitting hole. The third punch is movable in the third movement hole. The third movement hole has a rectangular fifth region in a direction perpendicular to a movement direction of the third punch defined as a third movement direction. The fifth cross-section has approximately the same area in each portion of the third movement hole. The fourth punch is fitted in the third fitting hole. The third fitting hole has a rectangular sixth region in the direction perpendicular to the third movement direction. The sixth cross-section has approximately the same area in each portion of the third fitting hole. The area of the fifth cross-section is larger than the area of the sixth cross-section at a position where the third movement hole is connected to the third fitting hole. The fourth punch is fitted in the third insertion hole so as to define a third processing space for processing the blank. The third punch includes a hollow cylindrical portion and is movable relative to the third processing space.

The transfer mechanism is configured to transfer the blank between two adjacent forging die assemblies among the first to third forging die assemblies. The controller is configured to control operations of the first to third forging die assemblies and the transfer mechanism.

According to another aspect of the present invention, in a method of producing a self-piercing and clinch nut by a production apparatus, the self-piercing and clinch nut includes a main body and a pilot portion. The main body includes a central portion and flanges on both sides of the central portion. The pilot portion protrudes from the central portion. The main body and the pilot portion have a through hole in a center of the main body and the pilot portion. The main body has a rectangular external shape in a direction perpendicular to a penetration direction of the through hole. The external shape of the main body has approximately a same area in each portion of the main body. The pilot portion has a rectangular external shape in the direction perpendicular to the penetration direction. The external shape of the pilot portion has an area that increases as a distance from the main body increases. The production apparatus includes a first forging die assembly, a second forging die assembly, and a third forging die assembly. The first forging die assembly includes a first die, a first pin, and a first punch. The first die includes a first insertion hole. The first insertion hole includes a first movement hole and a first fitting hole. The first punch is movable in the first movement hole. The first movement hole includes a rectangular first region in a direction perpendicular to a movement direction of the first punch defined as a first movement direction. The first region includes approximately a same area in each portion of the first movement hole. The first pin is fitted the first fitting hole. The first fitting hole includes a rectangular second region in the direction perpendicular to the first movement direction. The second region includes approximately a same area in each portion of the first fitting hole. The area of the first region is larger than the area of the second region at a position where the first movement hole is connected to the first fitting hole. The first pin is fitted in the first insertion hole so as to define a first processing space for processing a blank. The first pin includes a first pin shank and a first platform. The first platform is on one end of the first pin shank. The first pin is fitted in the first fitting hole to make the first platform opposed to the blank. An inner surface of the first die that faces the first fitting hole and first inclined walls on both sides of the first platform define first processing grooves. The first punch is movable relative to the first processing space. The second forging die assembly includes a second die, a second pin, a first support, a first biasing portion, and a second punch. The second die includes a second insertion hole. The second insertion hole includes a second movement hole and a second fitting hole. The second punch is movable in the second movement hole. The second movement hole includes a rectangular third region in a direction perpendicular to a movement direction of the second punch defined as a second movement direction. The third cross-section has approximately a same area in each portion of the second movement hole. The second pin is fitted in the second fitting hole. The second fitting hole includes a rectangular fourth region in the direction perpendicular to the second movement direction. The fourth cross-section includes approximately a same area in each portion of the second fitting hole. The area of the third cross-section is larger than the area of the fourth cross-section at a position where the second movement hole is connected to the second fitting hole. The second pin is fitted in the second insertion hole so as to define a second processing space for processing the blank. The second pin includes a second pin shank, a second platform, and a first protrusion. The second platform is on one end of the second pin shank. The first protrusion protrudes from the second platform. The second pin is fitted in the second fitting hole to make the first protrusion and the second platform opposed to the blank. The first support supports the second pin. The first biasing portion includes one end secured to the second die and another end secured to the first support. The second punch is movable relative to the second processing space. The second punch includes a second punch shank and a second protrusion. The second protrusion protrudes from one end of the second punch shank. The second punch is movable in the second movement hole to make the second protrusion opposed to the blank. An inner surface of the second die that faces the second fitting hole and second inclined walls on both sides of the second platform define second processing grooves. The third forging die assembly includes a third die, a third punch, and a fourth punch. The third die includes a third insertion hole. The third insertion hole includes a third movement hole and a third fitting hole. The third punch is movable in the third movement hole. The third movement hole includes a rectangular fifth region in a direction perpendicular to a movement direction of the third punch defined as a third movement direction. The fifth cross-section includes approximately a same area in each portion of the third movement hole. The fourth punch is fitted in the third fitting hole. The third fitting hole includes a rectangular sixth region in the direction perpendicular to the third movement direction. The sixth cross-section includes approximately a same area in each portion of the third fitting hole. The area of the fifth cross-section is larger than the area of the sixth cross-section at a position where the third movement hole is connected to the third fitting hole. The fourth punch is fitted in the third insertion hole so as to define a third processing space for processing the blank. The third punch includes a hollow cylindrical portion and is movable relative to the third processing space. The method includes clamping the blank in the first processing space by the first pin and the first punch so as to preliminarily form the pilot portion from part of the blank that is pressed from the first movement hole side to the first fitting hole side, to form ribs on one end of the pilot portion, which has been preliminarily formed, from part of the blank that is pressed into the first processing grooves, and to form the flanges from part of the blank that is pressed along an inner surface of the first die that faces the first movement hole. The blank is disposed, which has undergone the first clamping step, in the second processing space. After performing the first disposing step, the blank is clamped by the second pin and the second punch and the second die is moved relative to the second pin in the second movement direction so as to press the ribs, which have been formed in the first clamping step, into the second processing grooves, and to form depressions on the second pin side of the pilot portion and on the second punch side of the main body. The depressions are to be part of the through hole. The blank is disposed, which has undergone the second clamping step, in the third processing space. After performing the second disposing step, the blank is clamped by the fourth punch and the third punch so as to form the through hole in the blank and to cause an inner surface of the third die that faces the third fitting hole, and a terrace surface of the fourth punch side to press the pilot portion and the ribs so as to flatten an end surface of the pilot portion on the terrace surface side and to incline outer surfaces of the pilot portion along the ribs relative to the penetration direction.

According to further aspect of the present invention, an apparatus to produce a self-piercing and clinch nut includes a first forging die assembly, a second forging die assembly, a third forging die assembly, a transfer mechanism, and a controller. The self-piercing and clinch nut includes a main body and a pilot portion. The main body includes a central portion and flanges on both sides of the central portion. The pilot portion protrudes from the central portion. The main body and the pilot portion have a through hole in a center of the main body and the pilot portion. The main body has a rectangular external shape in a direction perpendicular to a penetration direction of the through hole. The external shape of the main body has approximately the same area in each portion of the main body. The pilot portion has a rectangular external shape in the direction perpendicular to the penetration direction. The external shape of the pilot portion has an area that increases as a distance from the main body increases. Two groove rows are formed in a first outer surface among outer surfaces of the main body that intersects the through hole. The two groove rows extend in an extending direction along borderlines between the flanges and the central portion. The first forging die assembly is configured to subject a blank to first processing and includes a first die, a first pin, and a first punch. The first die includes a first insertion hole. The first insertion hole includes a first movement hole and a first fitting hole. The first punch is movable in the first movement hole. The first movement hole has a rectangular first region in a direction perpendicular to a movement direction of the first punch defined as a first movement direction. The first region has approximately the same area in each portion of the first movement hole. The first pin is fitted in the first fitting hole. The first fitting hole has a rectangular second region in the direction perpendicular to the first movement direction. The second region has approximately the same area in each portion of the first fitting hole. The area of the first region is larger than the area of the second region at a position where the first movement hole is connected to the first fitting hole. The first pin is fitted in the first insertion hole so as to define a first processing space for processing the blank. The first pin includes a first pin shank and a first platform on one end of the first pin shank. The first pin is fitted in the first fitting hole to make the first platform opposed to the blank. An inner surface of the first die that faces the first fitting hole and first inclined walls on both sides of the first platform define first processing grooves. The first punch is movable relative to the first processing space and includes a first punch shank and two protrusion rows on one end of the first punch shank. The protrusion rows are opposed to the corresponding first processing grooves across the first processing space. The second forging die assembly is adjacent to the first forging die assembly and configured to subject the blank, which has undergone the first processing in the first forging die assembly, to second processing. The second forging die assembly includes a second die, a second pin, a first support, a first biasing portion, and a second punch. The second die includes a second insertion hole including a second movement hole and a second fitting hole. The second punch is movable in the second movement hole. The second movement hole has a rectangular third region in a direction perpendicular to a movement direction of the second punch defined as a second movement direction. The third cross-section has approximately the same area in each portion of the second movement hole. The second pin is fitted in the second fitting hole. The second fitting hole has a rectangular fourth region in the direction perpendicular to the second movement direction. The fourth cross-section has approximately the same area in each portion of the second fitting hole. The area of the third cross-section is larger than the area of the fourth cross-section at a position where the second movement hole is connected to the second fitting hole. The second pin is fitted in the second insertion hole so as to define a second processing space for processing the blank. The second pin includes a second pin shank, a second platform, and a first protrusion. The second platform is on one end of the second pin shank. The first protrusion protrudes from the second platform. The second pin is fitted in the second fitting hole to make the first protrusion and the second platform opposed to the blank. The first support supports the second pin. The first biasing portion has one end secured to the second die and the other end secured to the first support. The second punch is movable relative to the second processing space. The second punch includes a second punch shank and a second protrusion. The second protrusion protrudes from one end of the second punch shank. The second punch is movable in the second movement hole to make the second protrusion opposed to the blank. An inner surface of the second die that faces the second fitting hole and second inclined walls on both sides of the second platform define second processing grooves. The third forging die assembly is adjacent to the second forging die assembly and configured to subject the blank, which has undergone the second processing in the second forging die assembly, to third processing. The third forging die assembly includes a third die, a fourth punch, and a third punch. The third die has a third insertion hole including a third movement hole and a third fitting hole. The third punch is movable in the third movement hole. The third movement hole has a rectangular fifth region in a direction perpendicular to a movement direction of the third punch defined as a third movement direction. The fifth cross-section has approximately the same area in each portion of the third movement hole. The fourth punch is fitted in the third fitting hole. The third fitting hole has a rectangular sixth region in the direction perpendicular to the third movement direction. The sixth cross-section has approximately the same area in each portion of the third fitting hole. The area of the fifth cross-section is larger than the area of the sixth cross-section at a position where the third movement hole is connected to the third fitting hole. The fourth punch is fitted in the third insertion hole so as to define a third processing space for processing the blank. The third punch includes a hollow cylindrical portion and is movable relative to the third processing space. The transfer mechanism is configured to transfer the blank between two adjacent forging die assemblies among the first to third forging die assemblies. The controller is configured to control operations of the first to third forging die assemblies and the transfer mechanism.

According to the other aspect of the present invention, in a method of producing a self-piercing and clinch nut by a production apparatus, the self-piercing and clinch nut includes a main body, and a pilot portion. The main body includes a central portion and flanges on both sides of the central portion. The pilot portion protrudes from the central portion. The main body and the pilot portion have a through hole in a center of the main body and the pilot portion. The main body has a rectangular external shape in a direction perpendicular to a penetration direction of the through hole. The external shape of the main body has approximately a same area in each portion of the main body. The pilot portion has a rectangular external shape in the direction perpendicular to the penetration direction. The external shape of the pilot portion has an area that increases as a distance from the main body increases. Two groove rows are formed in a first outer surface among outer surfaces of the main body that intersects the through hole. The two groove rows extend in an extending direction along borderlines between the flanges and the central portion. The production apparatus includes a first forging die assembly, a second forging die assembly, and a third forging die assembly. The first forging die assembly includes a first die, a first pin, and a first punch. The first die includes a first insertion hole. The first insertion hole includes a first movement hole, and a first fitting hole. The first punch is movable in the first movement hole. The first movement hole includes a rectangular first region in a direction perpendicular to a movement direction of the first punch defined as a first movement direction. The first region includes approximately a same area in each portion of the first movement hole. The first pin is fitted in the first fitting hole. The first fitting hole includes a rectangular second region in the direction perpendicular to the first movement direction. The second region includes approximately a same area in each portion of the first fitting hole. The area of the first region is larger than the area of the second region at a position where the first movement hole is connected to the first fitting hole. The first pin is fitted in the first insertion hole so as to define a first processing space for processing a blank. The first pin includes a first pin shank, and a first platform. The first platform is on one end of the first pin shank. The first pin is fitted in the first fitting hole to make the first platform opposed to the blank. An inner surface of the first die that faces the first fitting hole and first inclined walls on both sides of the first platform define first processing grooves. The first punch is movable relative to the first processing space and includes a first punch shank and two protrusion rows. The two protrusion rows are on one end of the first punch shank. The protrusion rows are opposed to the corresponding first processing grooves across the first processing space. The second forging die assembly includes a second die, a second pin, a first support, a first biasing portion, and a second punch. The second die includes a second insertion hole. The second insertion hole includes a second movement hole, and a second fitting hole. The second punch is movable in the second movement hole. The second movement hole includes a rectangular third region in a direction perpendicular to a movement direction of the second punch defined as a second movement direction. The third cross-section has approximately a same area in each portion of the second movement hole. The second pin is fitted in the second fitting hole. The second fitting hole includes a rectangular fourth region in the direction perpendicular to the second movement direction. The fourth cross-section includes approximately a same area in each portion of the second fitting hole. The area of the third cross-section is larger than the area of the fourth cross-section at a position where the second movement hole is connected to the second fitting hole. The second pin is fitted in the second insertion hole so as to define a second processing space for processing the blank. The second pin includes a second pin shank, a second platform, and a first protrusion. The second platform is on one end of the second pin shank. The first protrusion protrudes from the second platform. The second pin is fitted in the second fitting hole to make the first protrusion and the second platform opposed to the blank. The first support supports the second pin. The first biasing portion includes one end secured to the second die and another end secured to the first support. The second punch is movable relative to the second processing space. The second punch includes a second punch shank, and a second protrusion. The second protrusion protrudes from one end of the second punch shank. The second punch is movable in the second movement hole to make the second protrusion opposed to the blank. An inner surface of the second die that faces the second fitting hole and second inclined walls on both sides of the second platform define second processing grooves. The third forging die assembly includes a third die, a third punch, and a fourth punch. The third die includes a third insertion hole. The third insertion hole includes a third movement hole and a third fitting hole. The third punch is movable in the third movement hole. The third movement hole includes a rectangular fifth region in a direction perpendicular to a movement direction of the third punch defined as a third movement direction. The fifth cross-section includes approximately a same area in each portion of the third movement hole. The fourth punch is fitted in the third fitting hole. The third fitting hole includes a rectangular sixth region in the direction perpendicular to the third movement direction. The sixth cross-section includes approximately a same area in each portion of the third fitting hole. The area of the fifth cross-section is larger than the area of the sixth cross-section at a position where the third movement hole is connected to the third fitting hole. The fourth punch is fitted in the third insertion hole so as to define a third processing space for processing the blank. The third punch includes a hollow cylindrical portion and is movable relative to the third processing space. The method includes clamping the blank in the first processing space by the first pin and the first punch so as to cause the two protrusion rows on the first punch to press the blank to form the two groove rows in the first outer surface of the main body, to preliminarily form the pilot portion from part of the blank that is pressed from the first movement hole side to the first fitting hole side, to form ribs on one end of the pilot portion, which has been preliminarily formed, from part of the blank that is pressed into the first processing grooves, and to form the flanges from part of the blank that is pressed along an inner surface of the first die that faces the first movement hole. The blank is disposed, which has undergone the first clamping step, in the second processing space. After performing the first disposing step, the blank is clamped by the second pin and the second punch and the second die is moved relative to the second pin in the second movement direction so as to press the ribs, which have been formed in the first clamping step, into the second processing grooves, and to form depressions on the second pin side of the pilot portion and on the second punch side of the main body. The depressions are to be part of the through hole. The blank is disposed, which has undergone the second clamping step, in the third processing space. After performing the second disposing step, the blank is clamped by the fourth punch and the third punch so as to form the through hole in the blank and to cause an inner surface of the third die that faces the third fitting hole, and a terrace surface of the fourth punch side to press the pilot portion and the ribs so as to flatten an end surface of the pilot portion on the terrace surface side and to incline outer surfaces of the pilot portion along the ribs relative to the penetration direction.

BRIEF DESCRIPTION OF THE DRAWINGS

A more complete appreciation of the present invention, and many of the attendant advantages thereof will be readily obtained as the same becomes better understood by reference to the following detailed description when considered in connection with the accompanying drawings, wherein:

FIG. 8 is a front cross-sectional view of the exemplary configuration of the fifth die and its vicinity according to the first and second embodiments;

DESCRIPTION OF THE EMBODIMENTS

Figure 1:
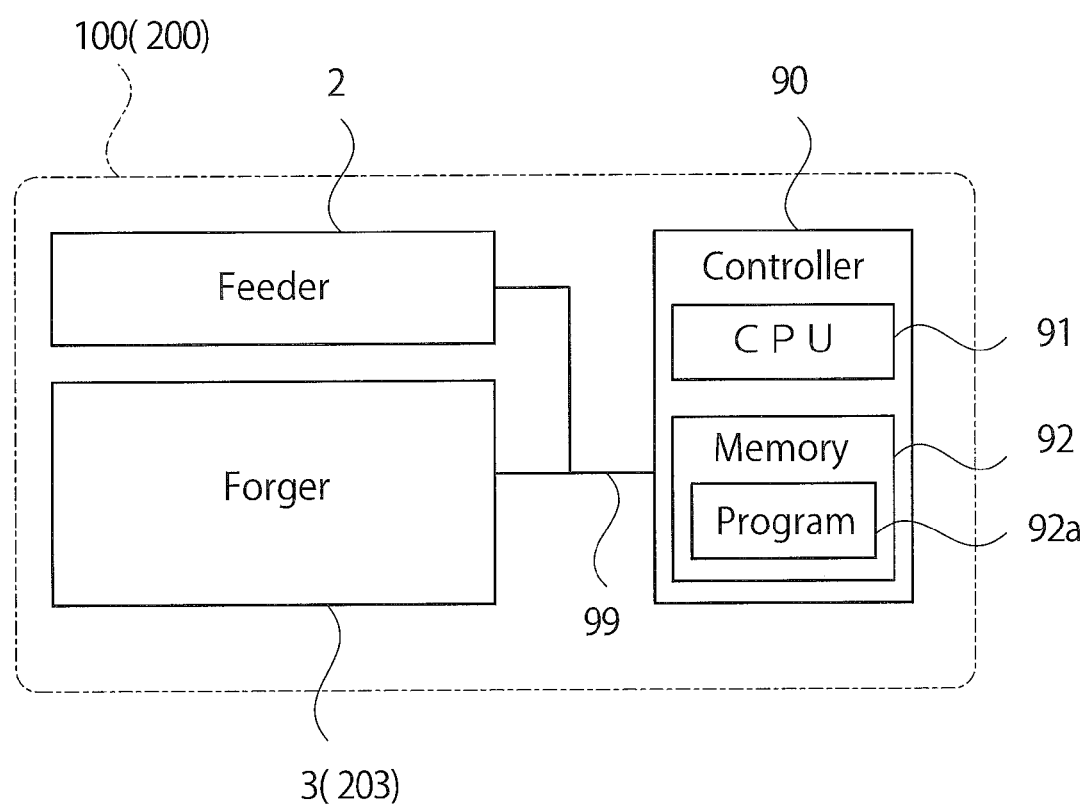
FIG. 1 is a block diagram illustrating an exemplary general arrangement of a production apparatus according to first and second embodiments.

The embodiments will now be described in detail with reference to the accompanying drawings, wherein like reference numerals designate corresponding or identical elements throughout the various drawings. The following embodiments are provided for exemplary purposes only and are not intended to limit the present disclosure.

1. First Embodiment 1.1. General Arrangement of the Production Apparatus

Figure 2:
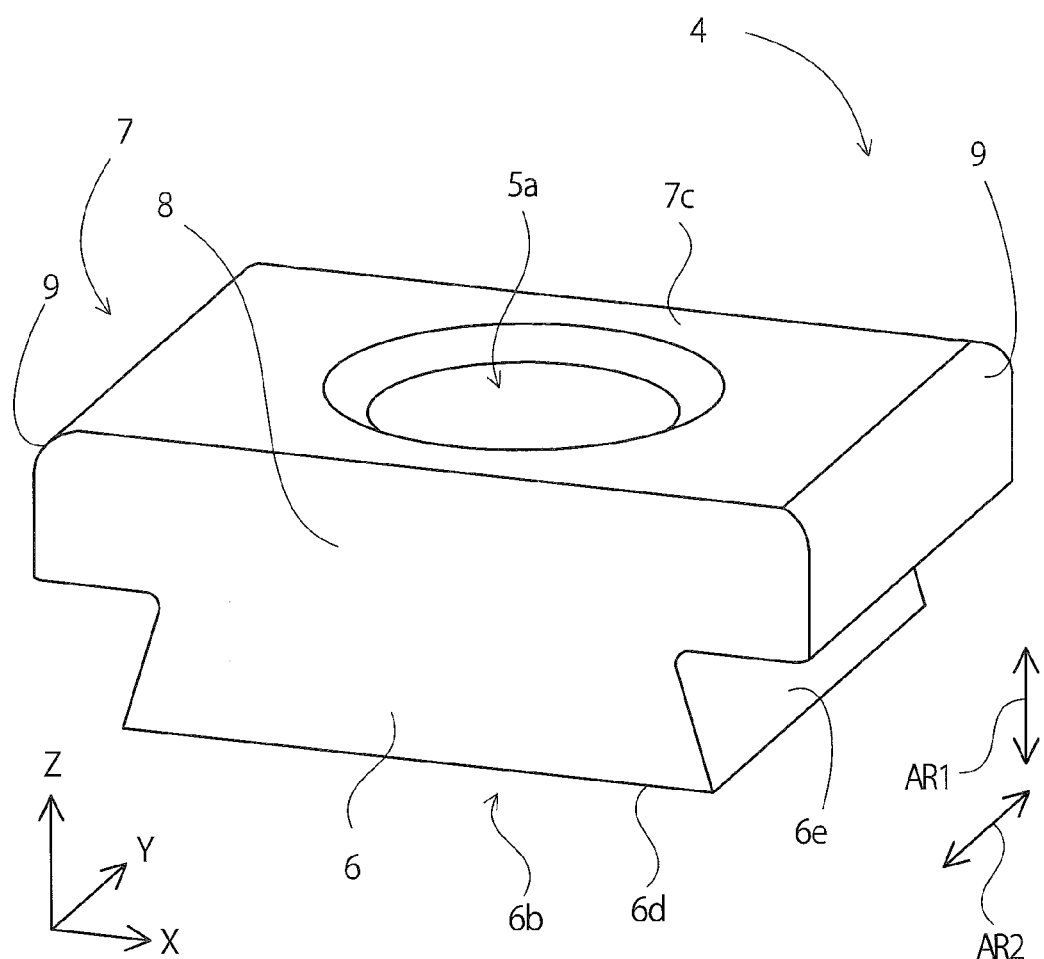
FIG. 2 is a perspective view of an exemplary configuration of a self-piercing and clinch nut produced by the production apparatus according to the first embodiment.
Figure 3:
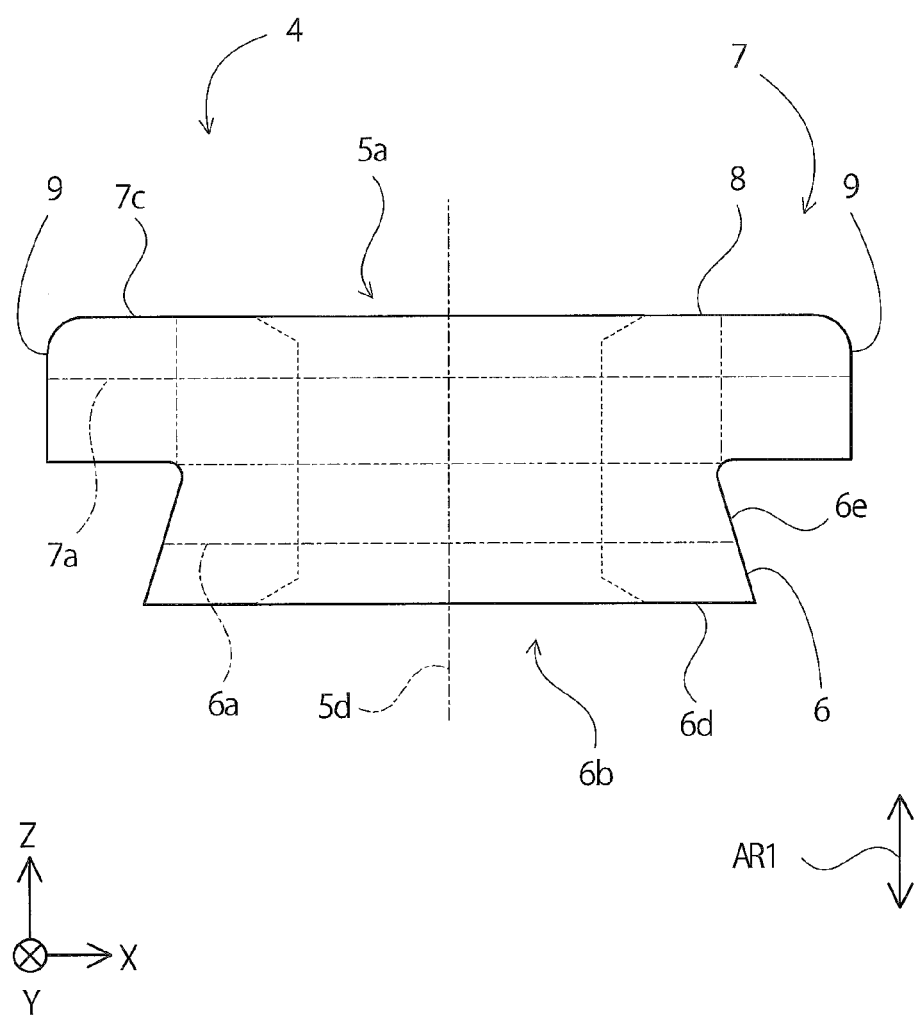
FIG. 3 is a front view of the exemplary configuration of the self-piercing and clinch nut produced by the production apparatus according to the first embodiment.

FIG. 1 is a block diagram illustrating an exemplary configuration of an apparatus to produce a self-piercing and clinch nut (hereinafter simply referred to as "production apparatus") 100 according to an embodiment. FIGS. 2 and 3 are respectively a perspective view and a front view of an exemplary configuration of a self-piercing and clinch nut 4 produced by the production apparatus 100. As illustrated in FIG. 1, the production apparatus 100 mainly includes a feeder 2, a forger 3, and a controller 90. For clarity of directions of these elements, FIG. 2 and the subsequent drawings are attached, as necessary, with an XYZ Cartesian coordinate system, in which the Z axis direction is assumed as the vertical direction and the XY plane is assumed as the horizontal plane.

The feeder 2 feeds a material of blanks (nut blanks) to the forger 3. The material of blanks is a wire material having an approximately rectangular cross-section. The forger 3 produces self-piercing and clinch nuts 4 (see FIGS. 2 and 3) of the wire material that has been fed by the feeder 2. The self-piercing and clinch nuts 4 have an approximately rectangular external shape. A detailed configuration of the forger 3 will be described later.

The controller 90 controls the feeder 2 and the forger 3 to operate. As illustrated in FIG. 1, the controller 90 mainly includes a CPU 91 and a memory 92. In accordance with a program 92a stored in the memory 92, the CPU 91 performs processing for transmitting a control signal to the feeder 2 and the forger 3 at a predetermined timing. The feeder 2 and the forger 3 are electrically connected to the controller 90 through a signal line 99.

The self-piercing and clinch nut 4 is a nut to be secured on a parent material such as a steel sheet through application of pressure. As illustrated in FIGS. 2 and 3, the self-piercing and clinch nut 4 mainly includes a pilot portion 6 and a main body 7.

The main body 7 includes a central portion 8 (portion enclosed by the double-dashed line in FIG. 3) and flanges 9. The central portion 8 has a through hole 5a. The flanges 9 are formed on both sides of the central portion 8. As illustrated in FIG. 3, the through hole 5a extends in a direction indicated by arrow AR1 (Z-axis direction) (hereinafter simply referred to as "penetration direction"). The through hole 5a serves as a screw hole.

The pilot portion 6 is a tool to punch a hole in the parent material utilizing pressure exerted in the penetration direction. As illustrated in FIGS. 2 and 3, the pilot portion 6 protrudes from the central portion 8 of the main body 7. The through hole 5a is formed in the center of the pilot portion 6 in a manner similar to the main body 7.

As illustrated in FIGS. 2 and 3, the main body 7 has a rectangular (square or oblong) external shape in a direction perpendicular to the penetration direction. A region 7a defined by the external shape (see FIG. 3) of the main body 7 has an area approximately the same at each portion of the main body 7 (each position in the penetration direction: each Z-coordinate value).

The pilot portion 6 has a rectangular external shape in the direction perpendicular to the penetration direction. A region 6a defined by the external shape (see FIG. 3) of the pilot portion 6 has an area that gradually increases as the distance from the main body 7 increases.

1.2. Configuration of the Forger

Figure 4:
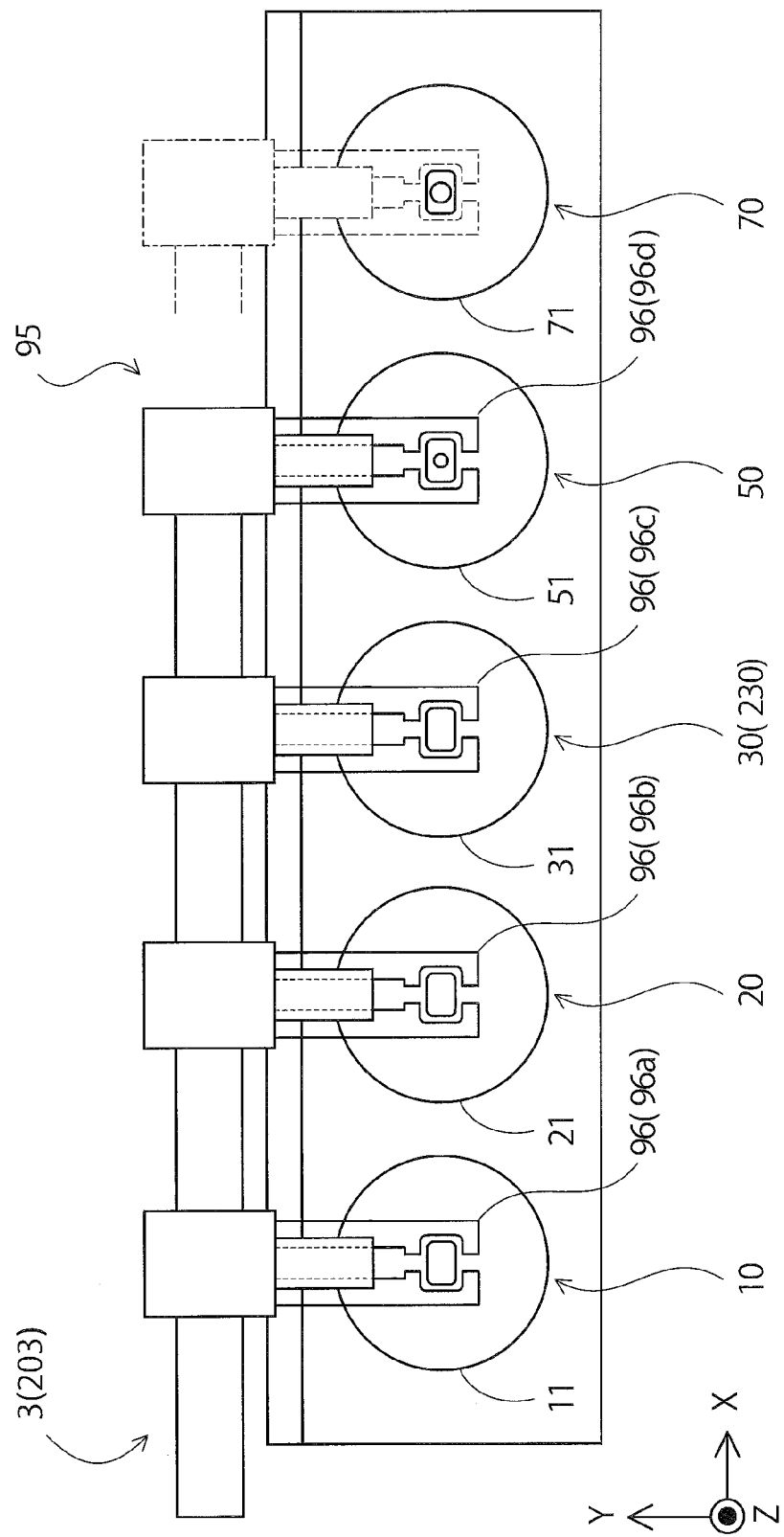
FIG. 4 is a plan view of an exemplary configuration of forging die assemblies according to the first and second embodiments.
Figure 5:
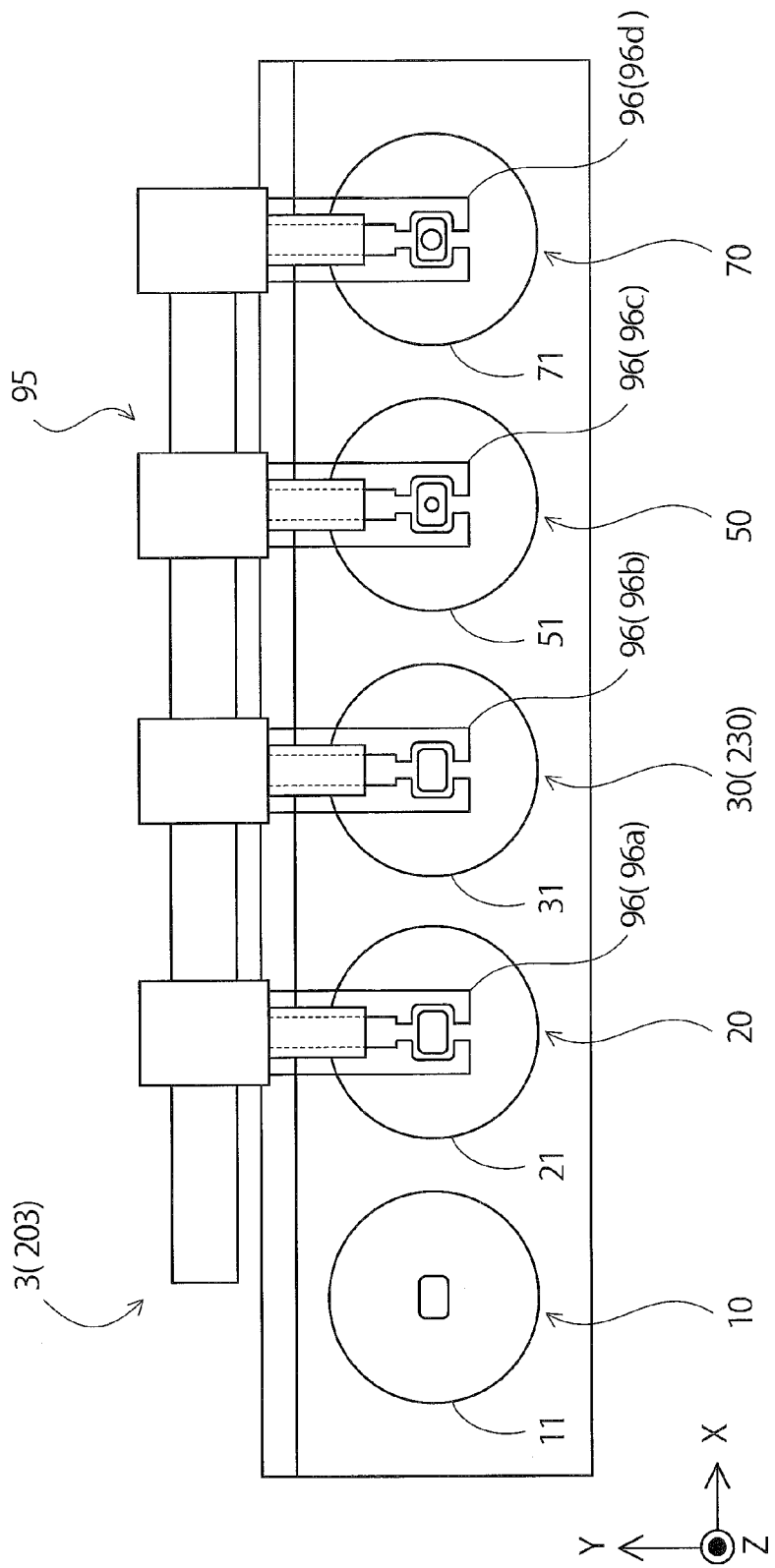
FIG. 5 is a plan view of the exemplary configuration of the forging die assemblies according to the first and second embodiments.

FIGS. 4 and 5 are plan views illustrating an exemplary configuration of the forger 3 according to this embodiment. The forger 3 cuts the wire material fed from the feeder 2 into pieces of a desired size. Then, the forger 3 subjects the cut pieces of the wire material to a plurality of forging steps to produce the self-piercing and clinch nuts 4 (see FIGS. 2 and 3) in for its before undergoing tapping (internal threading). As illustrated in FIGS. 4 and 5, the forger 3 mainly includes a forging die assembly 10, a forging die assembly 20, a first forging die assembly 30, a second forging die assembly 50, a third forging die assembly 70, and a transfer mechanism 95. The controller 90 controls operations of the first to third forging die assemblies 30, 50, and 70, and the transfer mechanism 95.

As illustrated in FIGS. 4 and 5, the forging die assembly 10 (fifth forging die assembly) is adjacent to the forging die assembly 20. The forging die assembly 10 subjects each cut piece of the wire material to preliminary processing (fifth processing) so as to form the cut piece of the wire material into a blank having a rectangular parallelepiped or cubic shape.

As illustrated in FIGS. 4 and 5, the forging die assembly 20 is adjacent to the forging die assembly 10 and the first forging die assembly 30. The forging die assembly 20 further subjects the blank, which has been formed to have the rectangular parallelepiped or cubic shape in the forging die assembly 10 (fourth forging die assembly), to preliminary processing (fourth processing).

The first forging die assembly 30 is adjacent to the forging die assembly 20 and the second forging die assembly 50 and subjects the blank, which has undergone the preliminary processing in the forging die assembly 20, to processing to form the flanges 9, for example.

The second forging die assembly 50 is adjacent to the first forging die assembly 30 and the third forging die assembly 70 and subjects the blank, which has undergone the processing in the first forging die assembly 30, to processing to preliminarily form the through hole 5a, for example.

The third forging die assembly 70 is adjacent to the second forging die assembly 50 and subjects the blank, which has undergone the processing in the second forging die assembly 50, to processing to incline outer surfaces 6e of the pilot portion 6 relative to the penetration direction, for example.

The transfer mechanism 95 includes a plurality of (four in this embodiment) grippers 96 (96a to 96d). The transfer mechanism 95 transfers each blank between two adjacent forging die assemblies among the forging die assembly 10, the forging die assembly 20, and the first to third forging die assemblies 30, 50, and 70.

Specifically, as illustrated in FIGS. 4 and 5, the gripper 96a transfers the blank between the forging die assembly 10 and the forging die assembly 20. The gripper 26b transfers the blank between the forging die assembly 20 and the first forging die assembly 30. The gripper 26c transfers the blank between the first and second forging die assemblies 30 and 50. The gripper 26d transfers the blank between the second and third forging die assemblies 50 and 70.

Detailed hardware configurations of the forging die assembly 10, the forging die assembly 20, and the first to third forging die assemblies 30, 50, and 70 will be described below.

1.3. Configurations of the Forging Die Assemblies for Preliminary Processing

Hardware configurations of the forging die assemblies 10 and 20 for preliminary processing will now be described in this order.

Figure 6:
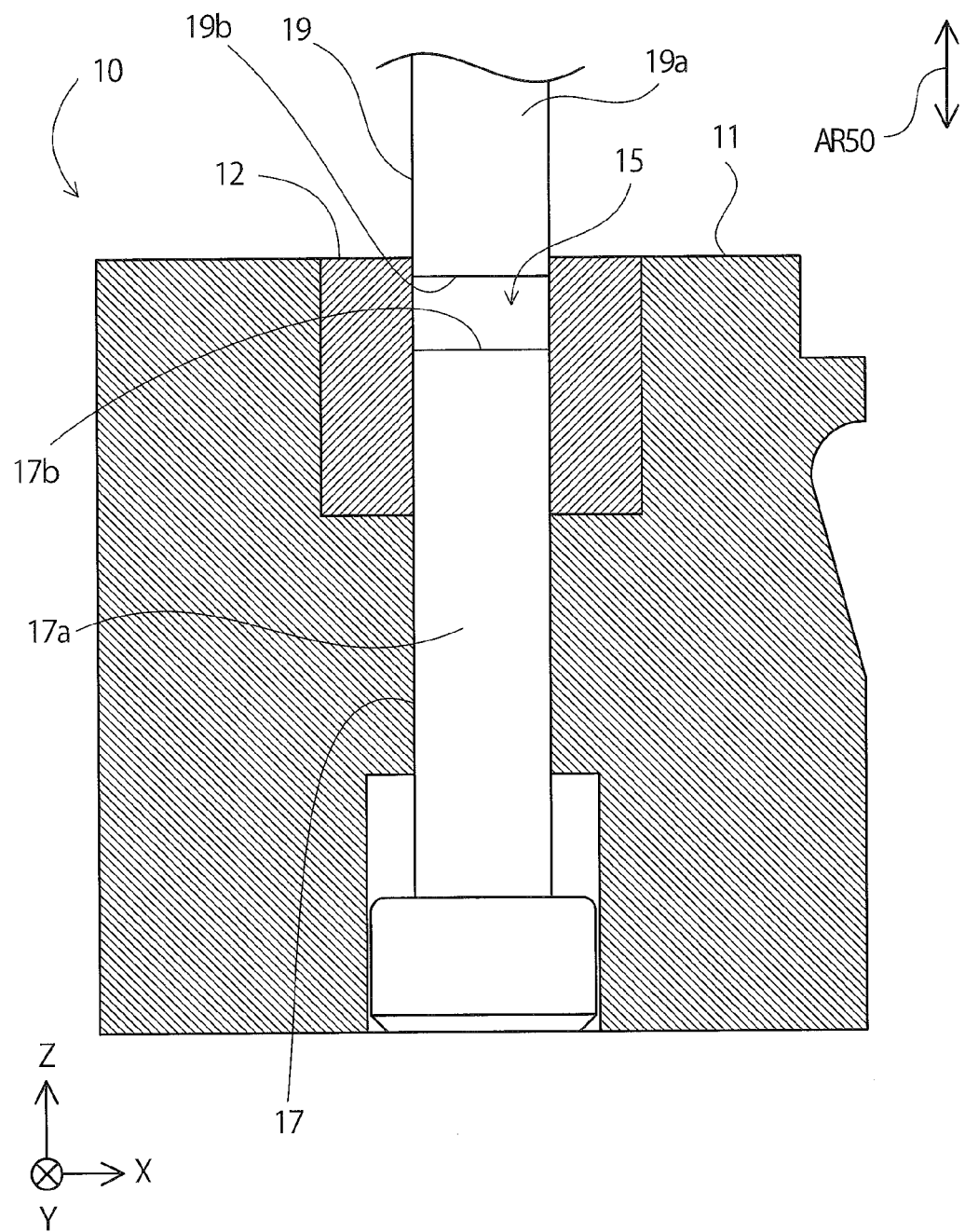
FIG. 6 is a front cross-sectional view of an exemplary configuration of a fifth forging die assembly according to the first and second embodiments.
Figure 7:
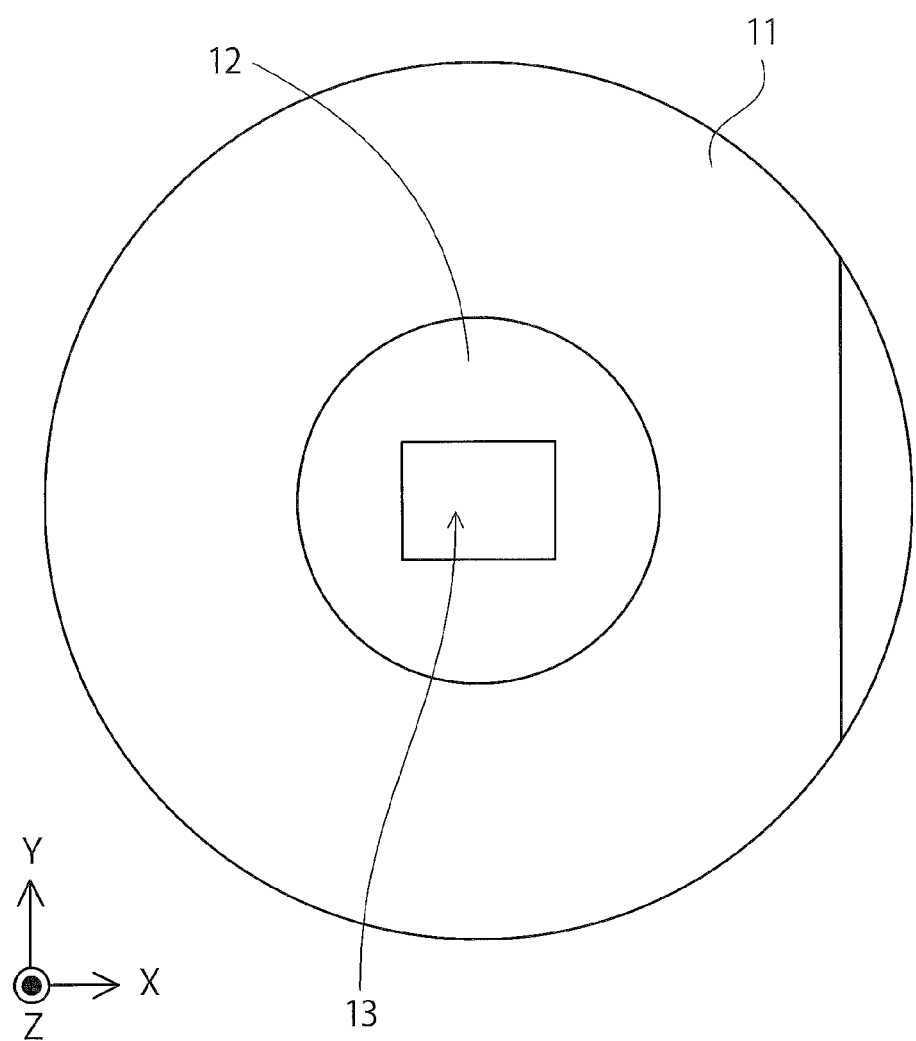
FIG. 7 is a plan view of an exemplary configuration of a fifth die and its vicinity according to the first and second embodiments.
Figure 9:
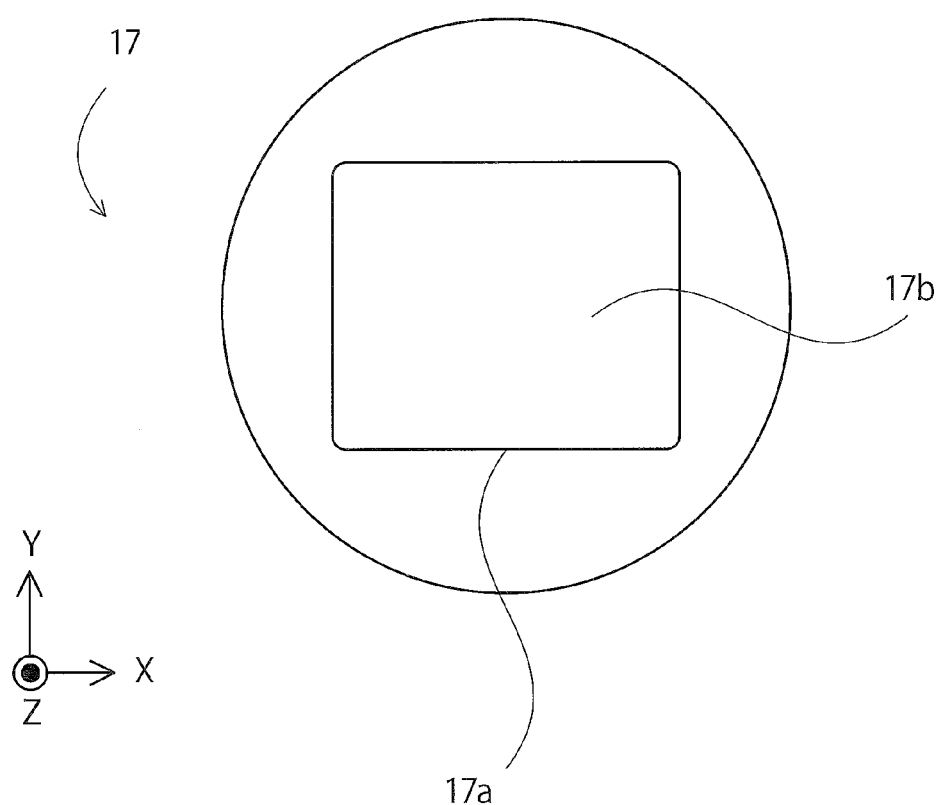
FIG. 9 is a plan view of an exemplary configuration of a fifth pin according to the first and second embodiments.

FIG. 6 is a front cross-sectional view of an exemplary configuration of the forging die assembly 10 (fifth forging die assembly). FIGS. 7 and 8 are respectively a plan view and a front cross-sectional view of an exemplary configuration of a die 12 (fifth die) and its vicinity. FIG. 9 is a plan view of an exemplary configuration of a pin 17 (fifth pin). As illustrated in FIG. 6, the forging die assembly 10 mainly includes the die 12, the pin 17, and a punch 19.

The die 12 is a block to receive a blank and is accommodated in a die case 11. As illustrated in FIG. 8, the die 12 has an insertion hole 13 extending in one direction (Z-axis direction).

The pin 17 is a rod-shaped member fitted in the insertion hole 13 of the die 12. As illustrated in FIG. 9, a pin shank 17a of the pin 17 has a rectangular external shape. As illustrated in FIG. 6, the pin 17 is fitted in the insertion hole 13 to define a processing space 15 (fifth processing space) for processing the blank in the die 12. When the pin 17 approaches the punch 19 along the insertion hole 13, the blank in the processing space 15 is discharged from the forging die assembly 10.

The punch 19 is a rod-shaped member movable to and away from the processing space 15. A punch shank 19a of the punch 19 has a rectangular external shape. The movement direction of the punch 19 is set to be a direction of arrow AR50 (Z-axis direction: fifth movement direction).

As illustrated in FIG. 7, the insertion hole 13 has a rectangular internal shape in a direction perpendicular to the movement direction of the punch 19. A region 13a (see FIG. 8) defined by the internal shape of the insertion hole 13 has an area that is approximately the same at each portion of the insertion hole 13 (each position in the movement direction of the punch 19). The end surface 17b (see FIGS. 6 and 9) of the pin 17 which is opposed to the processing space 15 and the end surface 19b of the punch 19 which is opposed to the processing space 15 are rectangular flat surfaces.

Figure 10:
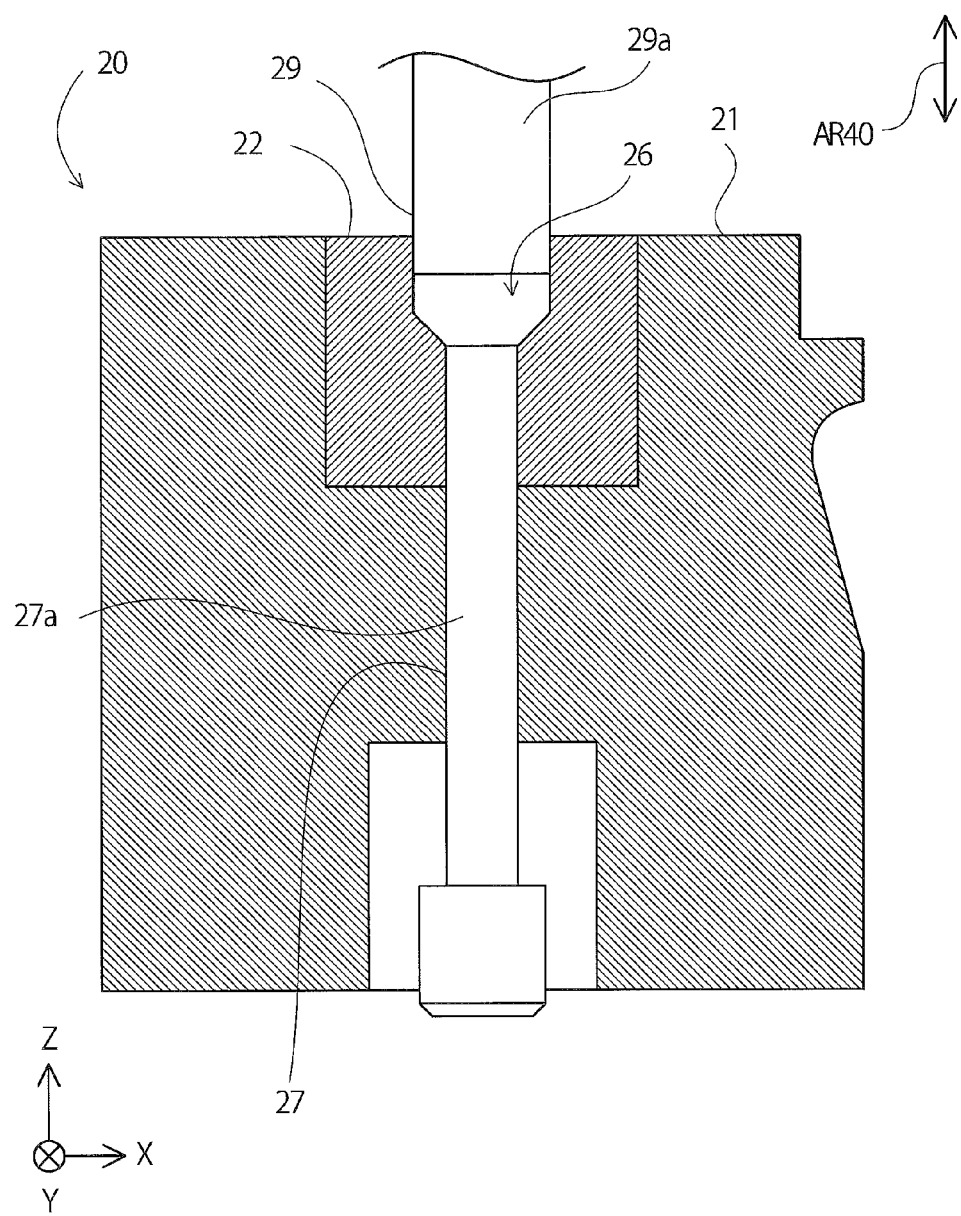
FIG. 10 is a front cross-sectional view of an exemplary configuration of a fourth forging die assembly according to the first and second embodiments.
Figure 11:
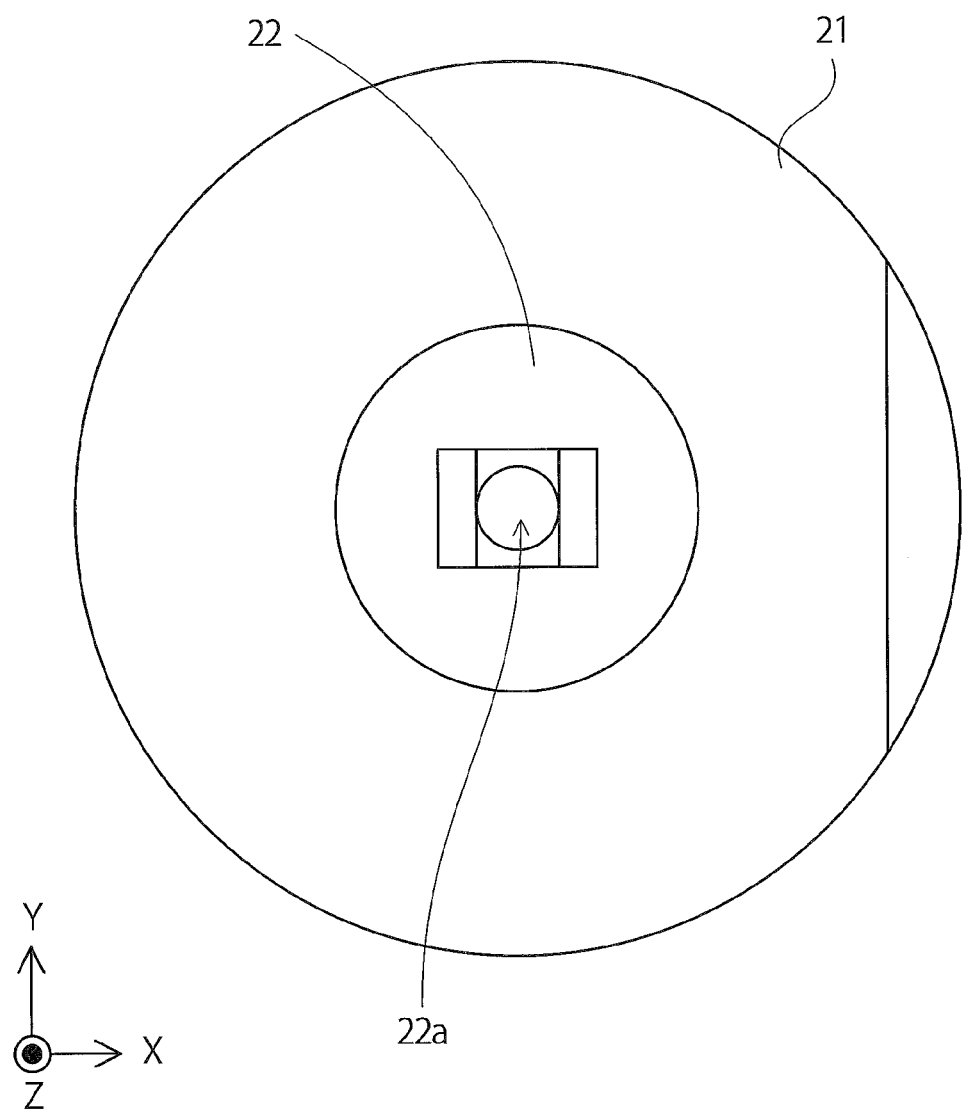
FIG. 11 is a plan view of an exemplary configuration of a fourth die and its vicinity according to the first and second embodiments.
Figure 12:
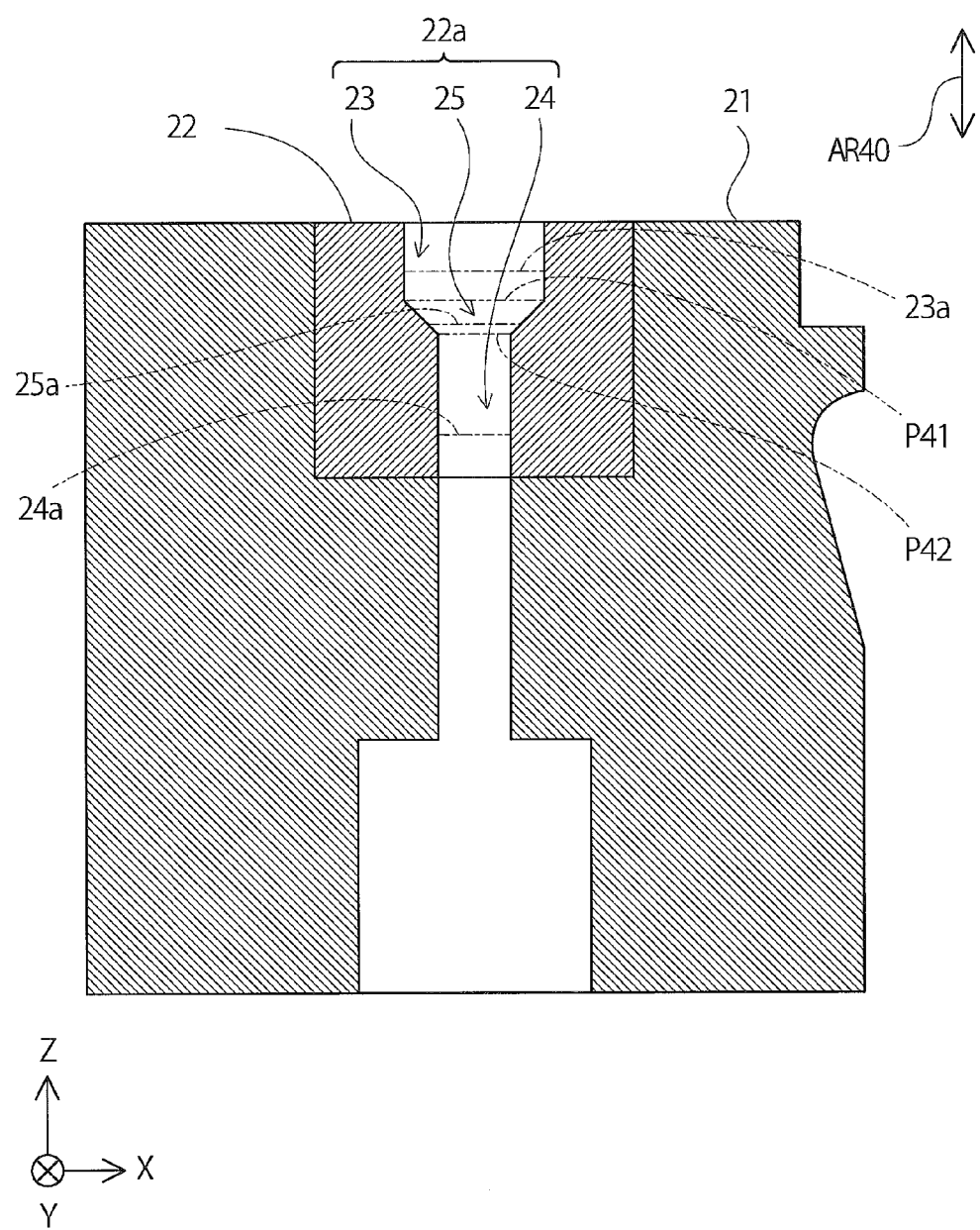
FIG. 12 is a front cross-sectional view of the exemplary configuration of the fourth die and its vicinity according to the first and second embodiments.
Figure 13:
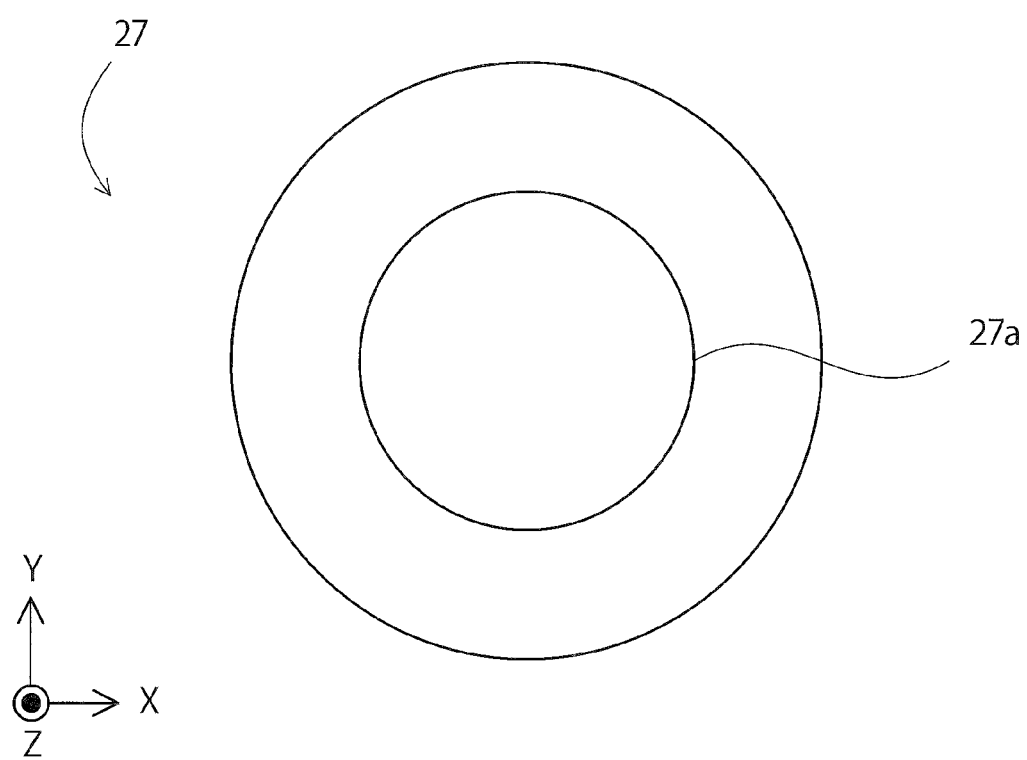
FIG. 13 is a plan view of an exemplary configuration of a fourth pin according to the first and second embodiments.

Next, a hardware configuration of the forging die assembly 20 will be described. FIG. 10 is a front cross-sectional view of an exemplary configuration of the forging die assembly 20 (fourth forging die assembly). FIGS. 11 and 12 are respectively a plan view and a front cross-sectional view of an exemplary configuration of a die 22 (fourth die) and its vicinity. FIG. 13 is a plan view of an exemplary configuration of a pin 27 (fourth pin). As illustrated in FIG. 10, the forging die assembly 20 mainly includes the die 22, the pin 27, and a punch 29.

The die 22, which is similar to the die 12, is a block to receive a blank and is accommodated in a die case 21. As illustrated in FIG. 12, the die 22 has an insertion hole 22a extending in one direction (Z-axis direction).

The pin 27 is a rod-shaped member fitted in the insertion hole 22a of the die 22. As illustrated in FIG. 13, a pin shank 27a has a circular external shape. As illustrated in FIG. 10, the pin 27 is fitted in the insertion hole 22a so as to define a processing space 26 (fourth processing space) for processing the blank in the die 22. When the pin 27 approaches the punch 29 along the insertion hole 22a, the blank in the processing space 26 is discharged from the forging die assembly 20.

The punch 29 is a rod-shaped member movable to and away from the processing space 26. A punch shank 29a, which is similar to the punch shank 19a of the punch 19, has a rectangular external shape. The movement direction of the punch 29 is set to be a direction of arrow AR40 (Z-axis direction: fourth movement direction).

As illustrated in FIG. 12, the insertion hole 22a includes a movement hole 23, a fitting hole 24, and a tapered hole 25. Specifically, the movement hole 23 is the portion of the insertion hole 22a in which the punch 29 is movable. The fitting hole 24 is the portion of the insertion hole 22a in which the pin 27 is fitted. The tapered hole 25 is the portion of the insertion hole 22a which is interposed between the movement hole 23 and the fitting hole 24.

As illustrated in FIGS. 11 and 12, the movement hole 23 has a rectangular internal shape in a direction perpendicular to the movement direction of the punch 29. A region 23a (see FIG. 12) defined by the internal shape of the movement hole 23 has an area that is approximately the same at each portion of the movement hole 23 (each position in the movement direction of the punch 29).

As illustrated in FIGS. 11 and 12, the fitting hole 24 has a circular internal shape in the direction perpendicular to the movement direction of the punch 29. A region 24a (see FIG. 12) defined by the internal shape of the fitting hole 24 has an area that is approximately the same at each portion of the fitting hole 24 (each position in the movement direction of the punch 29).

As illustrated in FIGS. 11 and 12, the tapered hole 25 has a rectangular internal shape in the direction perpendicular to the movement direction of the punch 29. A region 25a defined by the internal shape of the tapered hole 25 has an area that gradually decreases from the movement hole 23 side to the fitting hole 24 side.

At a position P41 where the movement hole 23 and the tapered hole 25 are connected to each other, the cross-sectional area of the movement hole 23 is approximately the same as the cross-sectional area of the tapered hole 25. At a position P42 where the tapered hole 25 and the fitting hole 24 are connected to each other, the cross-sectional area of the tapered hole 25 is approximately the same as the cross-sectional area of the fitting hole 24.

1.4. Configuration of the First Forging Die Assembly

Figure 14:
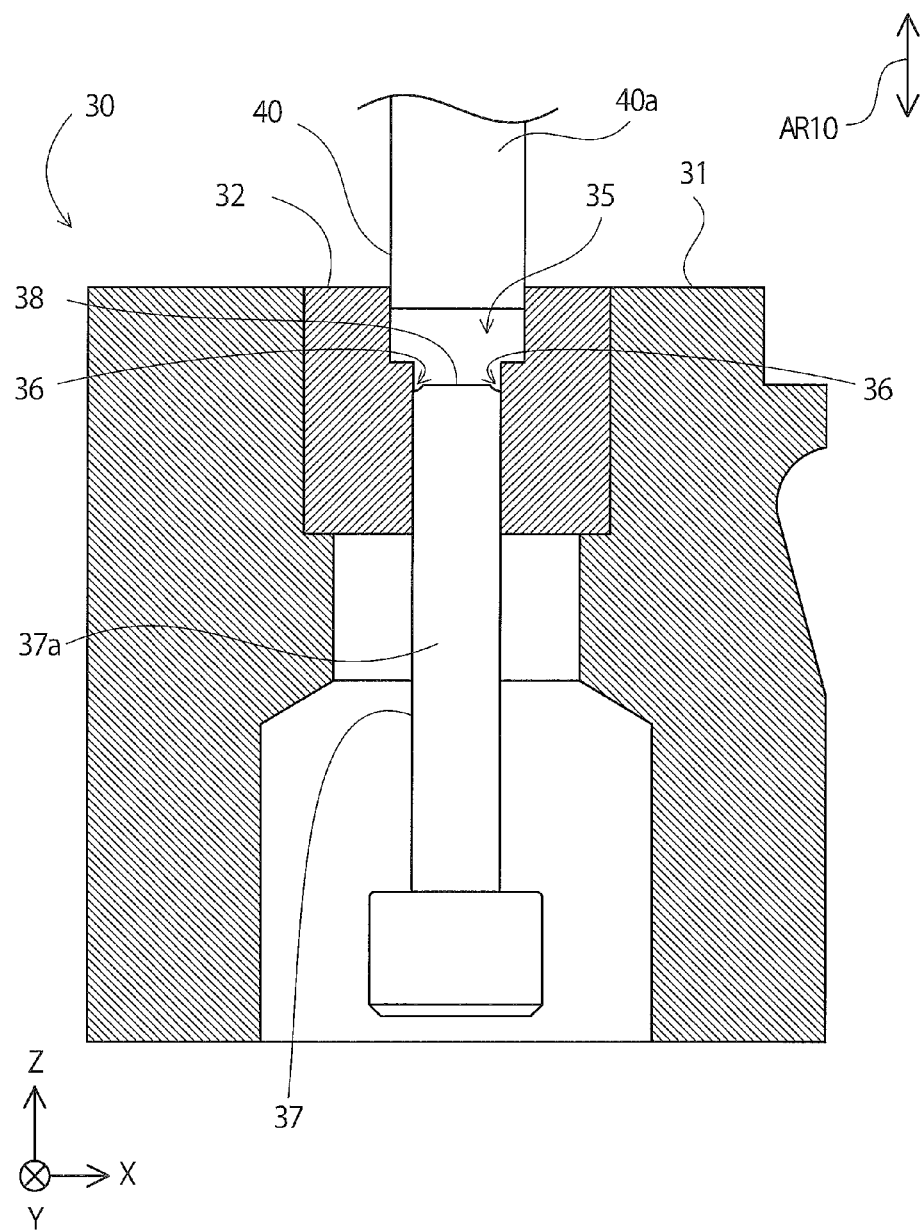
FIG. 14 is a front cross-sectional view of an exemplary configuration of a first forging die assembly according to the first embodiment.
Figure 15:
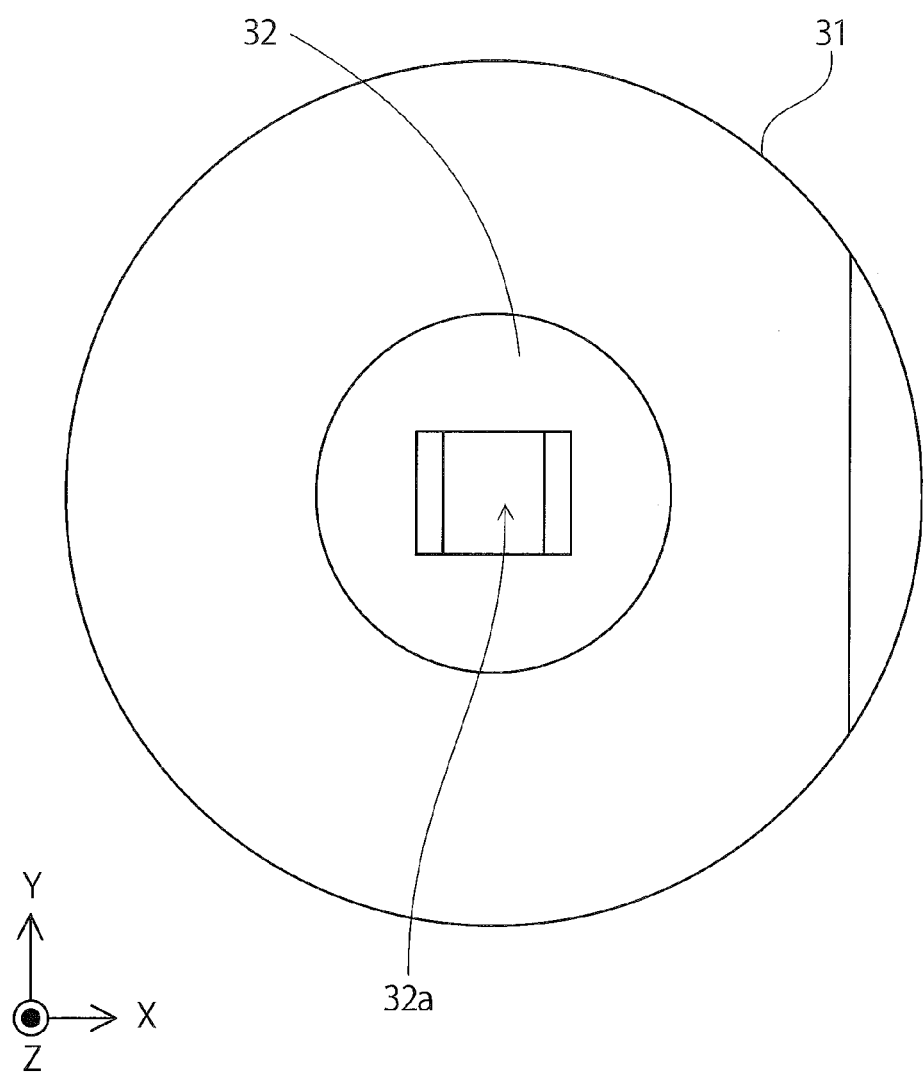
FIG. 15 is a plan view of an exemplary configuration of a first die and its vicinity according to the first and second embodiments.
Figure 16:
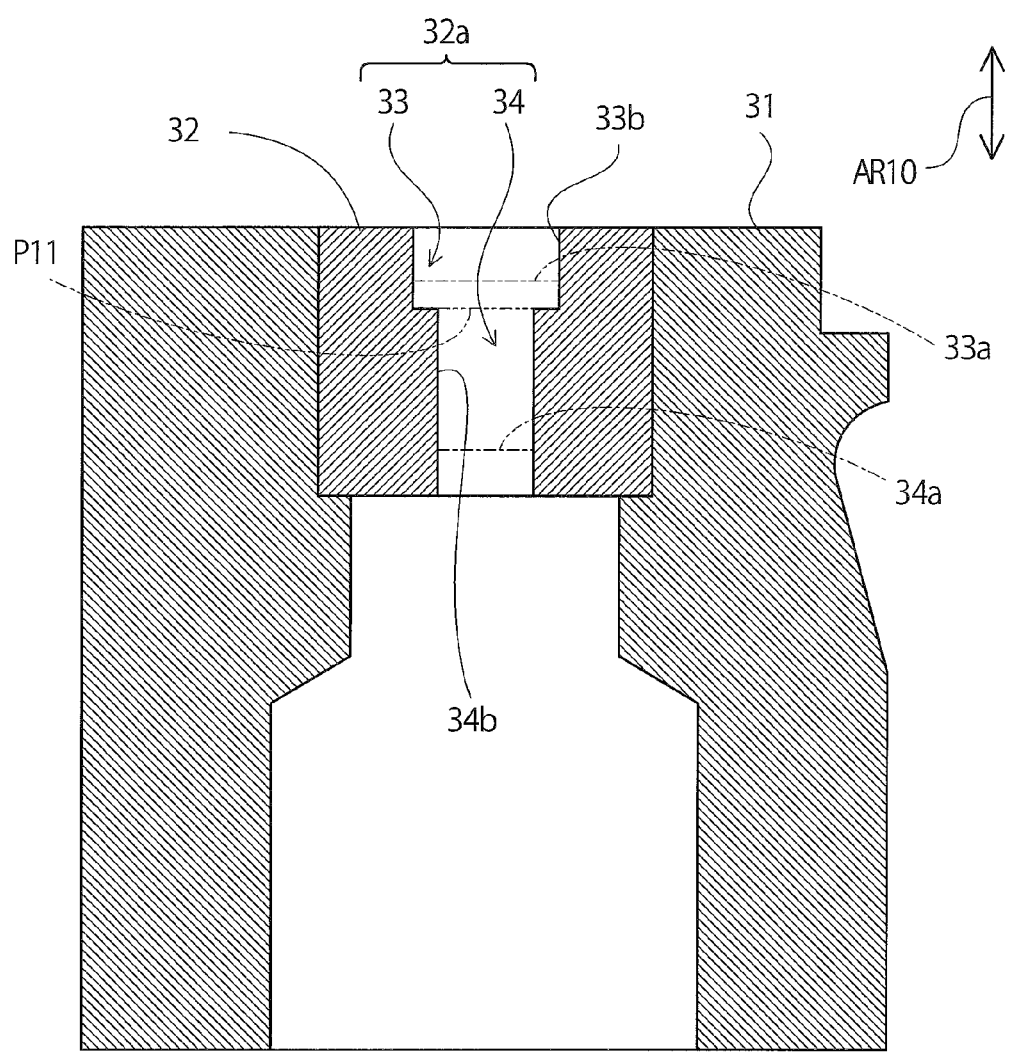
FIG. 16 is a front cross-sectional view of the exemplary configuration of the first die and its vicinity according to the first and second embodiments.
Figure 17:
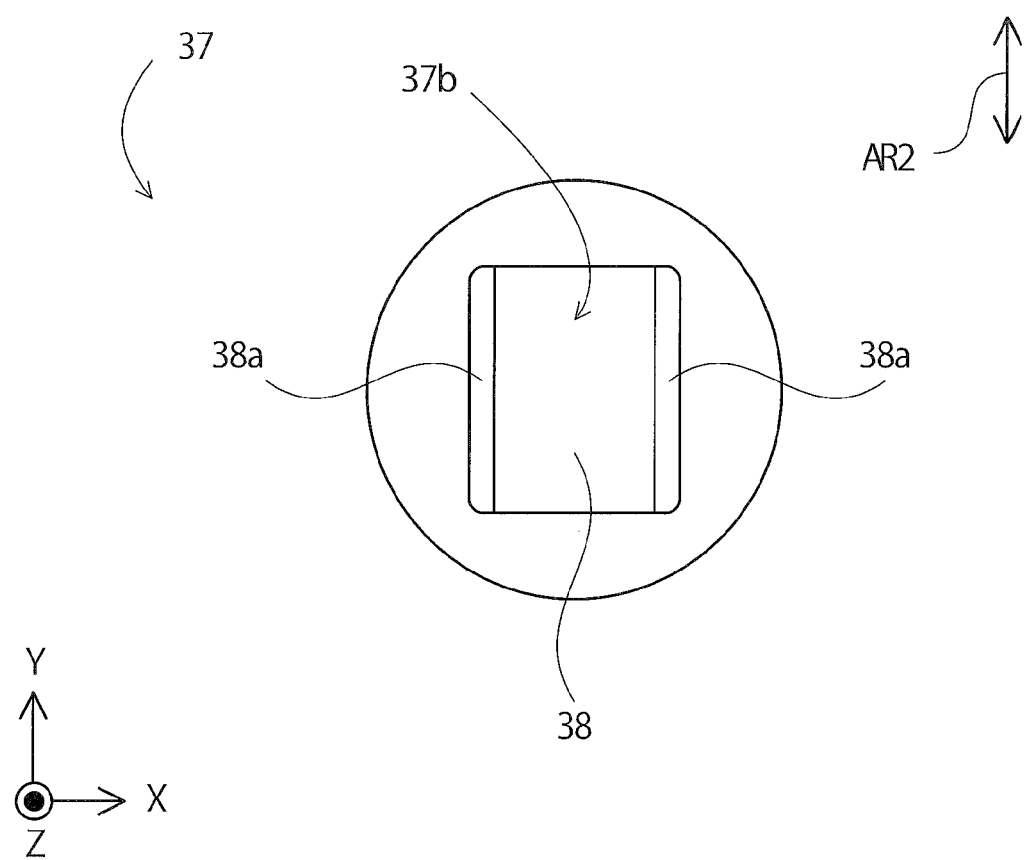
FIG. 17 is a plan view of an exemplary configuration of a first pin according to the first and second embodiments.
Figure 18:
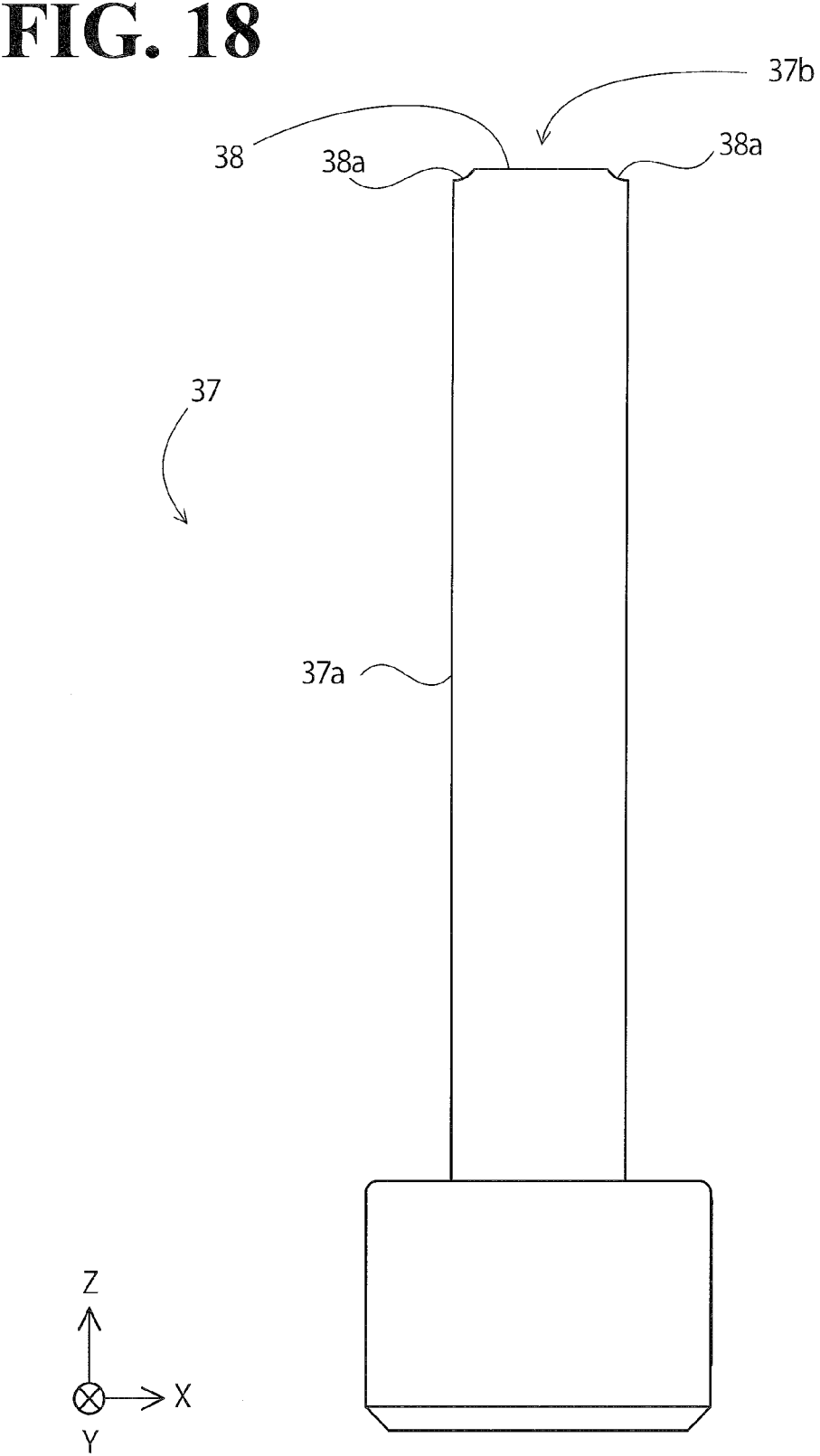
FIG. 18 is a front view of the exemplary configuration of the first pin according to the first and second embodiments.
Figure 19:
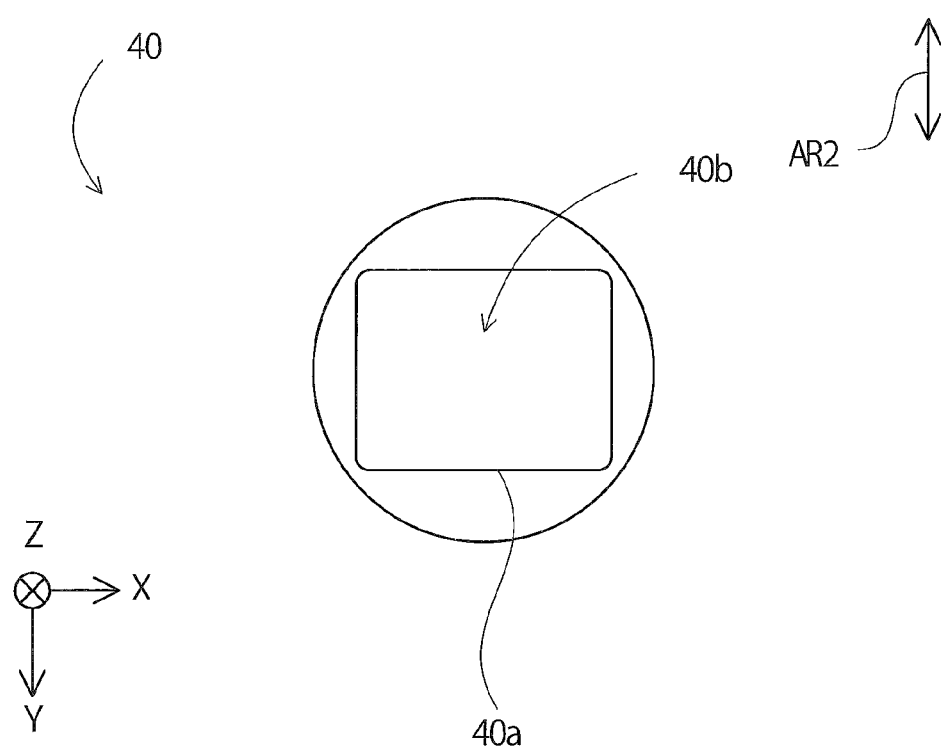
FIG. 19 is a bottom view of an exemplary configuration of a first punch according to the first embodiment.
Figure 20:
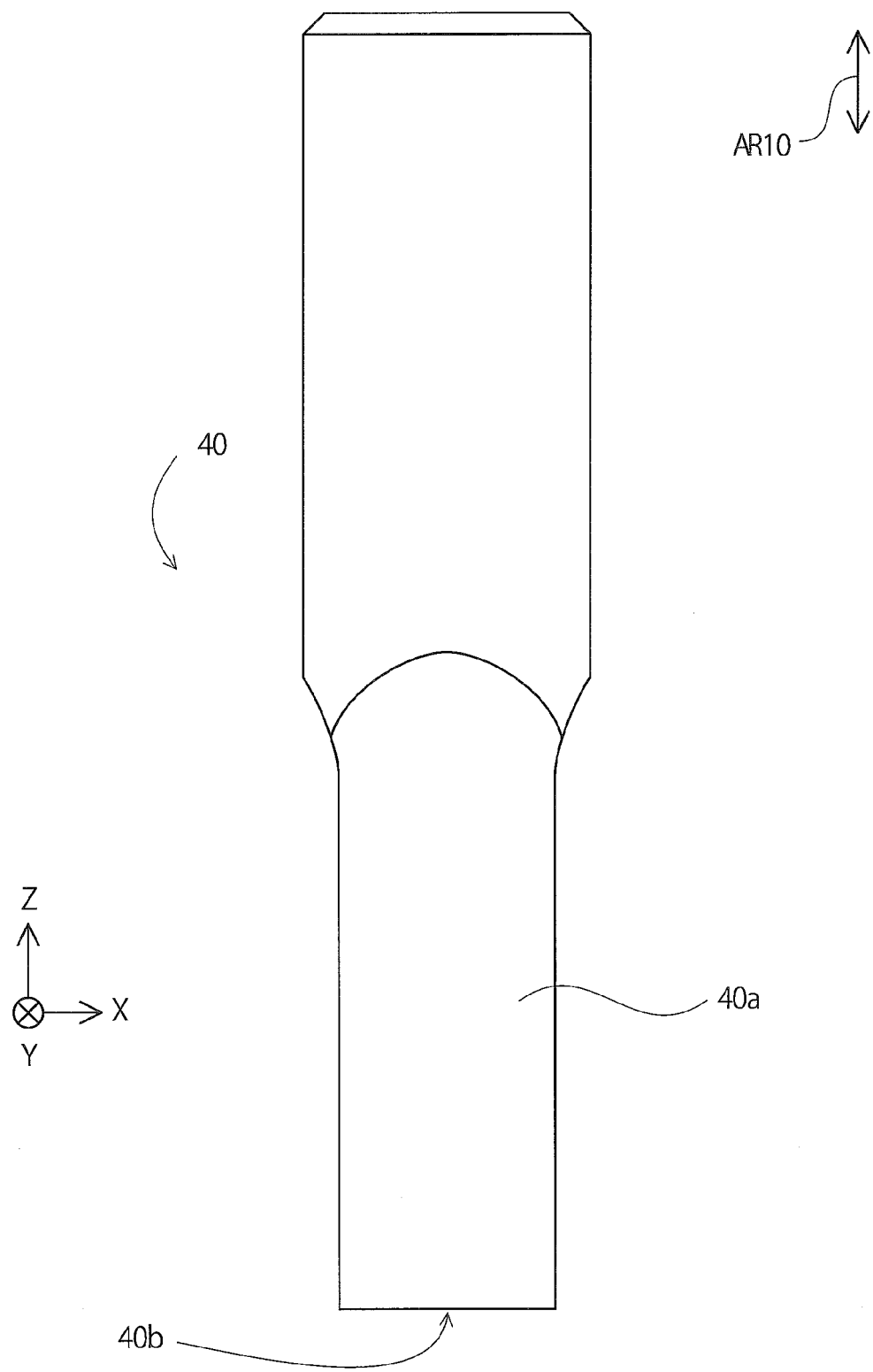
FIG. 20 is a front view of the exemplary configuration of the first punch according to the first embodiment.

FIG. 14 is a front cross-sectional view of an exemplary configuration of the first forging die assembly 30. FIGS. 15 and 16 are respectively a plan view and a front cross-sectional view of an exemplary configuration of a first die 32 and its vicinity. FIGS. 17 and 18 are respectively a plan view and a front view of an exemplary configuration of a first pin 37. FIGS. 19 and 20 are respectively a bottom view and a front view of an exemplary configuration of a first punch 40. As illustrated in FIG. 14, the first forging die assembly 30 mainly includes the first die 32, the first pin 37, and the first punch 40.

The first die 32, which is similar to the die 12, is a block to receive a blank and is accommodated in a die case 31. As illustrated in FIG. 16, the first die 32 has a first insertion hole 32a extending in one direction (Z-axis direction).

The first pin 37 is fitted in the first insertion hole 32a to define a first processing space 35 (see FIG. 14) for processing the blank in the first die 32. When the first pin 37 approaches the first punch 40 along the first insertion hole 32a, the blank in the first processing space 35 is discharged from the first forging die assembly 30. As illustrated in FIGS. 17 and 18, the first pin 37 mainly includes a first pin shank 37a and a first platform 38.

The first pin shank 37a is a rod-shaped member inserted in the first insertion hole 32a. As illustrated in FIG. 17, the first pin shank 37a has a rectangular external shape. The first platform 38 is disposed on one end 37b of the first pin shank 37a. As illustrated in FIGS. 17 and 18, first inclined walls 38a extending in a direction of arrow AR2 (X-axis direction) (hereinafter simply referred to as "extending direction") are disposed on both sides of the first platform 38.

The first punch 40 is a rod-shaped member movable to and away from the first processing space 35. A first punch shank 40a has a rectangular external shape. As illustrated in FIG. 14, the movement direction of the first punch 40 is set to be a direction of arrow AR10 (Z-axis direction: first movement direction).

As illustrated in FIG. 16, the first insertion hole 32a includes a first movement hole 33 and a first fitting hole 34. Specifically, the first movement hole 33 is the portion of the first insertion hole 32a in which the first punch 40 is movable. The first fitting hole 34 is the portion of the first insertion hole 32a in which the first pin 37 is fitted.

As illustrated in FIGS. 15 and 16, the first movement hole 33 has a rectangular first region 33a in a direction perpendicular to the movement direction of the first punch 40. The area of the first region 33a (see FIG. 16) of the first movement hole 33 is approximately the same at each portion of the first movement hole 33 (at each position in the movement direction of the first punch 40).

As illustrated in FIGS. 15 and 16, the first fitting hole 34 has a rectangular second region 34a in the direction perpendicular to the movement direction of the first punch 40. The area of the second region 34a (see FIG. 16) of the first fitting hole 34 is approximately the same at each portion of the first fitting hole 34 (at each position in the movement direction of the first punch 40). At a position P11 where the first movement hole 33 and the first fitting hole 34 are connected to each other, the area of the first region 33a is larger than the area of the second region 34a.

The first pin 37 is fitted in the first fitting hole 34 in such a manner that the first platform 38 of the first pin 37 is opposed to the blank disposed in the first processing space 35. Consequently, the inner surface 34b (see FIG. 16) of the first die 32 that faces the first fitting hole 34 and the first inclined walls 38a (see FIGS. 17 and 18) on both sides of the first platform 38 define first processing grooves 36 (see FIG. 14).

1.5. Configuration of the Second Forging Die Assembly

Figure 21:
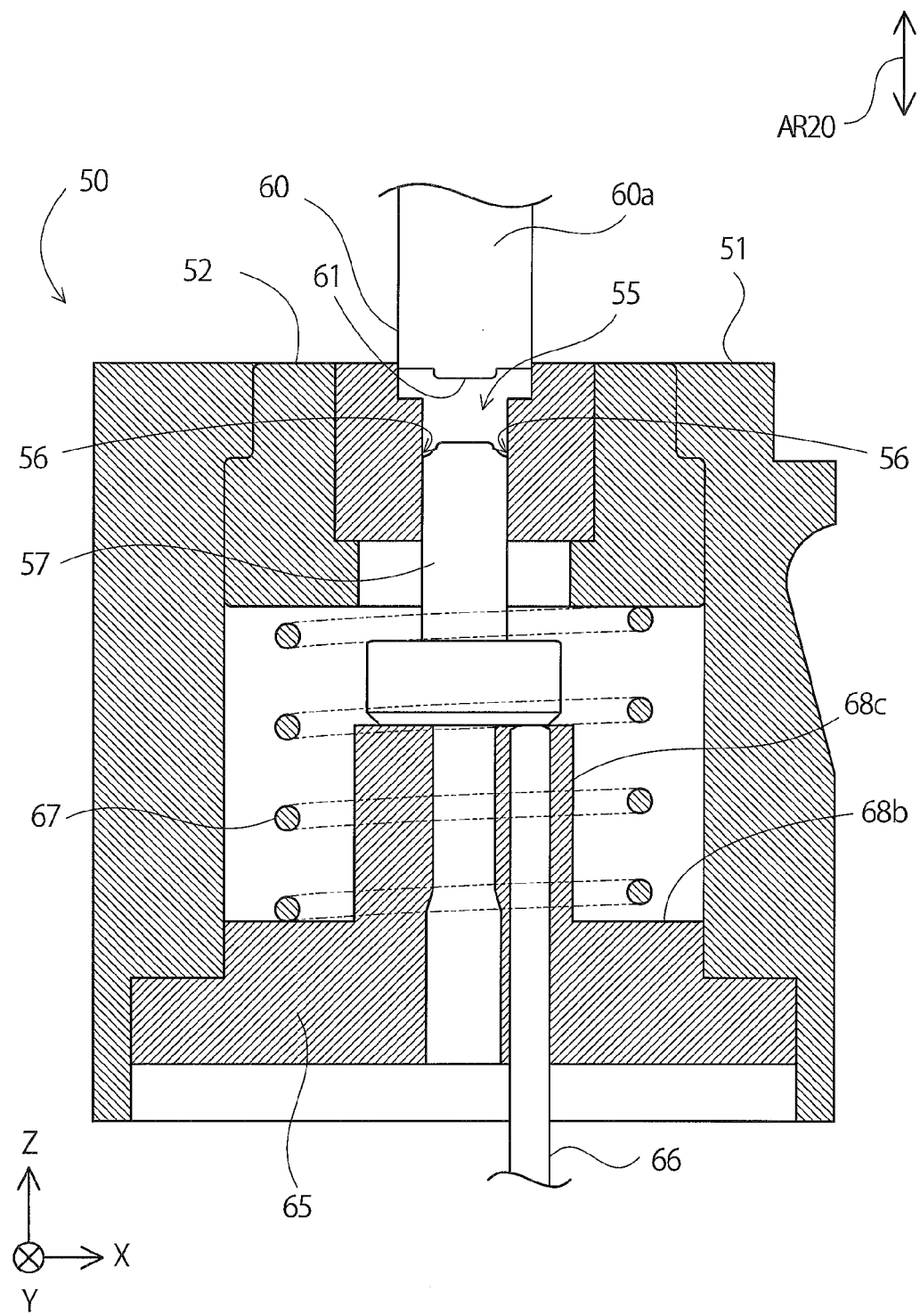
FIG. 21 is a front cross-sectional view of an exemplary configuration of a second forging die assembly according to the first and second embodiments.
Figure 22:
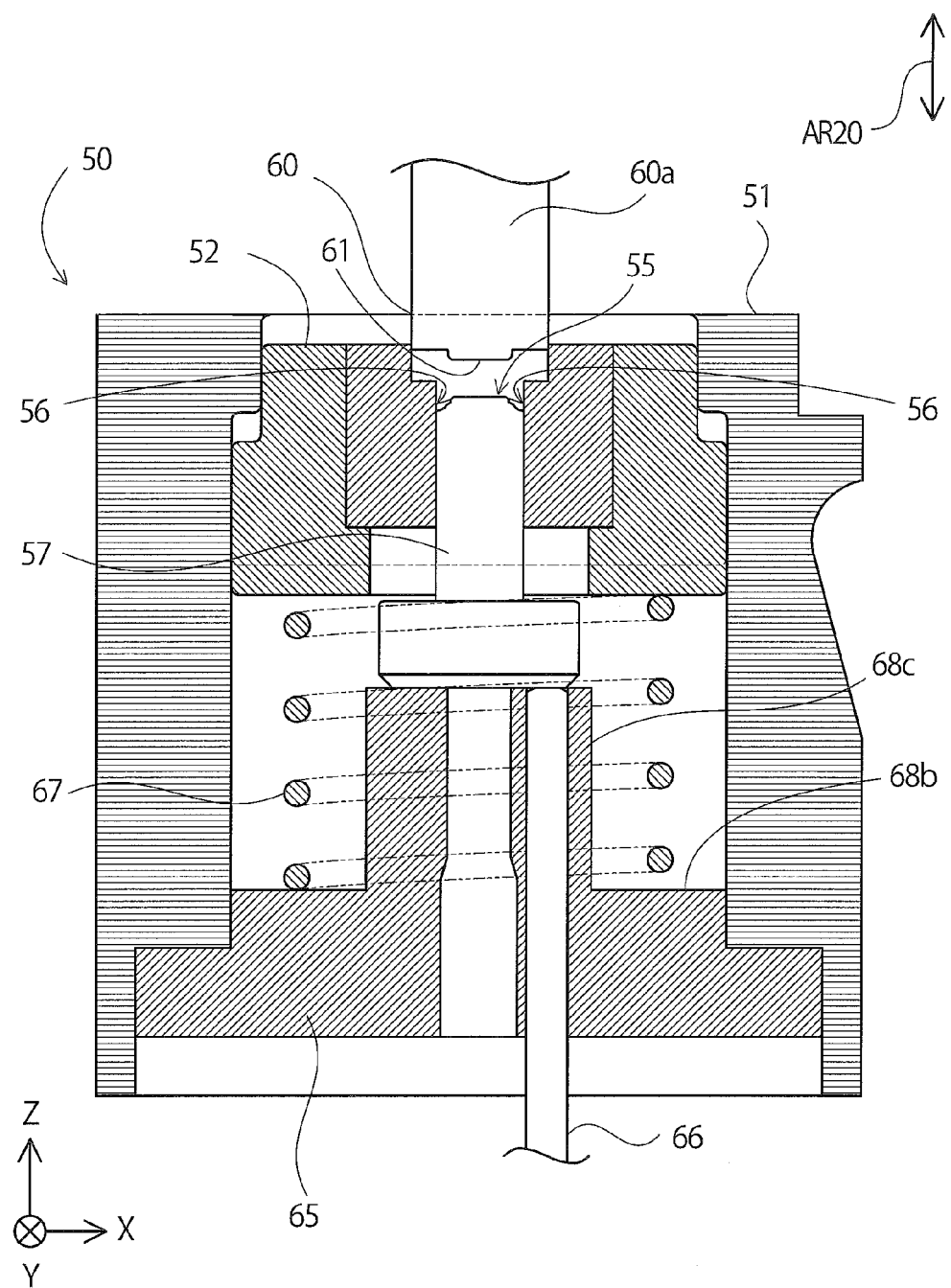
FIG. 22 is a front cross-sectional view of the exemplary configuration of the second forging die assembly according to the first and second embodiments.
Figure 23:
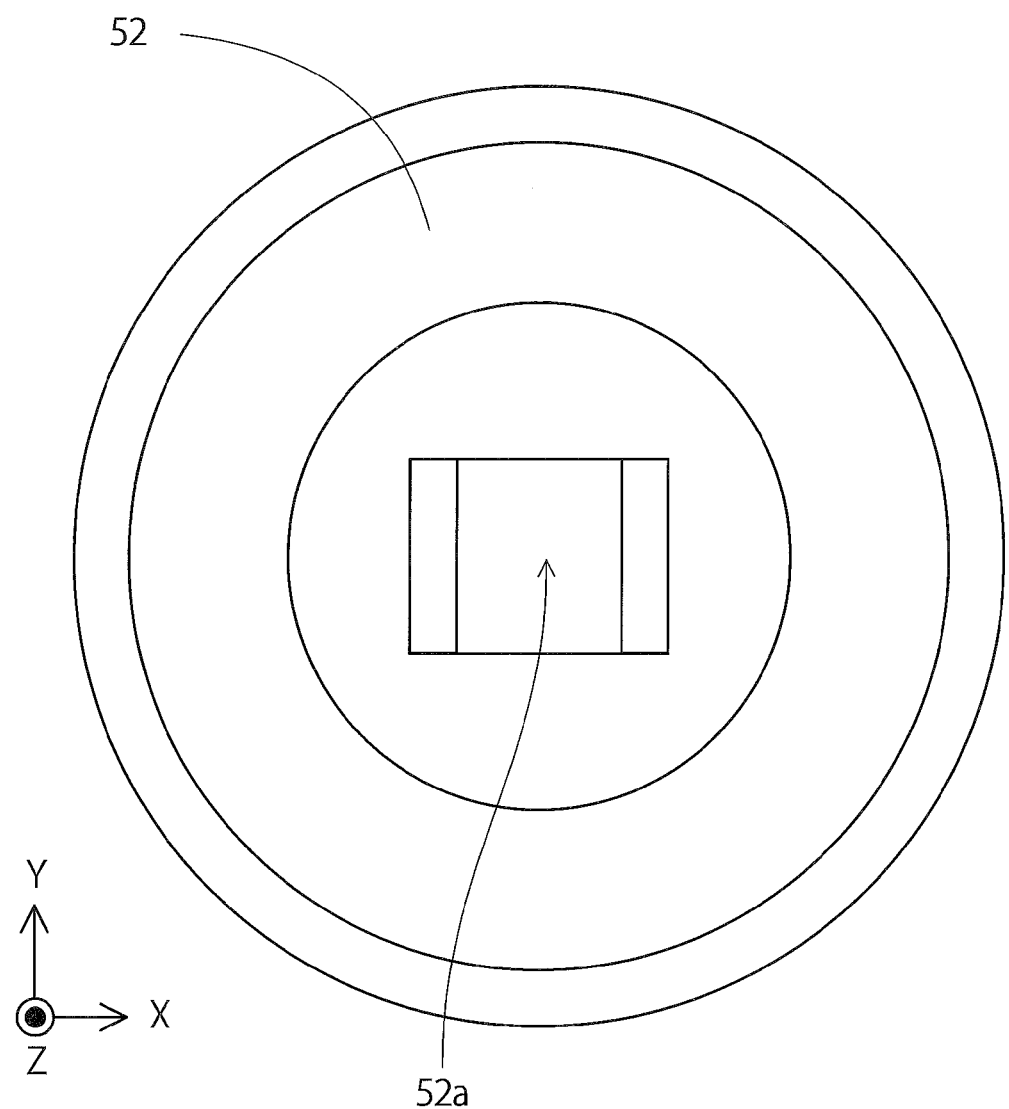
FIG. 23 is a plan view of an exemplary configuration of a second die according to the first and second embodiments.
Figure 24:
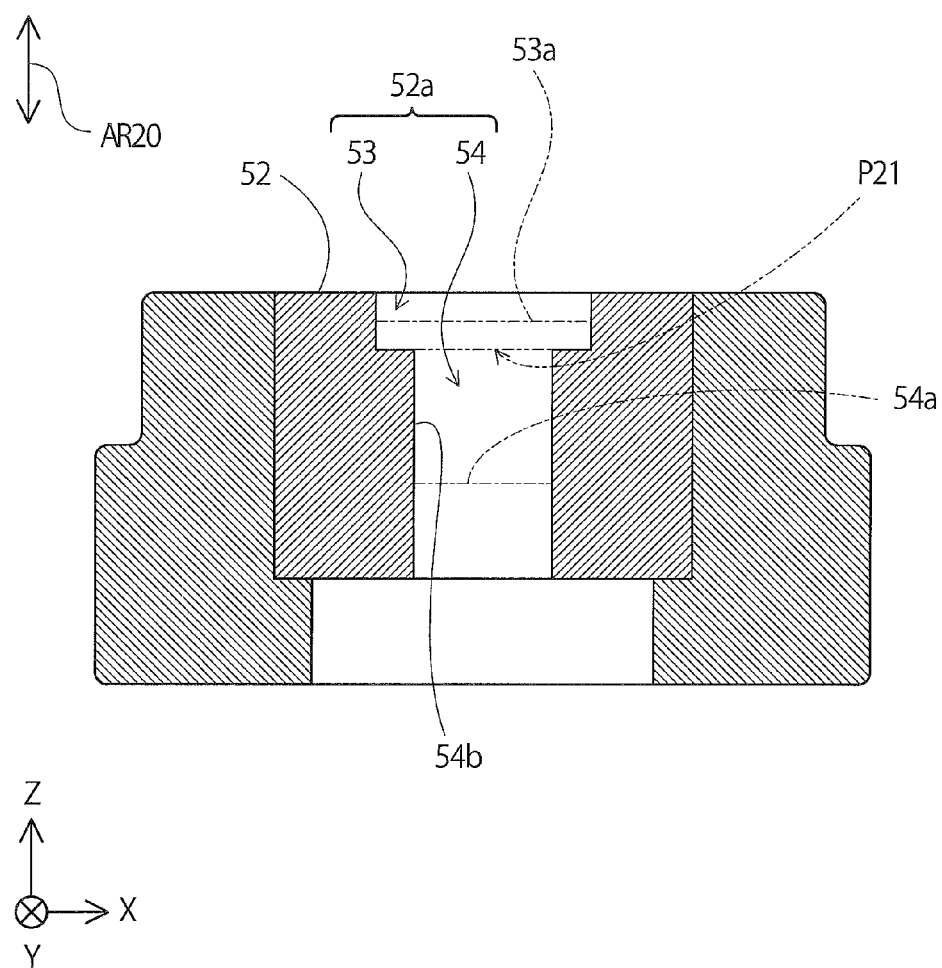
FIG. 24 is a front cross-sectional view of the exemplary configuration of the second die according to the first and second embodiments.
Figure 25:
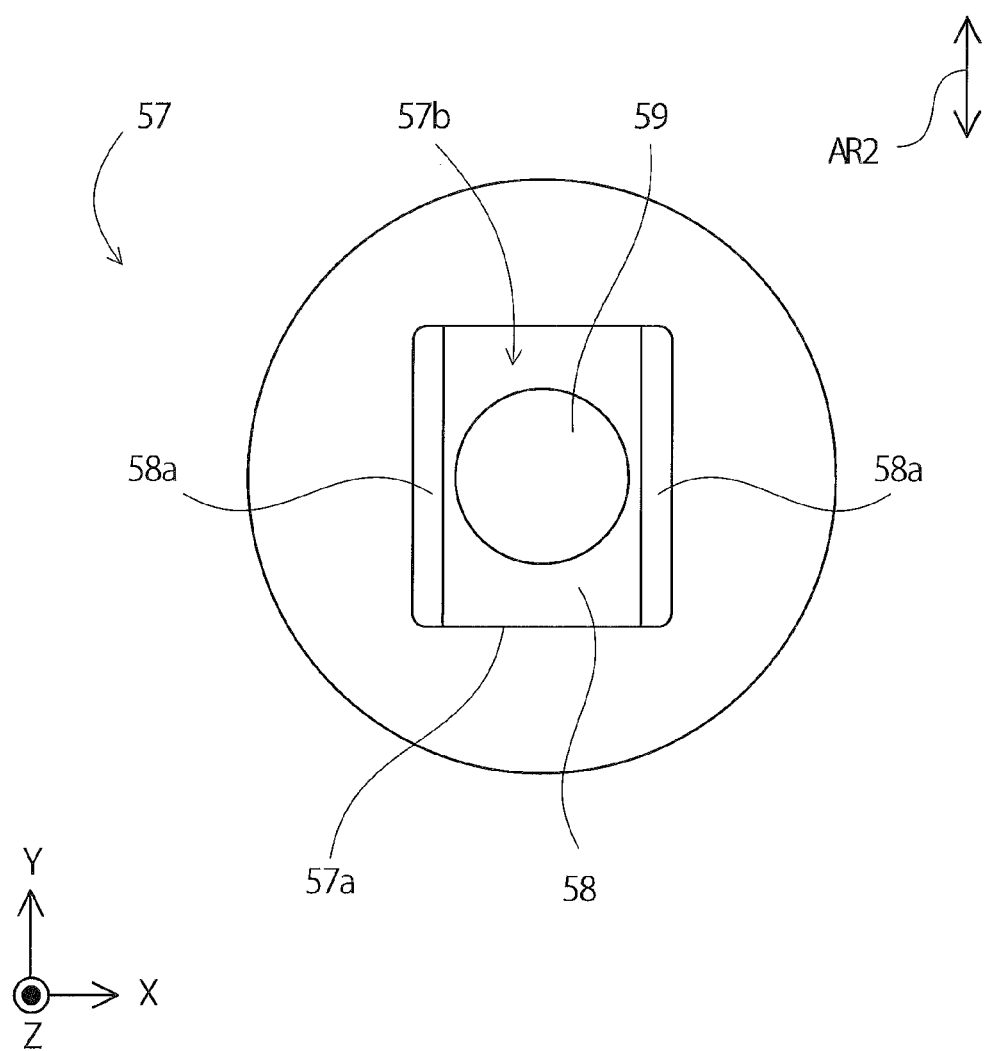
FIG. 25 is a plan view of an exemplary configuration of a second pin according to the first and second embodiments.
Figure 26:
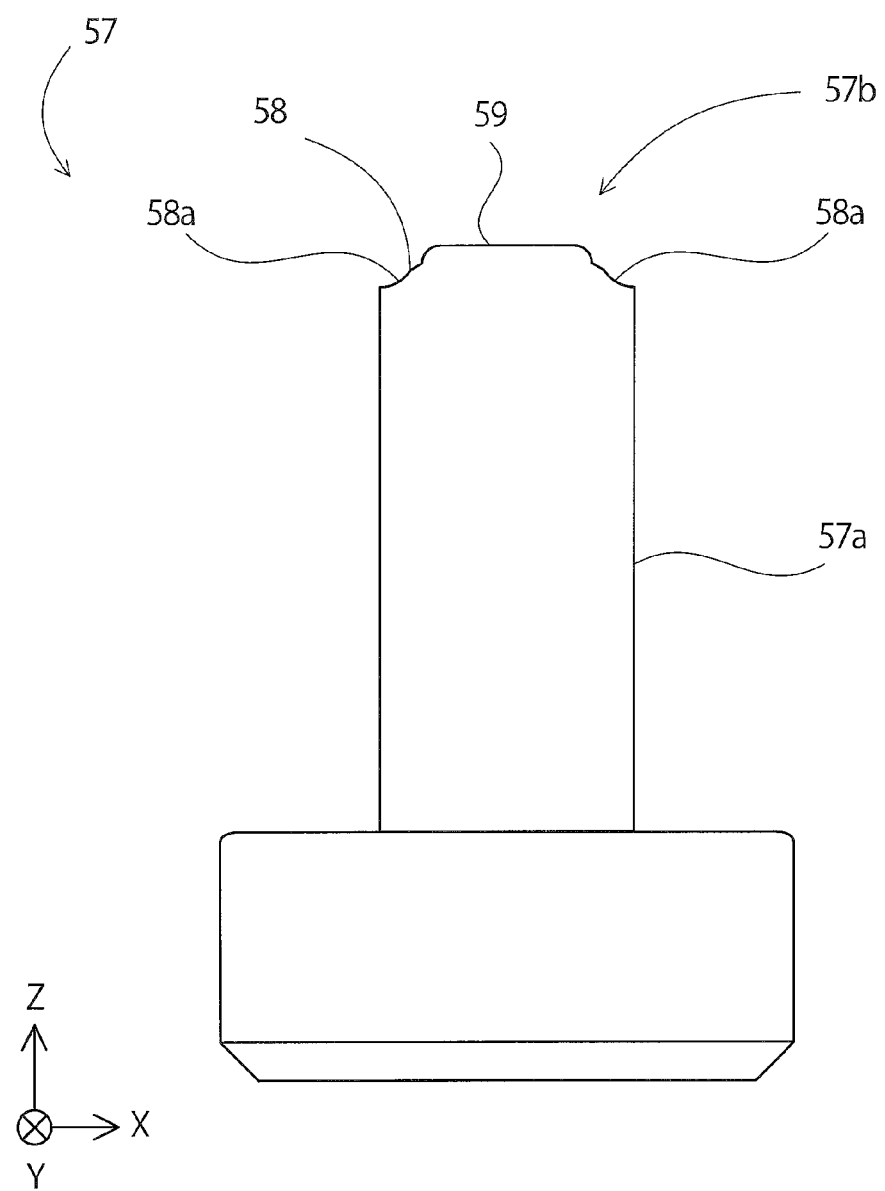
FIG. 26 is a front view of the exemplary configuration of the second pin according to the first and second embodiments.
Figure 27:
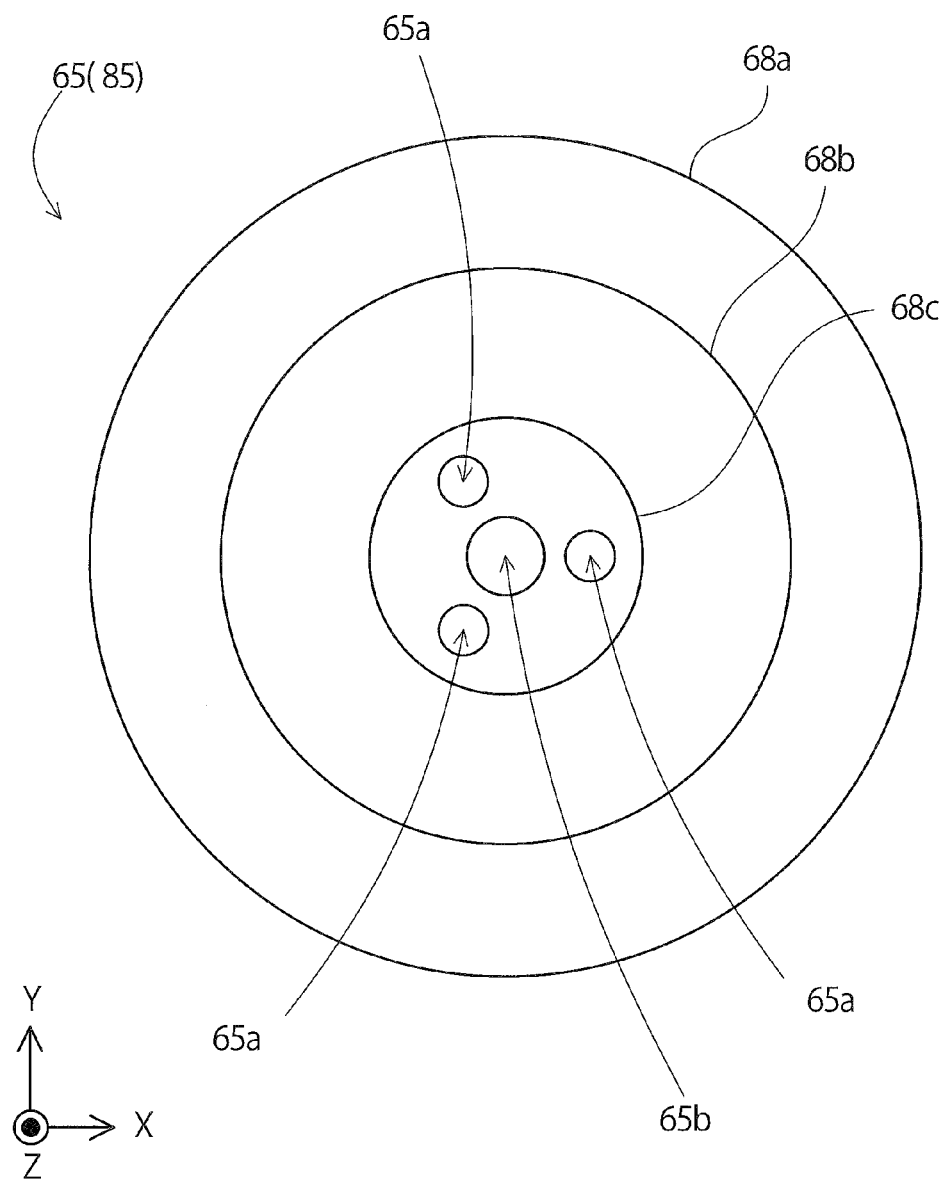
FIG. 27 is a plan view of an exemplary configuration of a first support according to the first and second embodiments.
Figure 28:
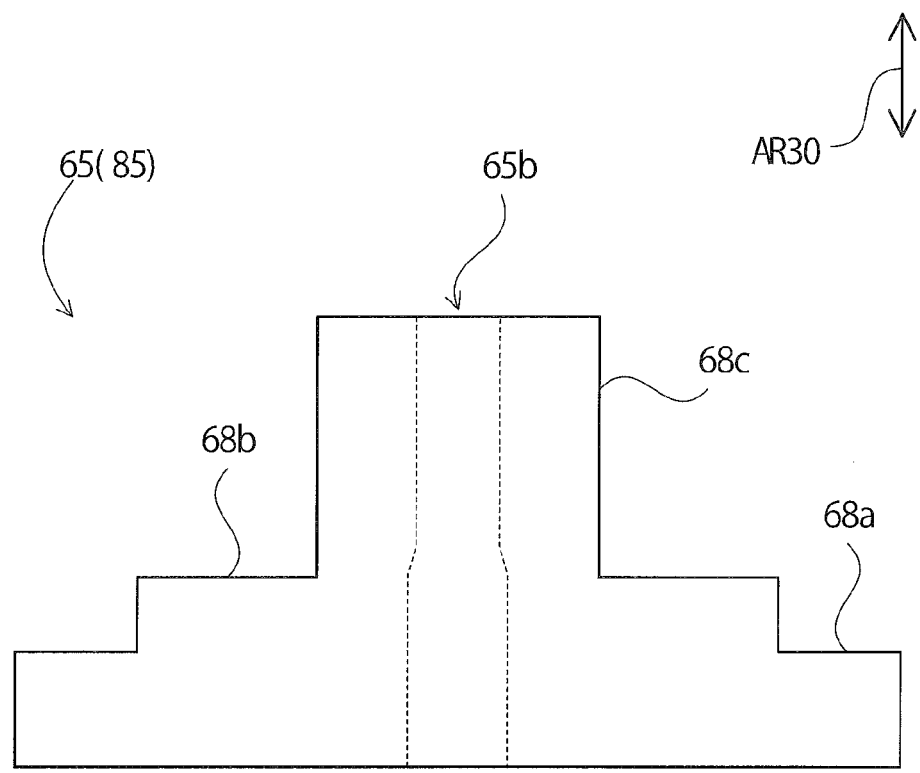
FIG. 28 is a front view of the exemplary configuration of the first support according to the first and second embodiments.

FIGS. 21 and 22 are front cross-sectional views of an exemplary configuration of the second forging die assembly 50. FIGS. 23 and 24 are respectively a plan view and a front cross-sectional view of an exemplary configuration of a second die 52. FIGS. 25 and 26 are respectively a plan view and a front view of an exemplary configuration of a second pin 57. FIGS. 27 and 28 are respectively a plan view and a front view of an exemplary configuration of a first support 65.

As illustrated in FIGS. 21 and 22, the second forging die assembly 50 mainly includes the second die 52, the second pin 57, a second punch 60, the first support 65, and a first biasing portion 67.

The second die 52, which is similar to the die 12, is a block to receive a blank and is accommodated in a die case 51. As illustrated in FIG. 24, the second die 52 has a second insertion hole 52a extending in one direction (Z-axis direction).

The second pin 57 is fitted in the second insertion hole 52a to define a second processing space 55 (see FIGS. 21 and 22) for processing the blank in the second die 52. As illustrated in FIGS. 25 and 26, the second pin 57 mainly includes a second pin shank 57a, a second platform 58, and a first protrusion 59.

The second pin shank 57a is a rod-shaped member inserted in the second insertion hole 52a. As illustrated in FIG. 25, the second pin shank 57a has a rectangular external shape. The second platform 58 is disposed on one end 57b of the second pin shank 57a. As illustrated in FIGS. 25 and 26, second inclined walls 58a extending in the extending direction are disposed on both sides of the second platform 58.

The first protrusion 59 protrudes from a central portion of the second platform 58. As illustrated in FIG. 25, the first protrusion 59 has a circular external shape. The first protrusion 59 presses the blank to preliminarily form a depression, which is to be part of the through hole 5a in the main body 7 of the self-piercing and clinch nut 4.

The second punch 60 is movable to and away from the second processing space 55. As illustrated in FIGS. 21 and 22, the second punch 60 mainly includes a second punch shank 60a and a second protrusion 61. The movement direction of the second punch 60 is set to be a direction of arrow AR20 (Z-axis direction: second movement direction).

The second punch shank 60a, which is similar to the second pin shank 57a, is a rod-shaped member inserted in the second insertion hole 52a. The second punch shank 60a has a rectangular external shape. The second protrusion 61 protrudes from one end of the second punch shank 60a. As illustrated in FIGS. 21 and 22, the second protrusion 61 is formed on a central portion of the end surface of the second punch shank 60a. The second protrusion 61 has a circular external shape. The second protrusion 61 presses the blank to preliminarily form a depression, which is to be part of the through hole 5a in the pilot portion 6 of the self-piercing and clinch nut 4.

As illustrated in FIGS. 27 and 28, the first support 65 mainly includes a base 68a, a terrace 68b, and a solid cylindrical portion 68c. The terrace 68b is disposed on the base 68a. The solid cylindrical portion 68c is disposed on the terrace 68b. A punch insertion hole 65b extending in a direction of arrow AR30 is formed in the center of the base 68a, the terrace 68b, and the solid cylindrical portion 68c. As illustrated in FIGS. 21 and 22, the second pin 57 is mounted on the solid cylindrical portion 68c.

As illustrated in FIG. 27, three pin insertion holes 65a are formed in the solid cylindrical portion 68c. A corresponding knockout pin 66 (see FIGS. 21 and 22) is movable in each pin insertion hole 65a. Consequently, when the three knockout pins 66 (only one of them is illustrated in FIGS. 21 and 22 for convenience of illustration) approach the second punch 60 along the corresponding pin insertion holes 65a, the second pin 57 is moved along the second insertion hole 52a. This movement of the second pin 57 causes the blank in the second processing space 55 to be discharged from the second forging die assembly 50.

The first biasing portion 67 is an elastic member made up of a compression spring, for example. As illustrated in FIGS. 21 and 22, one end of the first biasing portion 67 is secured to the second die 52 while the other end of the first biasing portion 67 is secured to the terrace 68b of the first support 65.

Thus, when the second punch 60 presses the blank in the second processing space 55 and when the second die 52 is moved from a position indicated by the single-dashed line in FIG. 22 to a position indicated by the solid line in FIG. 22, the first biasing portion 67 biases the second die 52 toward the second punch 60. Consequently, when the pressing force from the second punch 60 is released, the biasing force from the first biasing portion 67 causes the second die 52 to return to the position indicated by the single-dashed line in FIG. 22 (namely, the position illustrated in FIG. 21).

As illustrated in FIG. 24, the second insertion hole 52a includes a second movement hole 53 and a second fitting hole 54. Specifically, the second movement hole 53 is the portion of the second insertion hole 52a in which the second punch 60 is movable. The second fitting hole 54 is the portion of the second insertion hole 52a in which the second pin 57 is fitted.

The second movement hole 53 has a rectangular third region 53a in the direction perpendicular to the movement direction of the second punch 60, as illustrated in FIGS. 23 and 24. The area of the third region 53a (see FIG. 24) of the second movement hole 53 is approximately the same at each portion of the second movement hole 53 (at each position in the movement direction of the second punch 60).

The second fitting hole 54 has a rectangular fourth region 54a in the direction perpendicular to the movement direction of the second punch 60, as illustrated in FIGS. 23 and 24. The area of the fourth region 54a (see FIG. 24) of the second fitting hole 54 is approximately the same at each portion of the second fitting hole 54 (at each position in the movement direction of the second punch 60). At a position P21 where the second movement hole 53 and the second fitting hole 54 are connected to each other, the area of the third region 53a is larger than the area of the fourth region 54a.

The second pin 57 is fitted in the second fitting hole 54 in such a manner that the second platform 58 and the first protrusion 59 of the second pin 57 are opposed to the blank in the second processing space 55. Consequently, the inner surface 54b (see FIG. 24) of the second die 52 that faces the second fitting hole 54 and the first inclined walls 38a (see FIGS. 25 and 26) on both sides of the first platform 38 define second processing grooves 56 (see FIGS. 21 and 22).

1.6. Configuration of the Third Forging Die Assembly

Figure 29:
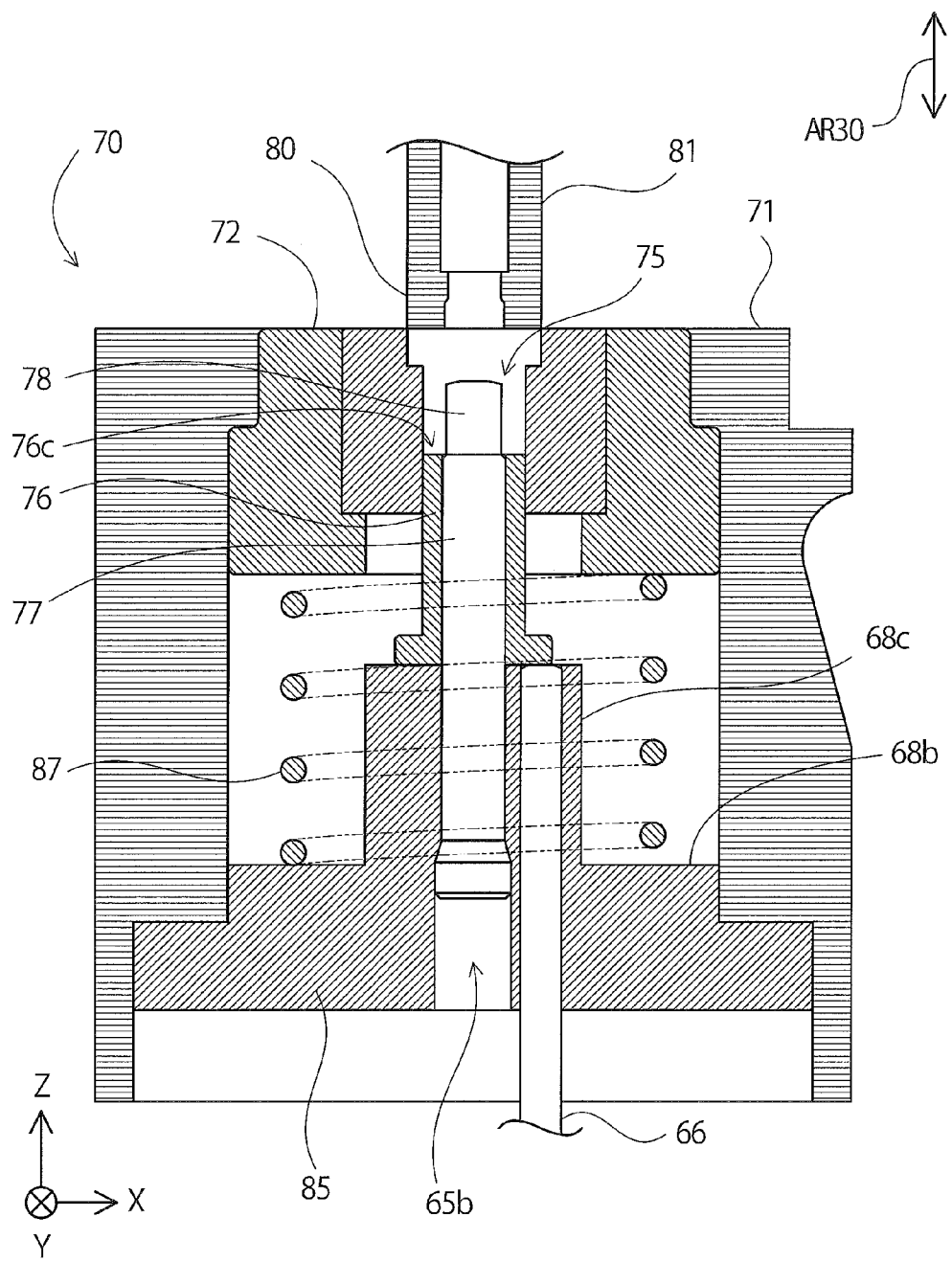
FIG. 29 is a front cross-sectional view of an exemplary configuration of a third forging die assembly according to the first and second embodiments.
Figure 30:
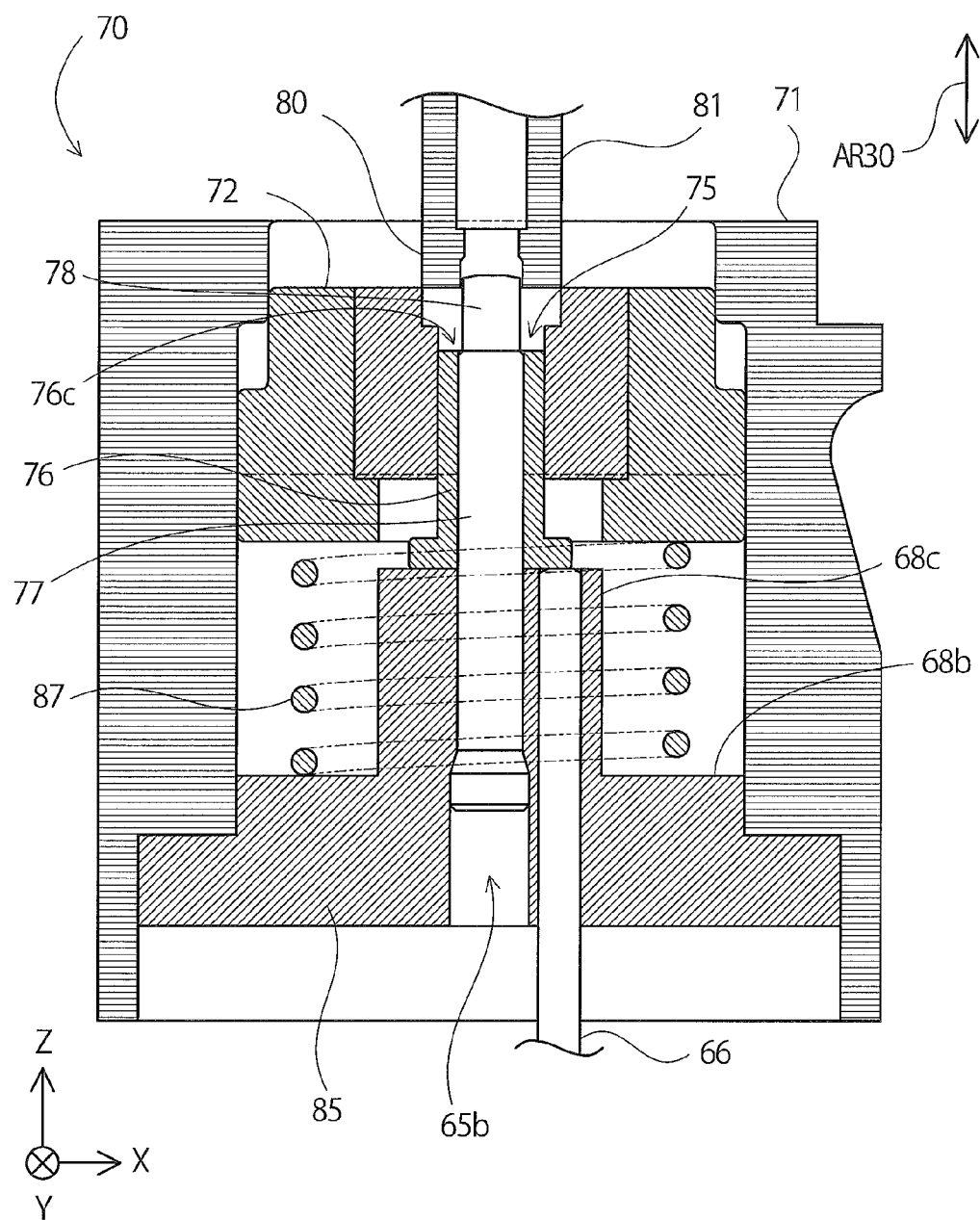
FIG. 30 is a front cross-sectional view of the exemplary configuration of the third forging die assembly according to the first and second embodiments.
Figure 31:
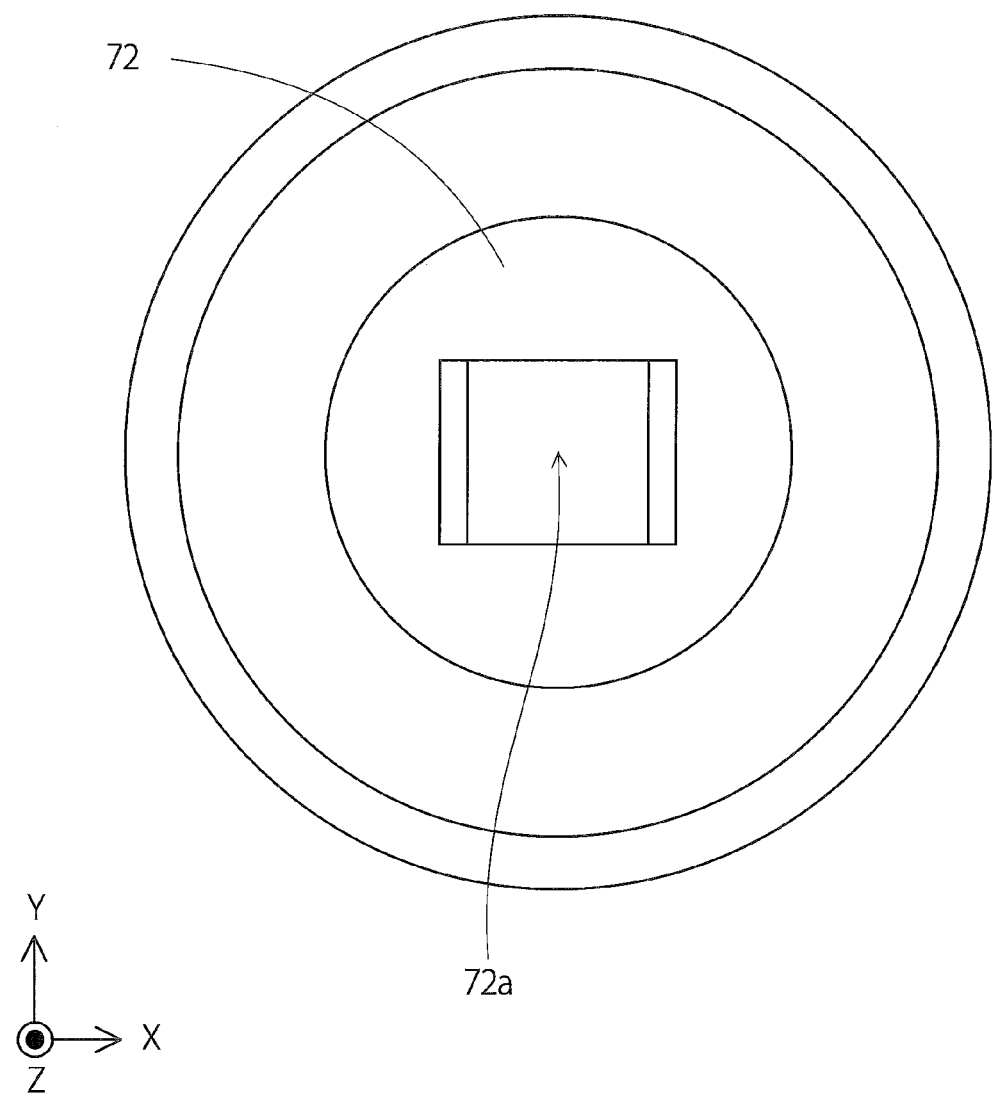
FIG. 31 is a plan view of an exemplary configuration of a third die according to the first and second embodiments.
Figure 32:
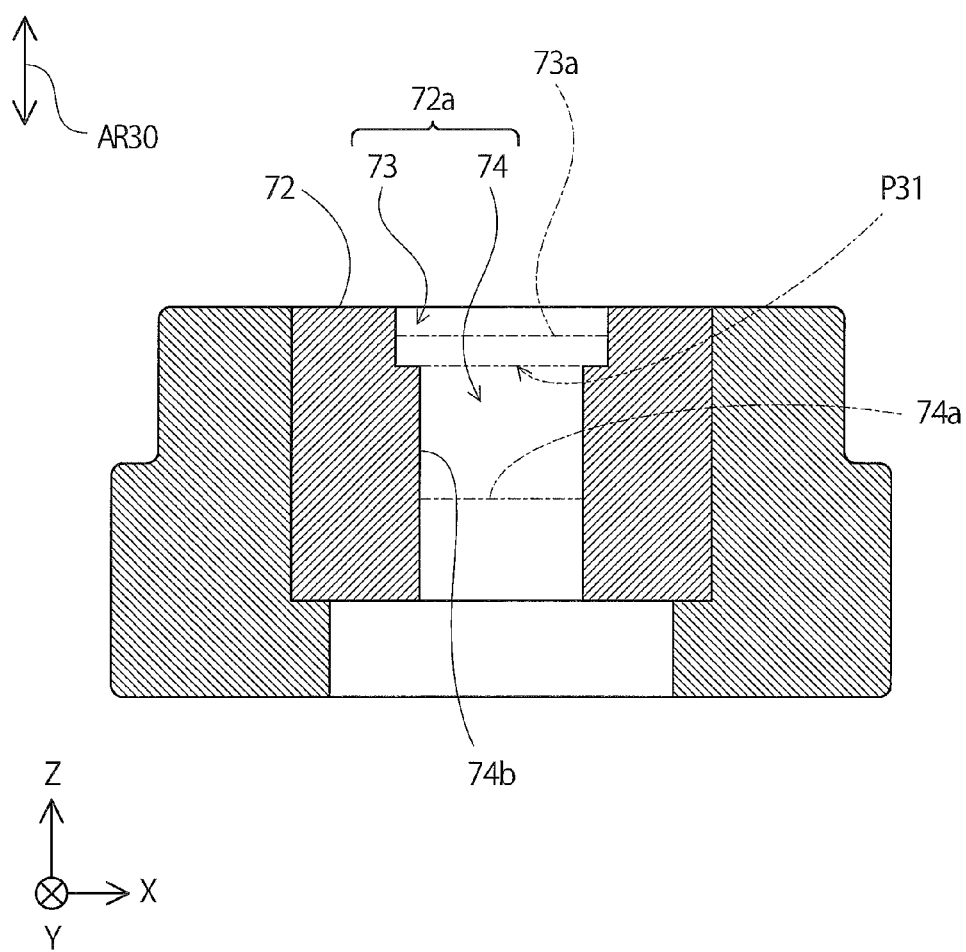
FIG. 32 is a front cross-sectional view of the exemplary configuration of the third die according to the first and second embodiments.
Figure 33:
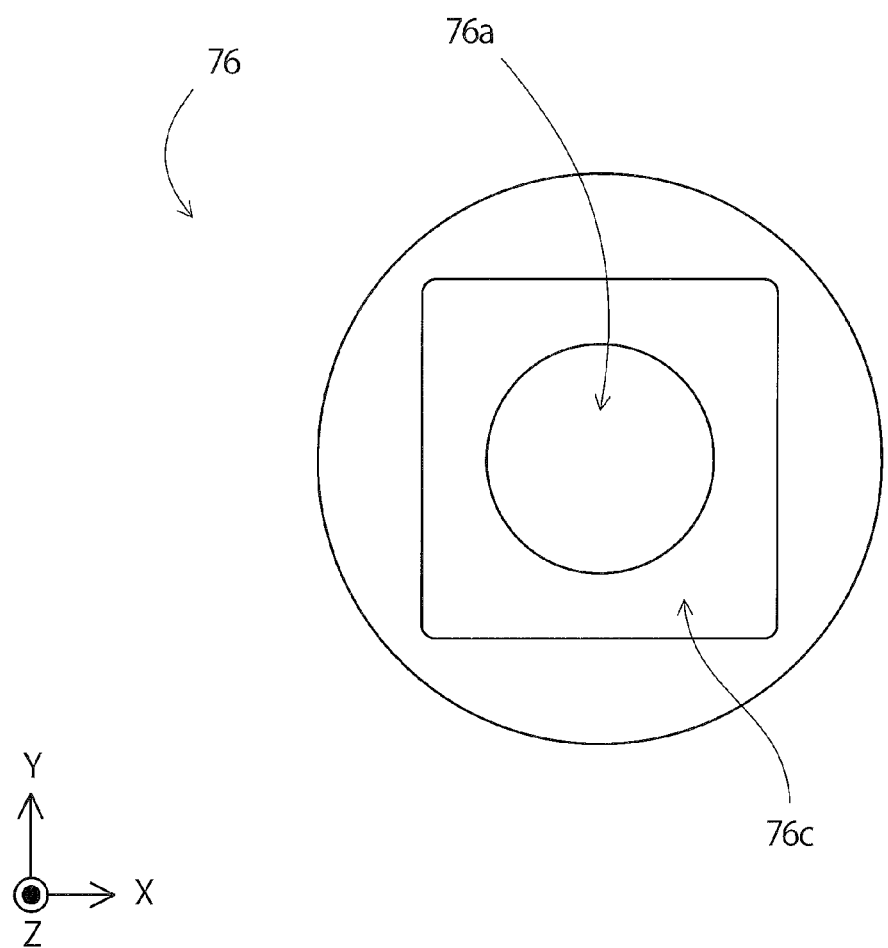
FIG. 33 is a plan view of an exemplary configuration of a guide according to the first and second embodiments.
Figure 34:
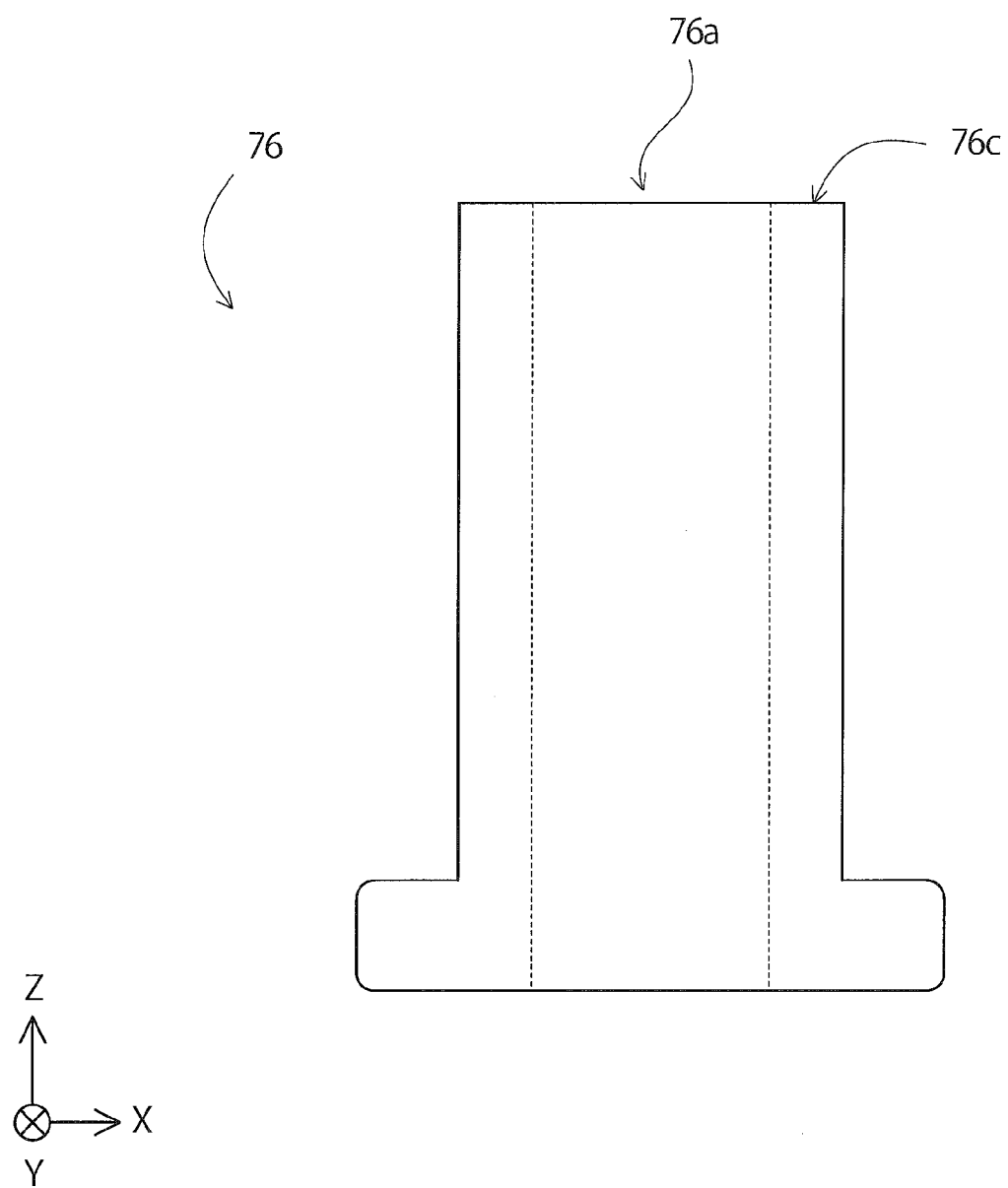
FIG. 34 is a front view of the exemplary configuration of the guide according to the first and second embodiments.

FIGS. 29 and 30 are front cross-sectional views of an exemplary configuration of the third forging die assembly 70. FIGS. 31 and 32 are respectively a plan view and a front cross-sectional view of an exemplary configuration of a third die 72. FIGS. 33 and 34 are respectively a plan view and a front view of an exemplary configuration of a guide 76.

As illustrated in FIGS. 29 and 30, the third forging die assembly 70 mainly includes the third die 72, the guide 76, a fourth punch 77, a third punch 80, a second support 85, and a second biasing portion 87.

The third die 72, which is similar to the die 12, is a block to receive a blank and is accommodated in a die case 71. As illustrated in FIG. 32, the third die 72 has a third insertion hole 72a extending in one direction (Z-axis direction).

The guide 76 is a hollow cylindrical member having a hole 76a. As illustrated in FIGS. 33 and 34, a pillar 76b of the guide 76 has a rectangular external shape. The hole 76a has a circular internal shape.

The fourth punch 77 is a rod-shaped punch and has a distal end 78 of a circular external shape. The guide 76 is fitted in the third insertion hole 72a, and the fourth punch 77 is fitted in the hole 76a so as to define a third processing space 75 for processing the blank (see FIGS. 29 and 30).

The third punch 80 is a punch movable to and away from the third processing space 75 and includes a hollow cylindrical portion 81 to receive a scrap, as illustrated in FIGS. 29 and 30. The movement direction of the third punch 80 is set to be a direction of arrow AR30 (Z-axis direction: third movement direction).

The second support 85 has a hardware configuration similar to the first support 65 of the second forging die assembly 50. As illustrated in FIGS. 29 and 30, the second support 85 mainly includes a base 68a, a terrace 68b, and a solid cylindrical portion 68c. The terrace 68b is disposed on the base 68a. The solid cylindrical portion 68c is disposed on the terrace 68b. The fourth punch 77 is secured in the punch insertion hole 65b of the second support 85.

When the three knockout pins 66 (only one of them is illustrated in FIGS. 29 and 30 for convenience of illustration) approach the third punch 80 along the corresponding pin insertion holes 65a (see FIG. 27), the guide 76 is moved along the third insertion hole 72a. This movement of the guide 76 causes the blank in the third processing space 75 to be discharged from the third forging die assembly 70.

The second biasing portion 87, which is similar to the first biasing portion 67, is an elastic member made up of a compression spring, for example. As illustrated in FIGS. 29 and 30, one end of the second biasing portion 87 is secured to the third die 72 while the other end of the second biasing portion 87 is secured to the terrace 68b of the second support 85.

Thus, when the third punch 80 presses the blank in the third processing space 75 and when the third die 72 is moved from a position indicated by the single-dashed line in FIG. 30 to a position indicated by the solid line in FIG. 30, the second biasing portion 87 biases the third die 72 toward the third punch 80. Consequently, when the pressing force from the third punch 80 is released, the biasing force from the second biasing portion 87 causes the third die 72 to return to the position indicated by the single-dashed line in FIG. 30 (namely, the position illustrated in FIG. 29).

As illustrated in FIG. 32, the third insertion hole 72a includes a third movement hole 73 and a third fitting hole 74. Specifically, the third movement hole 73 is the portion of the third insertion hole 72a in which the third punch 80 is movable. The third fitting hole 74 is the portion of the third insertion hole 72a in which the guide 76 is fitted.

The third movement hole 73 has a rectangular fifth region 73a in the direction perpendicular to the movement direction of the third punch 80, as illustrated in FIGS. 31 and 32. The area of the fifth region 73a (see FIG. 32) of the third movement hole 73 is approximately the same at each portion of the third movement hole 73 (at each position in the movement direction of the third punch 80).

The third fitting hole 74 has a rectangular sixth region 74a in the direction perpendicular to the movement direction of the third punch 80, as illustrated in FIGS. 31 and 32. The area of the sixth region 74a (see FIG. 32) of the third fitting hole 74 is approximately the same at each portion of the third fitting hole 74 (at each position in the movement direction of the third punch 80). At a position P31 where the third movement hole 73 and the third fitting hole 74 are connected to each other, the area of the fifth region 73*a* is larger than the area of the sixth region 74*a*.

1.7. Forging by the Production Apparatus in the First Embodiment

Figure 35:
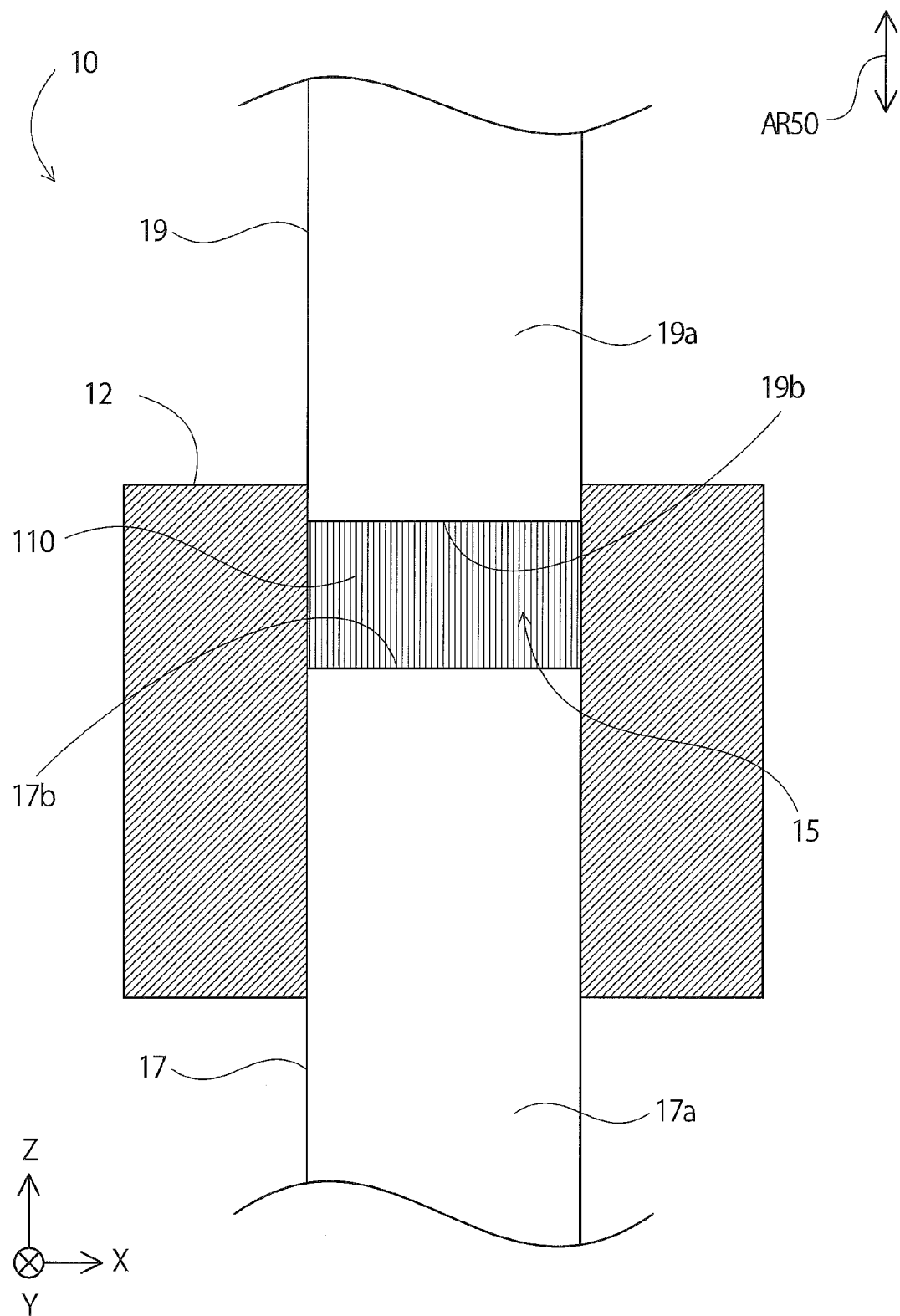
FIG. 35 is a front cross-sectional view of the fifth forging die assembly, illustrating a forging step by the fifth forging die assembly according to the first embodiment.
Figure 36:
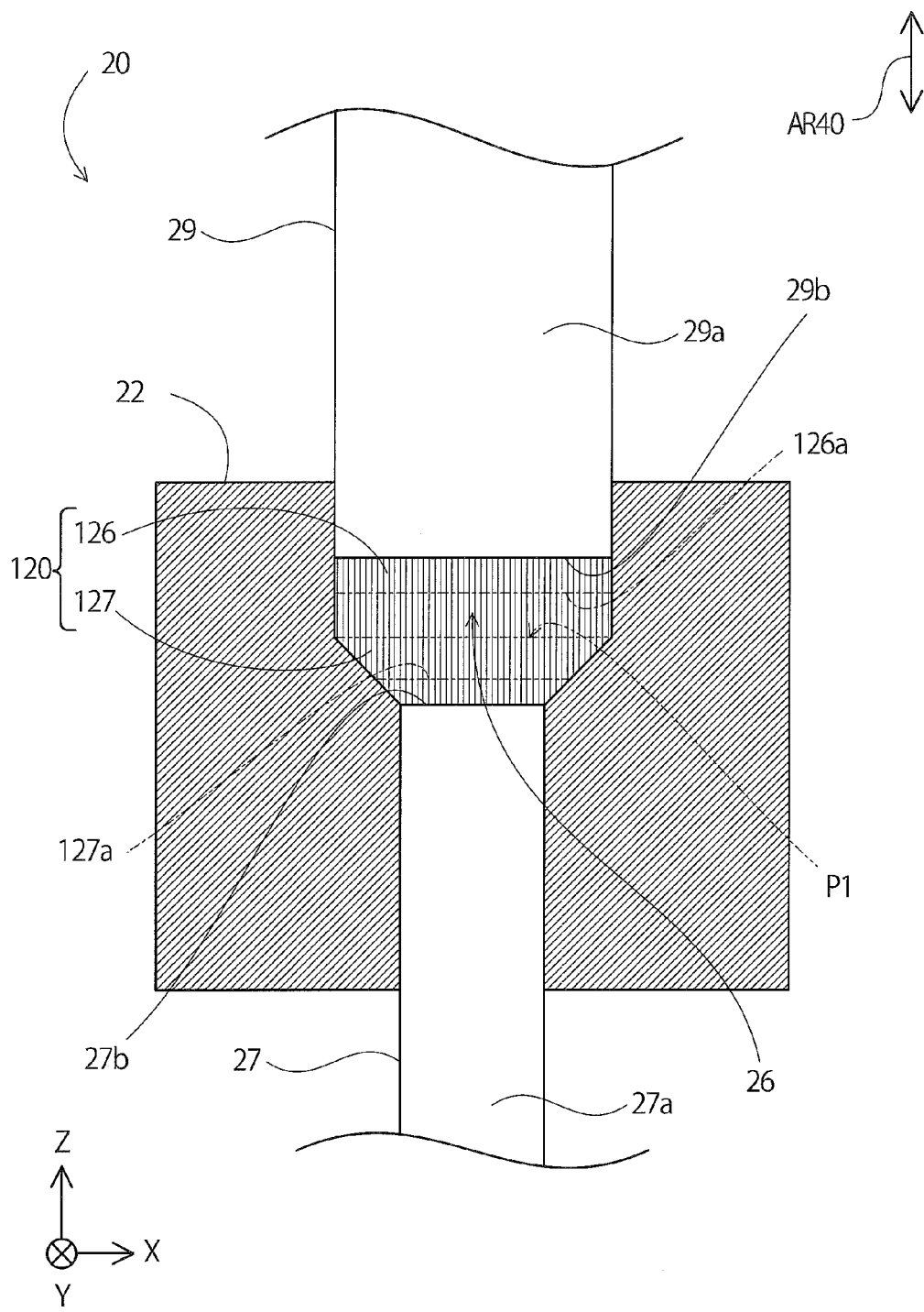
FIG. 36 is a front cross-sectional view of the fourth forging die assembly, illustrating a forging step by the fourth forging die assembly according to the first embodiment.
Figure 37:
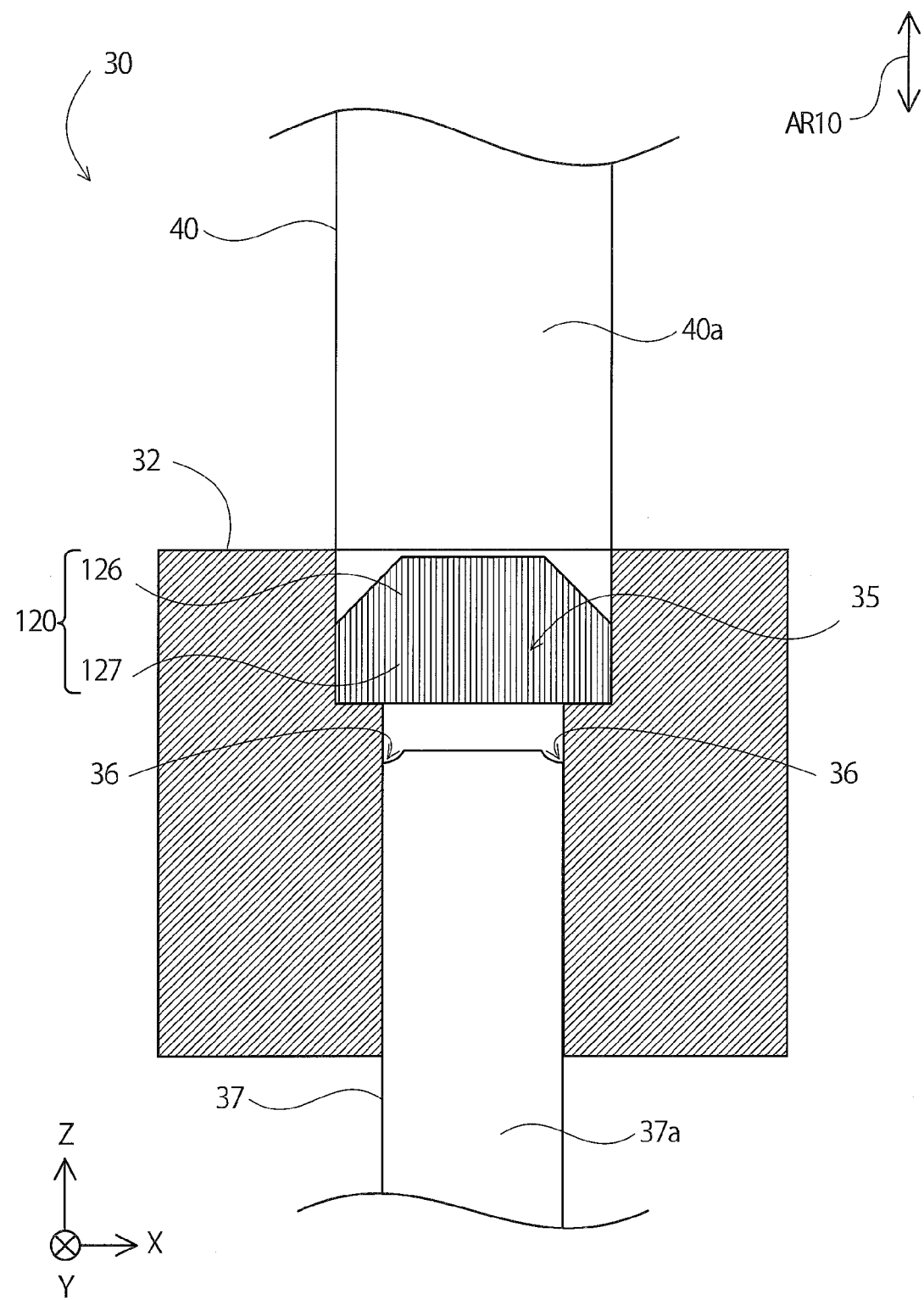
FIG. 37 is a front cross-sectional view of the first forging die assembly, illustrating a forging step by the first forging die assembly according to the first embodiment.
Figure 38:
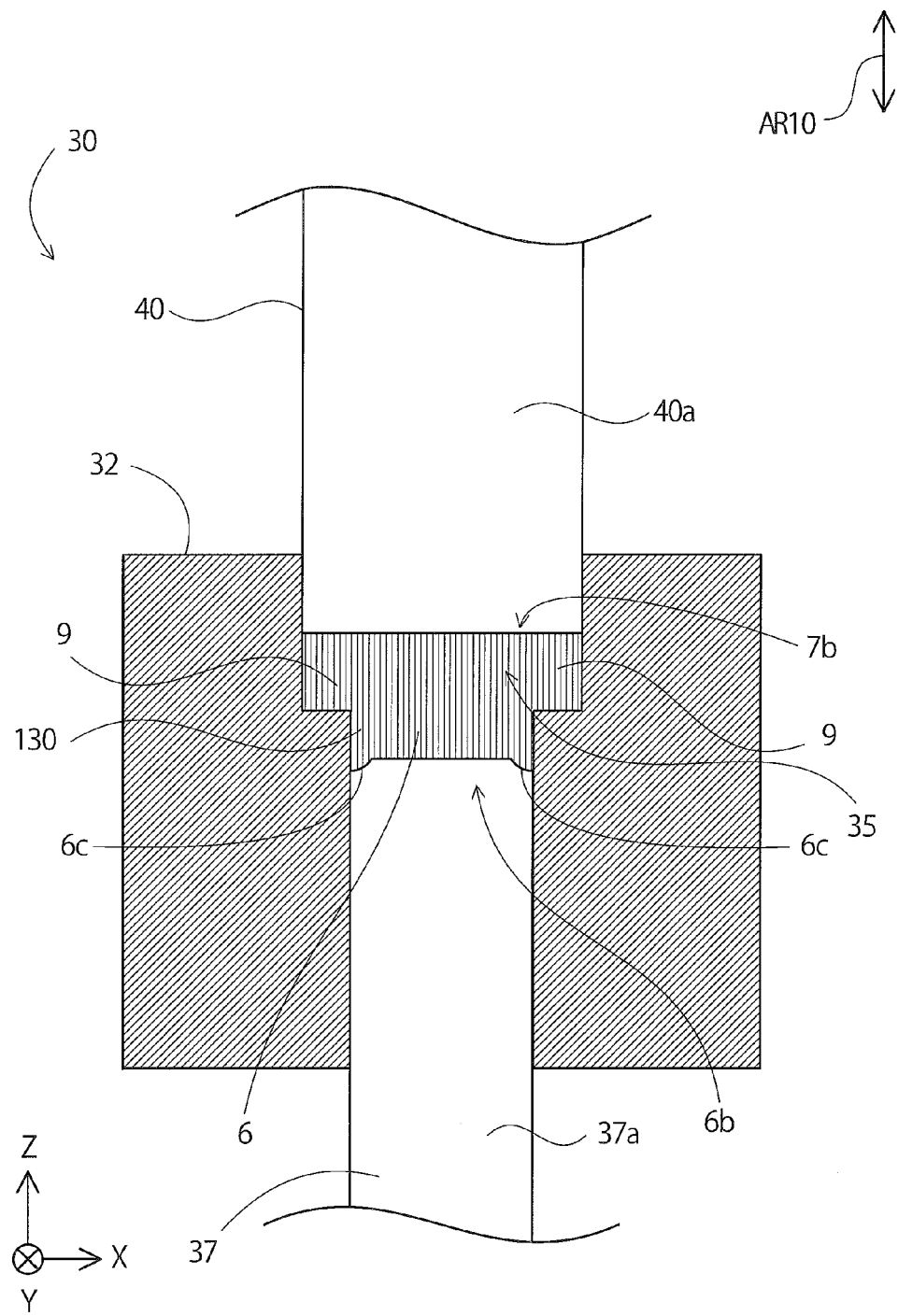
FIG. 38 is a front cross-sectional view of the first forging die assembly, illustrating the forging step by the first forging die assembly according to the first embodiment.
Figure 39:
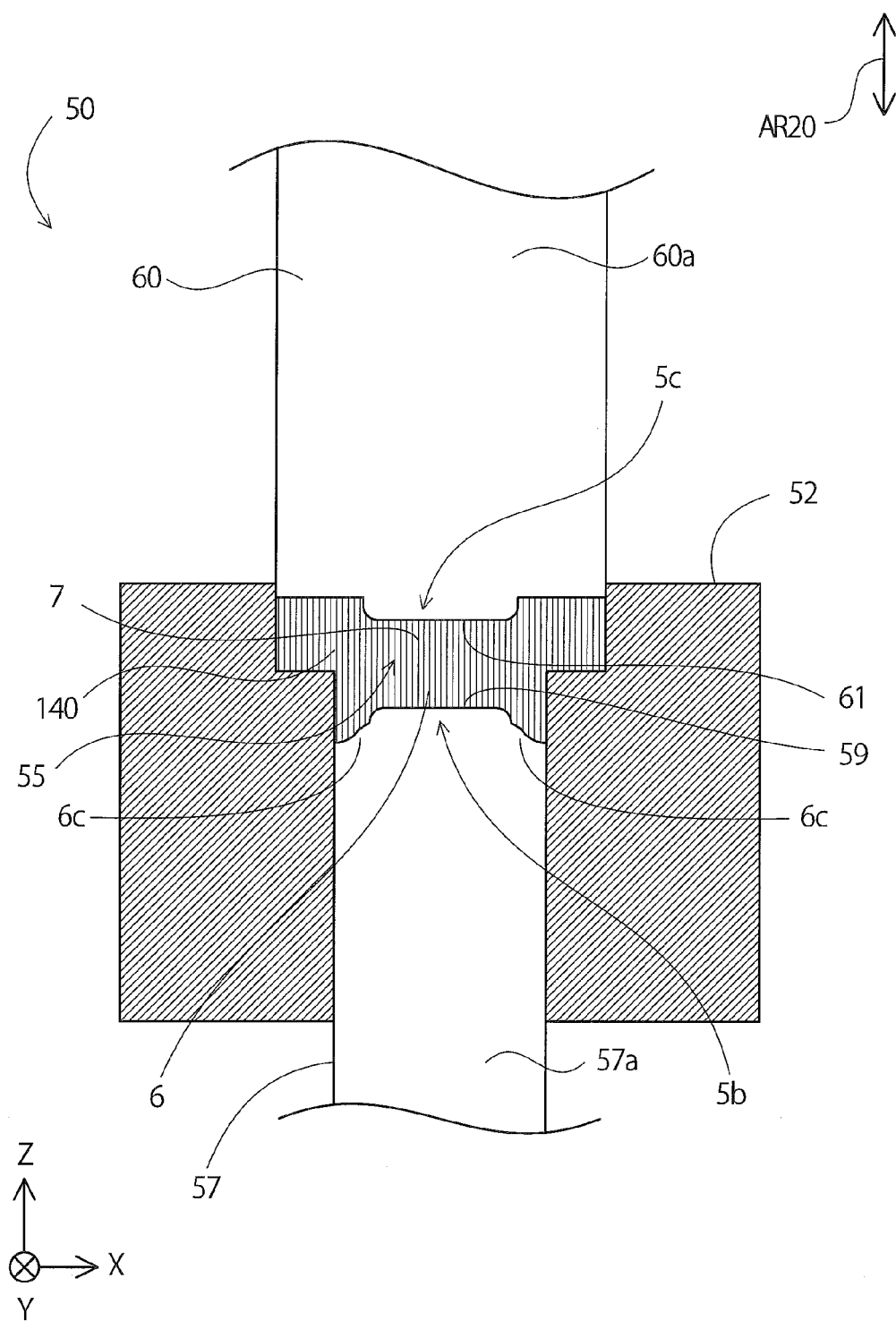
FIG. 39 is a front cross-sectional view of the second forging die assembly, illustrating a forging step by the second forging die assembly according to the first embodiment.
Figure 40:
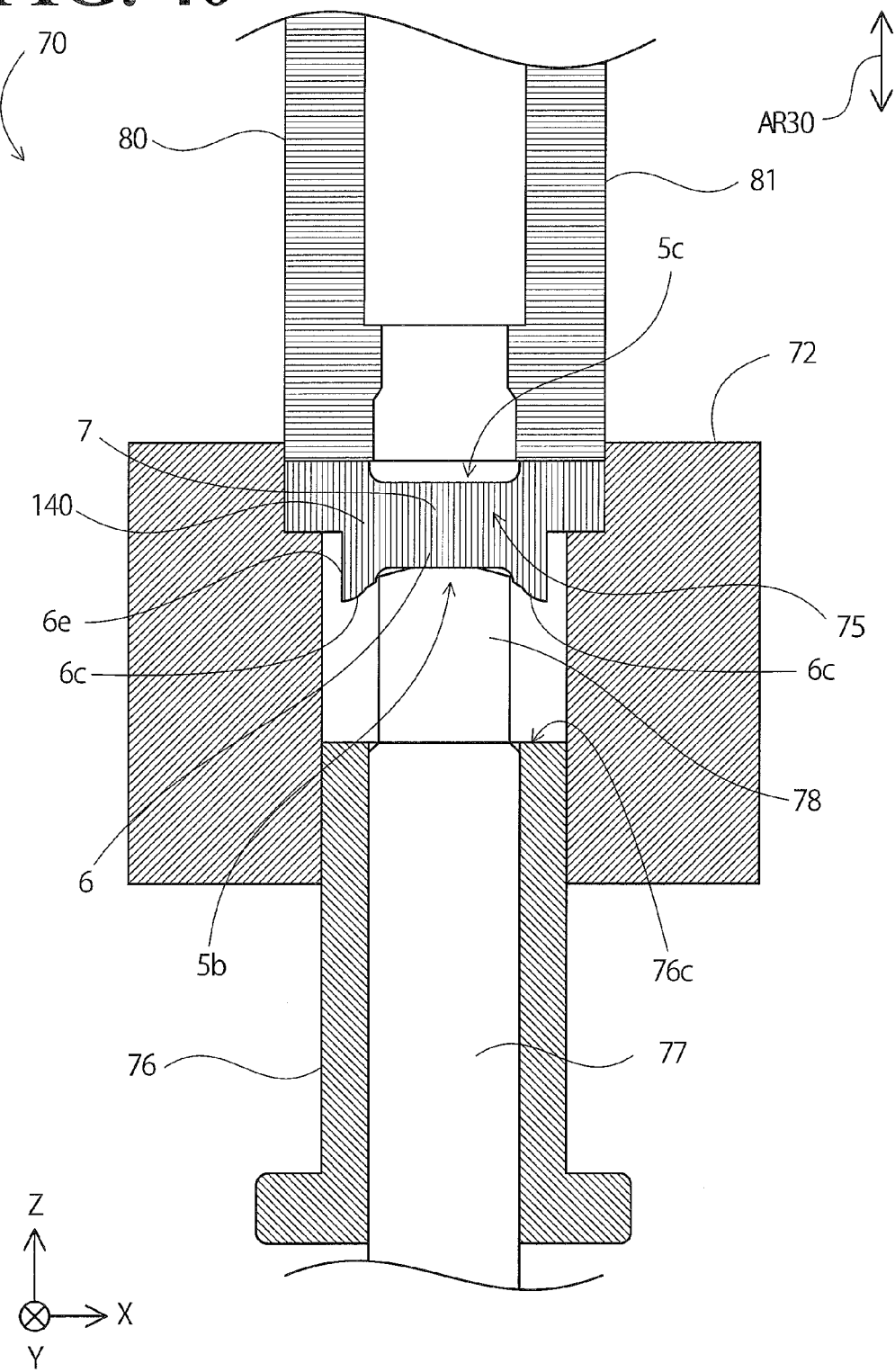
FIG. 40 is a front cross-sectional view of the third forging die assembly, illustrating a forging step by the third forging die assembly according to the first embodiment.
Figure 41:
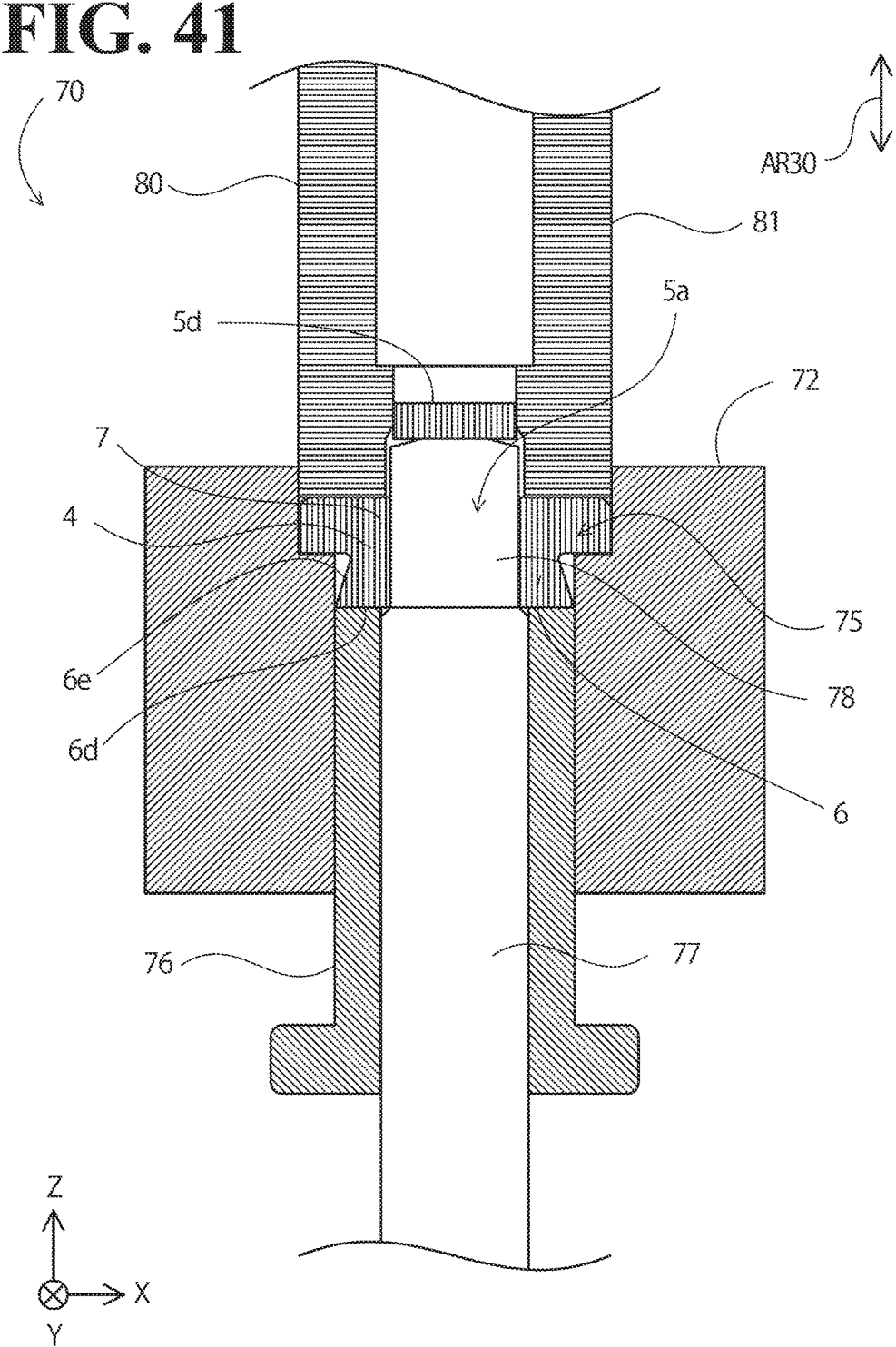
FIG. 41 is a front cross-sectional view of the third forging die assembly, illustrating the forging step by the third forging die assembly according to the first embodiment.

FIGS. 35 and 36 are respectively front cross-sectional views of the forging die assemblies 10 and 20, illustrating forging steps by the forging die assemblies 10 and 20. FIGS. 37 and 38 are front cross-sectional views of the first forging die assembly 30, illustrating a forging step by the first forging die assembly 30. FIG. 39 is a front cross-sectional view of the second forging die assembly 50, illustrating a forging step by the second forging die assembly 50. FIGS. 40 and 41 are front cross-sectional views of the third forging die assembly 70, illustrating a forging step by the third forging die assembly 70. By referring to FIGS. 35 to 41, the forging steps performed by the production apparatus 100 will be described.

First, in the forging step (fifth processing) by the forging die assembly 10, as illustrated in FIG. 35, a cut piece in the processing space 15 is clamped between the pin 17 and the punch 19. Thus, the cut piece is formed into a blank 110 having a rectangular parallelepiped or cubic shape.

Subsequently, the punch 19 is withdrawn from the processing space 15, and the pin 17 is moved toward the punch 19. Then, the blank 110, which has been processed preliminarily, is discharged from the processing space 15 and gripped by the gripper 96*a* of the transfer mechanism 95 (see FIG. 4). The blank 110, which has been gripped by the gripper 96*a*, is transferred from the forging die assembly 10 to the forging die assembly 20 (see FIG. 5).

Next, in the forging step (fourth processing) by the forging die assembly 20, the blank 110, which has been transferred from the processing space 15 and disposed in the processing space 26, is clamped between the pin 27 and the punch 29, as illustrated in FIG. 36. Thus, the blank 110, which has been processed by the forging die assembly 10, is formed into the blank 120 (first blank).

As illustrated in FIG. 36, the blank 120 at this stage includes a base 126 and a mountain-shaped portion 127 connected to the base 126. A first cross-section 126*a* of the base 126 in a direction perpendicular to the penetration direction has a rectangular shape. The area of the first region 126*a* is approximately the same at each portion of the base 126 (at each position in the penetration direction).

A second cross-section 127*a* of the mountain-shaped portion 127 in the direction perpendicular to the penetration direction has a rectangular shape. The area of the second cross-section 127*a* gradually decreases as the distance from the base 126 increases. At a position P1 where the base 126 and the mountain-shaped portion 127 are connected to each other, the first cross-section 126*a* has approximately the same area as the second cross-section 127*a*.

Subsequently, the punch 29 is withdrawn from the processing space 26, and the pin 27 is moved toward the punch 29. Then, the blank 120, which has been processed preliminarily, is discharged from the processing space 26 and gripped by the gripper 96*b* of the transfer mechanism 95 (see FIG. 4). At this time, the gripper 96*b* turns the gripped blank 120 by 180 degrees about the turning axis parallel to the first cross-section 126*a* (turning axis parallel to the Y-axis in FIG. 36, for example). Then, the blank 120 gripped by the gripper 96*b* is transferred from the forging die assembly 20 to the first forging die assembly 30 (see FIG. 5)

Subsequently, in the forging step (first processing) by the first forging die assembly 30, the blank 120, which has been forged in the forging die assembly 20 and disposed in the processing space 35, is clamped between the first pin 37 and the first punch 40, as illustrated in FIG. 37.

Thus, the pilot portion 6 is preliminarily formed (see FIG. 38) from part of the blank that is pressed from the first movement hole 33 into the first fitting hole 34 (see FIG. 16). On one end 6*b* of the pilot portion 6 preliminarily formed, ribs 6*c* are formed from part of the blank that is pressed into the first processing grooves 36 (see FIG. 37). Further, the flanges 9 are formed from part of the blank pressed along the inner surface 33*b* of the first die 32 which faces the movement hole 33.

Subsequently, the first punch 40 is withdrawn from the first processing space 35, and the first pin 37 is moved toward the first punch 40. Then, the blank 130, which has undergone the first processing, is discharged from the first processing space 35 and gripped by the gripper 96*c* of the transfer mechanism 95 (see FIG. 4). The blank 130, which has been gripped by the gripper 96*c*, is transferred from the first forging die assembly 30 to the second forging die assembly 50 (see FIG. 5).

Subsequently, in the forging step (second processing) by the second forging die assembly 50, the blank, which has been forged in the first forging die assembly 30 and disposed in the second processing space 55, is clamped between the second pin 57 and the second punch 60, as illustrated in FIG. 39. At this time, the pressing force from the second punch 60 moves the second die 52 in a direction of arrow AR20 toward the second pin 57.

Thus, the ribs 6*c* formed in the first forging die assembly 30 are pressed into the second processing grooves 56 (see FIGS. 21 and 22). The depressions 5*b* and 5*c* are respectively formed on the second pin 57 side of the pilot portion 6 and on the second punch 60 side of the main body 7. The depressions 5*b* and 5*c* are to be part of the through hole 5*a* (see FIGS. 2 and 3).

Subsequently, the second punch 60 is withdrawn from the second processing space 55, and the second pin 57 is moved toward the second punch 60. Then, the blank 140, which has undergone the second processing, is discharged from the second processing space 55 and gripped by the gripper 96*d* of the transfer mechanism 95 (see FIG. 4). The blank 140, which has been gripped by the gripper 96*d*, is transferred from the second forging die assembly 50 to the third forging die assembly 70 (see FIG. 5).

Subsequently, in the forging step (third processing) by the third forging die assembly 70, the blank 140, which has been forged in the second forging die assembly 50 and disposed in the third processing space 75, is clamped between the guide 76 and the fourth punch 77, and the third punch 80, as illustrated in FIG. 40. At this time, the pressing force from the third punch 80 moves the third die 72 in a direction of arrow AR30 toward the guide 76 and the fourth punch 77.

Thus, the through hole 5*a* is formed in the center of the pilot portion 6 and the main body 7, and a scrap 5*e* is caught by the hollow cylindrical portion 81 of the third punch 80. The inner surface 74*b* (see FIG. 32) of the third die 72 which faces the third fitting hole 74 and one end 76*c* of the guide 76 press the pilot portion 6 and the ribs 6*c* so as to flatten the end surface 6*d* of the pilot portion 6 on the guide 76 side. As illustrated in FIGS. 40 and 41, the outer surfaces 6*e* of the pilot portion 6 along the ribs 6*c* are inclined relative to the penetration direction of the through hole 5*a*.

When the third punch 80 is withdrawn from the third processing space 75 and when the guide 76 is moved toward the third punch 80, the self-piercing and clinch nut produced by the production apparatus 100 is discharged from the third processing space 75.

1.8. Advantages of the Production Apparatus in the First Embodiment

As has been described heretofore, the production apparatus 100 in this embodiment performs the following processing:

(1) in the first processing space 35 of the first forging die assembly 30, mainly, processing the blank (first processing) to form the flanges 9, to preliminarily form the pilot portion 6, and to form the ribs 6c;

(2) in the second processing space 55 of the second forging die assembly 50, mainly, processing the blank (second processing) to preliminarily form the through hole 5a (specifically, to respectively form the depressions 5b and 5c, which are to be part of the through hole, on the second pin 57 side of the pilot portion 6 and on the second punch 60 side of the main body 7); and (3) in the third processing space 75 of the third forging die assembly 70, mainly, processing the blank (third processing) to form the through hole 5a, to flatten the end surface 6d of the pilot portion 6, and to incline the outer surfaces 6e of the pilot portion 6 along the ribs 6c relative to the penetration direction.

That is, the production apparatus 100 in this embodiment forms the ribs 6c and preliminarily forms the through hole 5a in different steps. In the step for preliminarily form the through hole 5a (second processing), the second die 52 is movable in the direction of arrow AR20 relative to the second pin 57 by the pressing force from the second punch 60.

Thus, the ribs 6c are formed to extend in a predetermined direction (extending direction) without meandering in the vicinity of the through hole 5a (meandering in a direction away from the axis 5d (see FIG. 3) of the through hole 5a in the penetration direction, for example). This improves flatness of the outer surfaces 6e of the pilot portion 6 and uniformness in thickness of the pilot portion 6.

In this manner, the production apparatus 100 in this embodiment desirably forms the ribs 6c, which may otherwise affect the flatness of the outer surfaces 6e of the pilot portion 6 and uniformness in thickness of the pilot portion 6. Therefore, it is possible to improve securing strength of the produced self-piercing and clinch nut 4.

In the first processing space 35 of the first forging die assembly 30, the blank 120 including the base 126 and the mountain-shaped portion 127 is disposed. This configuration, which is different from the technique of patent document 1, makes uniform the thickness (dimension in the penetration direction) of the flanges 9. This further improves securing strength of the produced self-piercing and clinch nut 4.

2. Second Embodiment

Next, a second embodiment will be described. The production apparatuses 100 and 200 of the self-piercing and clinch nut in the first and second embodiments have approximately the same configurations except for a difference between the configurations of the corresponding first forging die assemblies 30 and 230. In view of this, this difference will be mainly described below.

Similar elements of these production apparatuses 100 and 200 will be denoted with the identical reference numerals. The elements denoted with the identical reference numerals, which have been already described in the first embodiment, will not be elaborated in the second embodiment.

2.1. General Arrangement of the Production Apparatus

Figure 42:
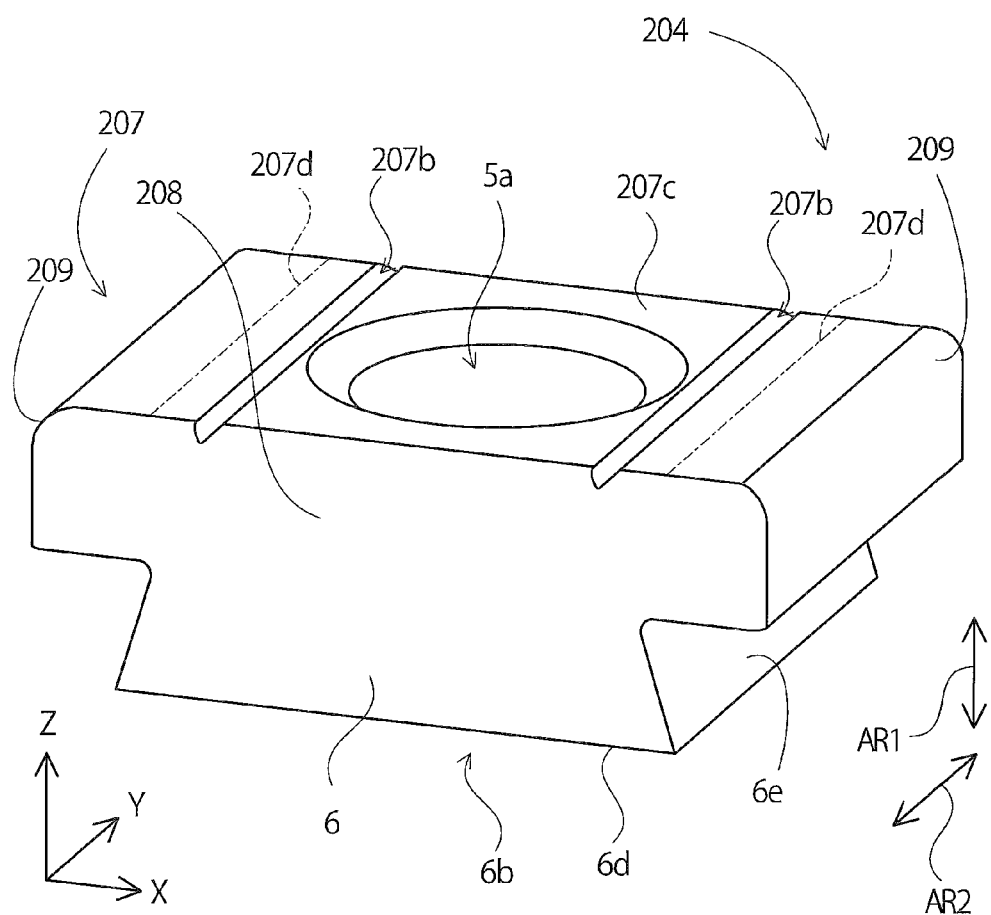
FIG. 42 is a perspective view of an exemplary configuration of a self-piercing and clinch nut produced by the production apparatus according to the second embodiment.
Figure 43:
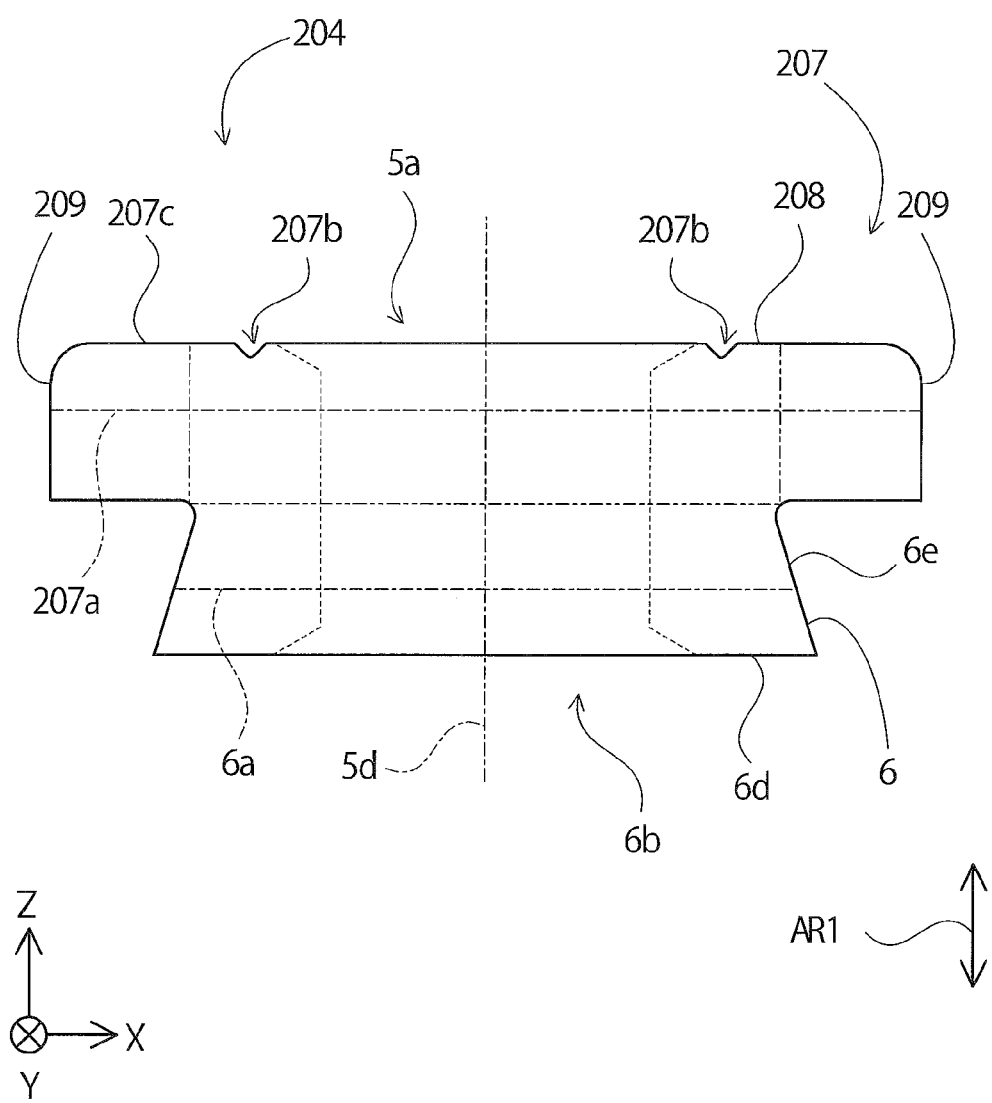
FIG. 43 is a front view of the exemplary configuration of the self-piercing and clinch nut produced by the production apparatus according to the second embodiment.

FIG. 1 is a block diagram illustrating an exemplary configuration of an apparatus to produce a self-piercing and clinch nut (hereinafter simply referred to as "production apparatus") 200 according to this embodiment. FIGS. 42 and 43 are respectively a perspective view and a front view of an exemplary configuration of a self-piercing and clinch nut 204 produced by the production apparatus 200. As illustrated in FIG. 1, the production apparatus 200 mainly includes the feeder 2, a forger 203, and the controller 90.

The feeder 2 feeds a material of blanks (nut blanks) to the forger 203. The material of blanks is a wire material having an approximately rectangular cross-section. The forger 203 produces self-piercing and clinch nuts 4 (see FIGS. 42 and 43) of the wire material which has been fed by the feeder 2. The self-piercing and clinch nuts have an approximately rectangular external shape. A detailed configuration of the forger 203 will be described later.

The controller 90 controls the feeder 2 and the forger 203 to operate. As illustrated in FIG. 1, the controller 90 mainly includes the CPU 91 and the memory 92. In accordance with a program 92a stored in the memory 92, the CPU 91 performs processing for transmitting a control signal to the feeder 2 and the forger 203 at a predetermined timing. The feeder 2 and the forger 203 are electrically connected to the controller 90 through the signal line 99.

The self-piercing and clinch nut 204 is a nut to be secured on a parent material such as a steel sheet through application of pressure. As illustrated in FIGS. 42 and 43, the self-piercing and clinch nut 4 mainly includes the pilot portion 6 and a main body 207.

The main body 207 includes a central portion 208 (portion enclosed by the double-dashed line in FIG. 43) and flanges 209. The central portion 208 has the through hole 5a. The flanges 209 are formed on both sides of the central portion 208. As illustrated in FIG. 43, the through hole 5a extends in a direction indicated by arrow AR1 (Z-axis direction) (hereinafter simply referred to as "penetration direction"). The through hole 5a serves as a screw hole.

The pilot portion 6 is a tool to punch a hole in the parent material utilizing pressure exerted in the penetration direction. As illustrated in FIGS. 42 and 43, the pilot portion 6 protrudes from the central portion 208 of the main body 207. The through hole 5a is formed in the center of the pilot portion 6 in a manner similar to the main body 207.

As illustrated in FIGS. 42 and 43, the main body 207 has a rectangular (square or oblong) cross-section 207a in a direction perpendicular to the penetration direction. The area of the cross-section 207a (see FIG. 43) of the main body 207 is approximately the same at each portion of the main body 207 (each position in the penetration direction: each Z-coordinate value).

The pilot portion 6 has a rectangular external shape in the direction perpendicular to the penetration direction. A region 6a defined by the external shape (see FIG. 43) of the pilot portion 6 has an area that gradually increases as the distance from the main body 207 increases.

Among the outer surfaces of the main body 207, a first outer surface 207c intersects the through hole 5a. Two groove rows 207b are formed in the first outer surface 207c and extend in a direction of arrow AR2 (X-axis direction) (hereinafter simply referred to as "extending direction") along borderlines 207d (see FIG. 42) between the flanges 209 and the central portion 208.

2.2. Configuration of the Forger

FIGS. 4 and 5 are plan views of an exemplary configuration of the forger 203 according to this embodiment. The forger 203 cuts the wire material fed from the feeder 2 into pieces of a desired size. Then, the forger 203 subjects the cut pieces of the wire material to a plurality of forging steps to produce the self-piercing and clinch nut 204 (see FIGS. 42 and 43) in forms before undergoing tapping (internal threading). As illustrated in FIGS. 4 and 5, the forger 203 mainly includes the forging die assembly 10, the forging die assembly 20, a first forging die assembly 230, the second forging die assembly 50, the third forging die assembly 70, and the transfer mechanism 95. Operations of the first to third forging die assemblies 230, 50, and 70, and the transfer mechanism 95 are controlled by the controller 90.

As illustrated in FIGS. 4 and 5, the forging die assembly 10 (fifth forging die assembly) is adjacent to the forging die assembly 20. The forging die assembly 10 subjects each cut piece of the wire material to preliminary processing (fifth processing) to form the cut piece of the wire material into a blank having a rectangular parallelepiped or cubic shape.

As illustrated in FIGS. 4 and 5, the forging die assembly 20 is adjacent to the forging die assembly 10 and the first forging die assembly 230. The forging die assembly 20 further subjects, to preliminary processing (fourth processing), the blank that has been formed to have the rectangular parallelepiped or cubic shape in the forging die assembly 10 (fourth forging die assembly).

The first forging die assembly 230 is adjacent to the forging die assembly 20 and the second forging die assembly 50 and subjects the blank, which has undergone the preliminary processing in the forging die assembly 20, to processing to form flanges 209, for example.

The second forging die assembly 50 is adjacent to the first forging die assembly 230 and the third forging die assembly 70 and subjects the blank, which has been processed in the first forging die assembly 230, to processing to preliminarily form the through hole 5a, for example.

The third forging die assembly 70 is adjacent to the second forging die assembly 50 and subjects the blank, which has been processed in the second forging die assembly 50, to processing to incline the outer surfaces 6e of the pilot portion 6 relative to the penetration direction, for example.

The transfer mechanism 95 includes a plurality of (four in this embodiment) grippers 96 (96a to 96d). The transfer mechanism 95 transfers the blank between two adjacent forging die assemblies among the forging die assembly 10, the forging die assembly 20, the first to third forging die assemblies 230, 50, and 70.

Specifically, as illustrated in FIGS. 4 and 5, the gripper 96a transfers the blank between the forging die assemblies 10 and 20. The gripper 26b transfers the blank between the forging die assembly 20 and the first forging die assembly 230. The gripper 26c transfers the blank between the first and second forging die assemblies 230 and 50. The gripper 26d transfers the blank between the second and third forging die assemblies 50 and 70.

Detailed hardware configurations of the forging die assembly 10, the forging die assembly 20, and the first to third forging die assemblies 230, 50, and 70 will be described below.

2.3. Configuration of the First Forging Die Assembly

Figure 44:
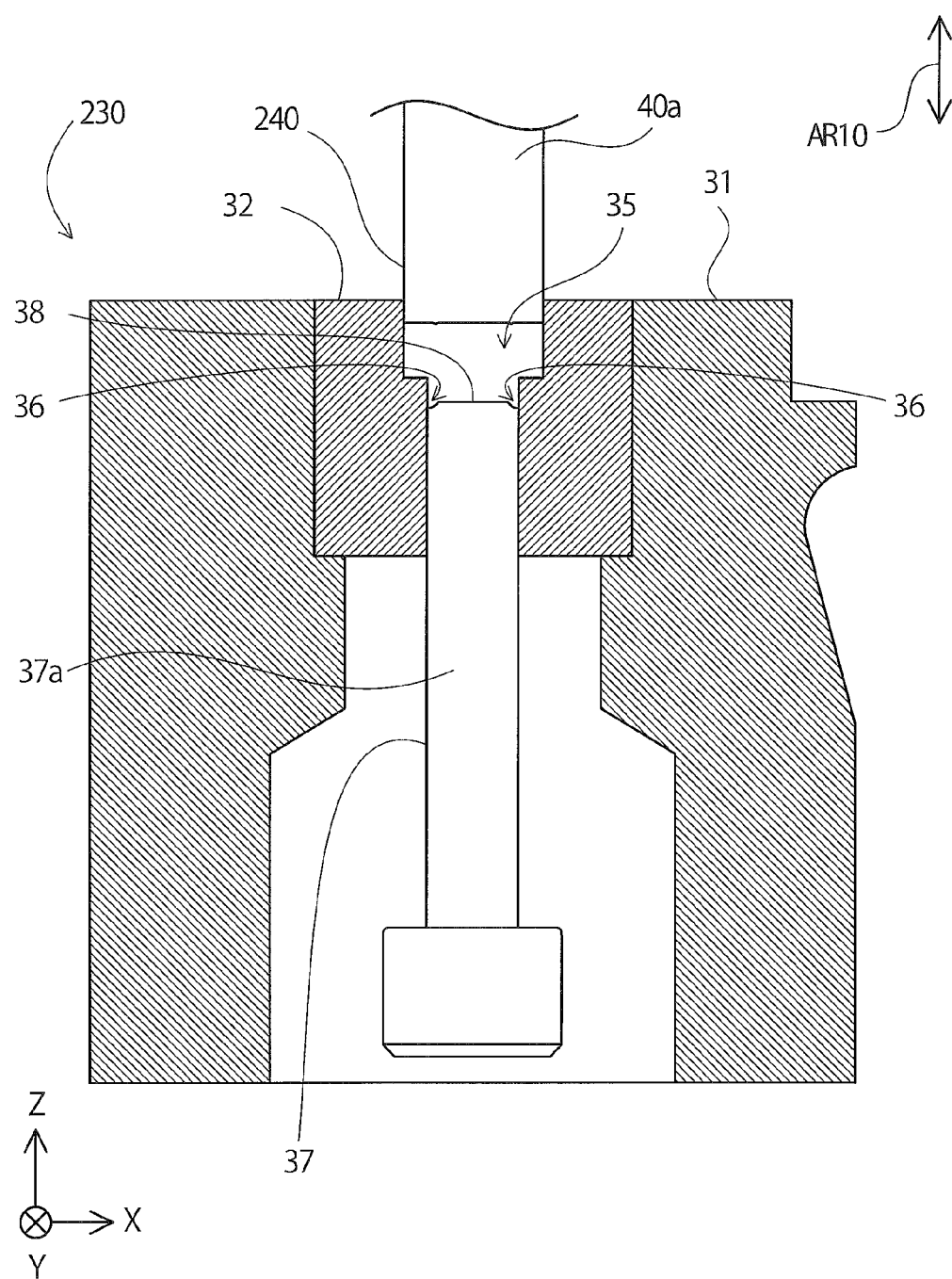
FIG. 44 is a front cross-sectional view of an exemplary configuration of a first forging die assembly according to the second embodiment.
Figure 45:
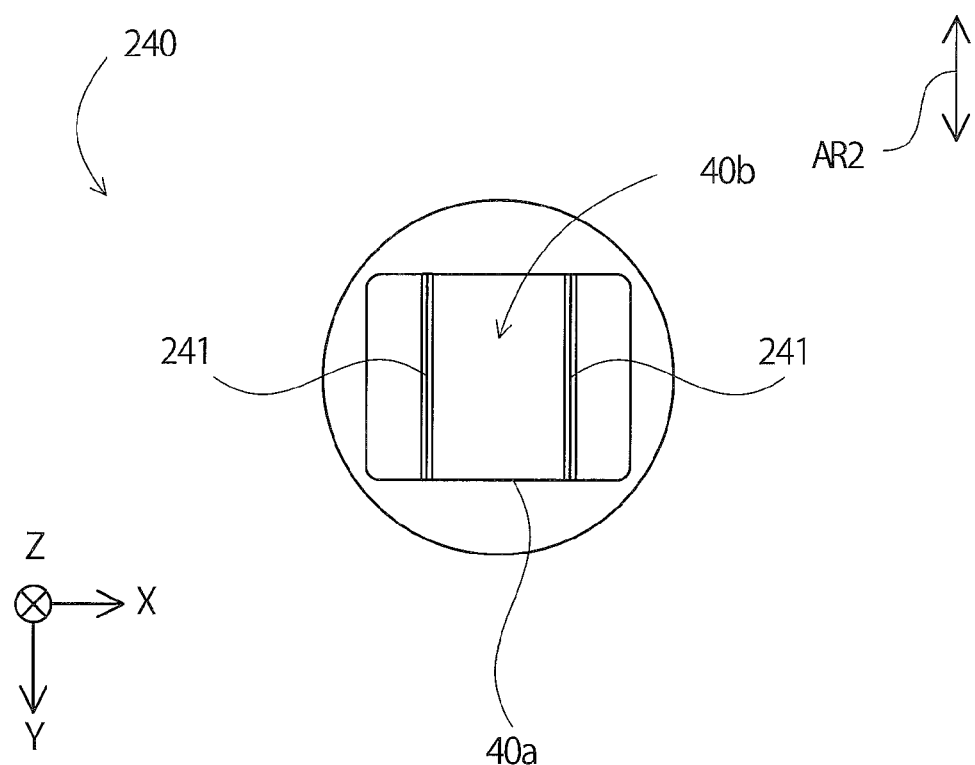
FIG. 45 is a bottom view of an exemplary configuration of a first punch according to the second embodiment.
Figure 46:
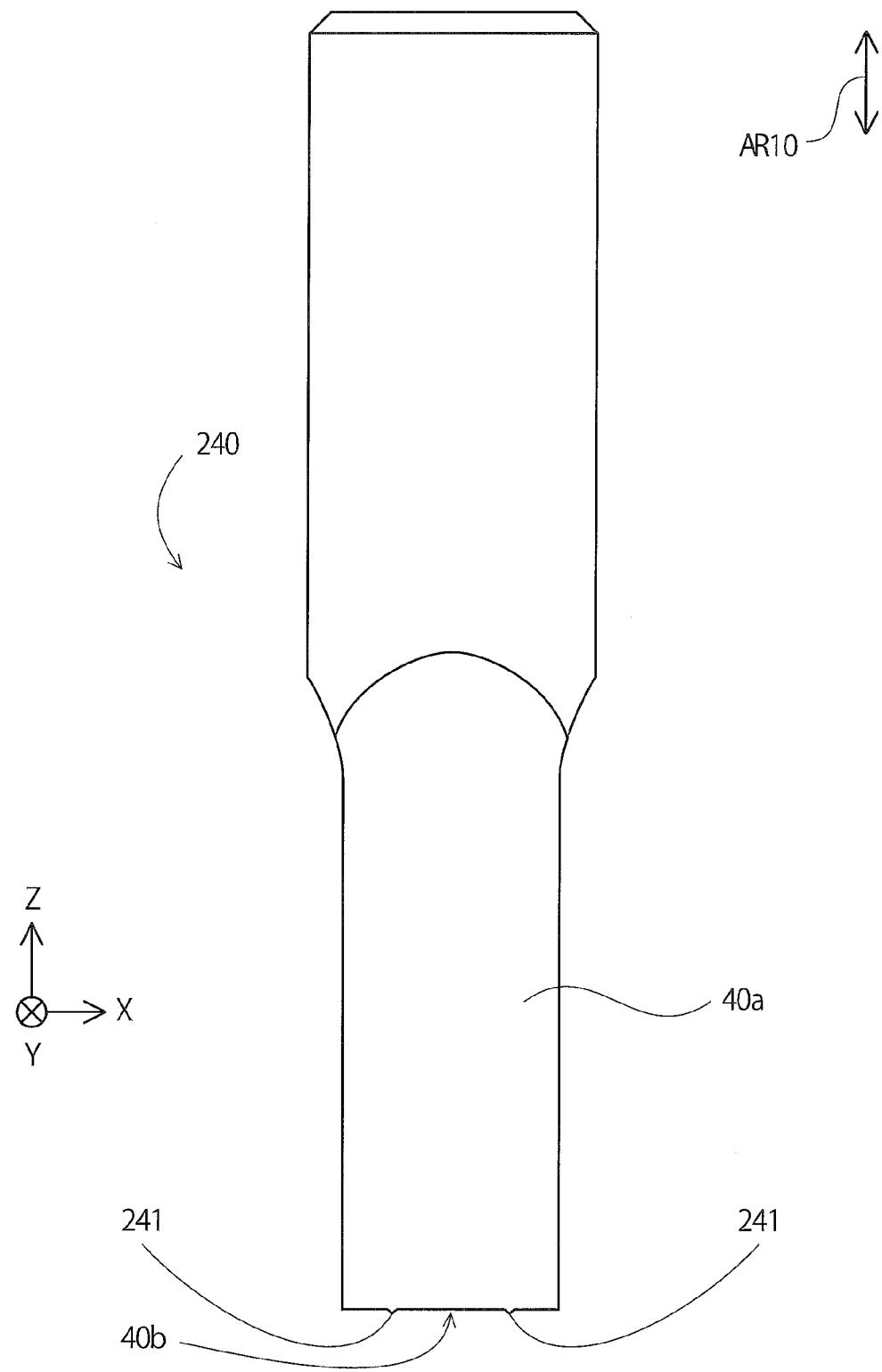
FIG. 46 is a front view of the exemplary configuration of the first punch according to the second embodiment.

FIG. 44 is a front cross-sectional view of an exemplary configuration of the first forging die assembly 230. FIGS. 15 and 16 are respectively a plan view and a front cross-sectional view of an exemplary configuration of the first die 32 and its vicinity. FIGS. 17 and 18 are respectively a plan view and a front view of an exemplary configuration of the first pin 37. FIGS. 45 and 46 are respectively a bottom view and a front view of an exemplary configuration of a first punch 240. As illustrated in FIG. 44, the first forging die assembly 230 mainly includes the first die 32, the first pin 37, and the first punch 240.

The first die 32, which is similar to the die 12, is a block to receive a blank and is accommodated in the die case 31. As illustrated in FIG. 16, the first die 32 has the first insertion hole 32a extending in one direction (Z-axis direction).

The first pin 37 is fitted in the first insertion hole 32a to define the first processing space 35 (see FIG. 44) for processing the blank in the first die 32. When the first pin 37 approaches the first punch 240 along the first insertion hole 32a, the blank in the first processing space 35 is discharged from the first forging die assembly 230. As illustrated in FIGS. 17 and 18, the first pin 37 mainly includes the first pin shank 37a and the first platform 38.

The first pin shank 37a is a rod-shaped member inserted in the first insertion hole 32a. As illustrated in FIG. 17, the first pin shank 37a has a rectangular external shape. The first platform 38 is disposed on one end 37b of the first pin shank 37a. As illustrated in FIGS. 17 and 18, the first inclined walls 38a extending in a direction of arrow AR2 are disposed on both sides of the first platform 38.

The first punch 240 is movable to and away from the first processing space 35. As illustrated in FIGS. 45 and 46, the first punch 240 mainly includes the first punch shank 40a and two protrusion rows 241.

As illustrated in FIG. 46, the first punch shank 40a is a rod-shaped member extending in the direction of arrow AR10. As illustrated in FIG. 45, the first punch shank 40a has a rectangular external shape. The two protrusion rows 241 are disposed on one end 40b of the first punch shank 40a and extend in the extending direction, as illustrated in FIG. 45.

As illustrated in FIG. 16, the first insertion hole 32a includes the first movement hole 33 and the first fitting hole 34. Specifically, the first movement hole 33 is the portion of the first insertion hole 32a in which the first punch 240 is movable. The first fitting hole 34 is the portion of the first insertion hole 32a in which the first pin 37 is fitted.

As illustrated in FIGS. 15 and 16, the first movement hole 33 has a rectangular first region 33a in a direction perpendicular to the movement direction of the first punch 240. The area of the first region 33a (see FIG. 16) of the first movement hole 33 is approximately the same at each portion of the first movement hole 33 (at each position in the movement direction of the first punch 240).

As illustrated in FIGS. 15 and 16, the first fitting hole 34 has a rectangular second region 34a in the direction perpendicular to the movement direction of the first punch 240. The area of the second region 34a (see FIG. 16) of the first fitting hole 34 is approximately the same at each portion of the first fitting hole 34 (at each position in the movement direction of the first punch 240). At the position P11 where the first movement hole 33 and the first fitting hole 34 are connected to each other, the area of the first region 33a is larger than the area of the second region 34a.

The first pin 37 is fitted in the first fitting hole 34 in such a manner that the first platform 38 of the first pin 37 is opposed to the blank disposed in the first processing space 35. Consequently, the inner surface 34b (see FIG. 16) of the first die 32 that faces the first fitting hole 34 and the first inclined walls 38a (see FIGS. 17 and 18) on both sides of the first platform 38 define the first processing grooves 36 (see FIG. 44).

In this case, as illustrated in FIG. 44, the protrusion rows 241 of the first punch 240 are opposed to the corresponding first processing grooves 36 across the first processing space 35.

2.4. Forging by the Production Apparatus in the Second Embodiment

Figure 47:
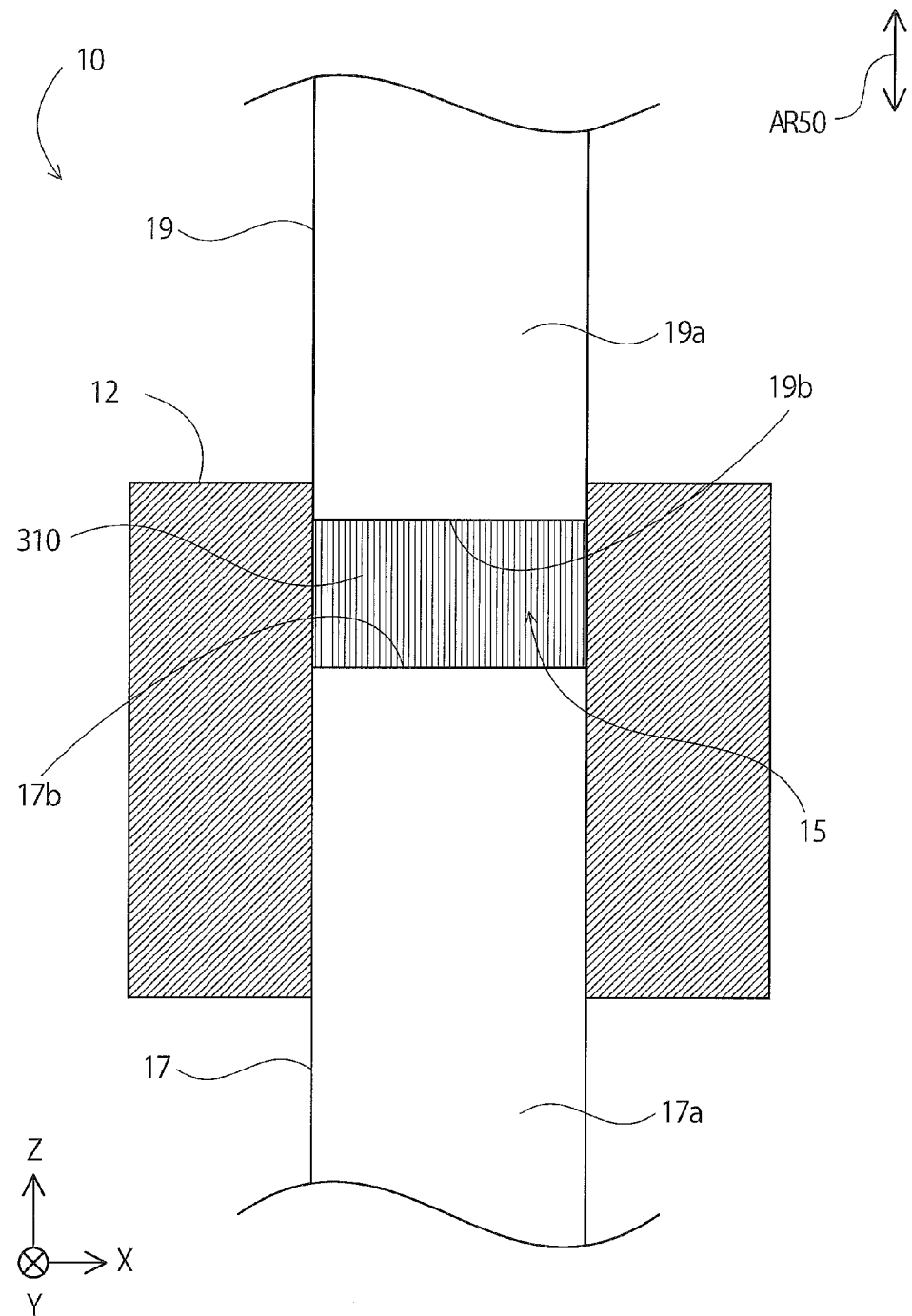
FIG. 47 is a front cross-sectional view of a fifth forging die assembly, illustrating a forging step by the fifth forging die assembly according to the second embodiment.
Figure 48:
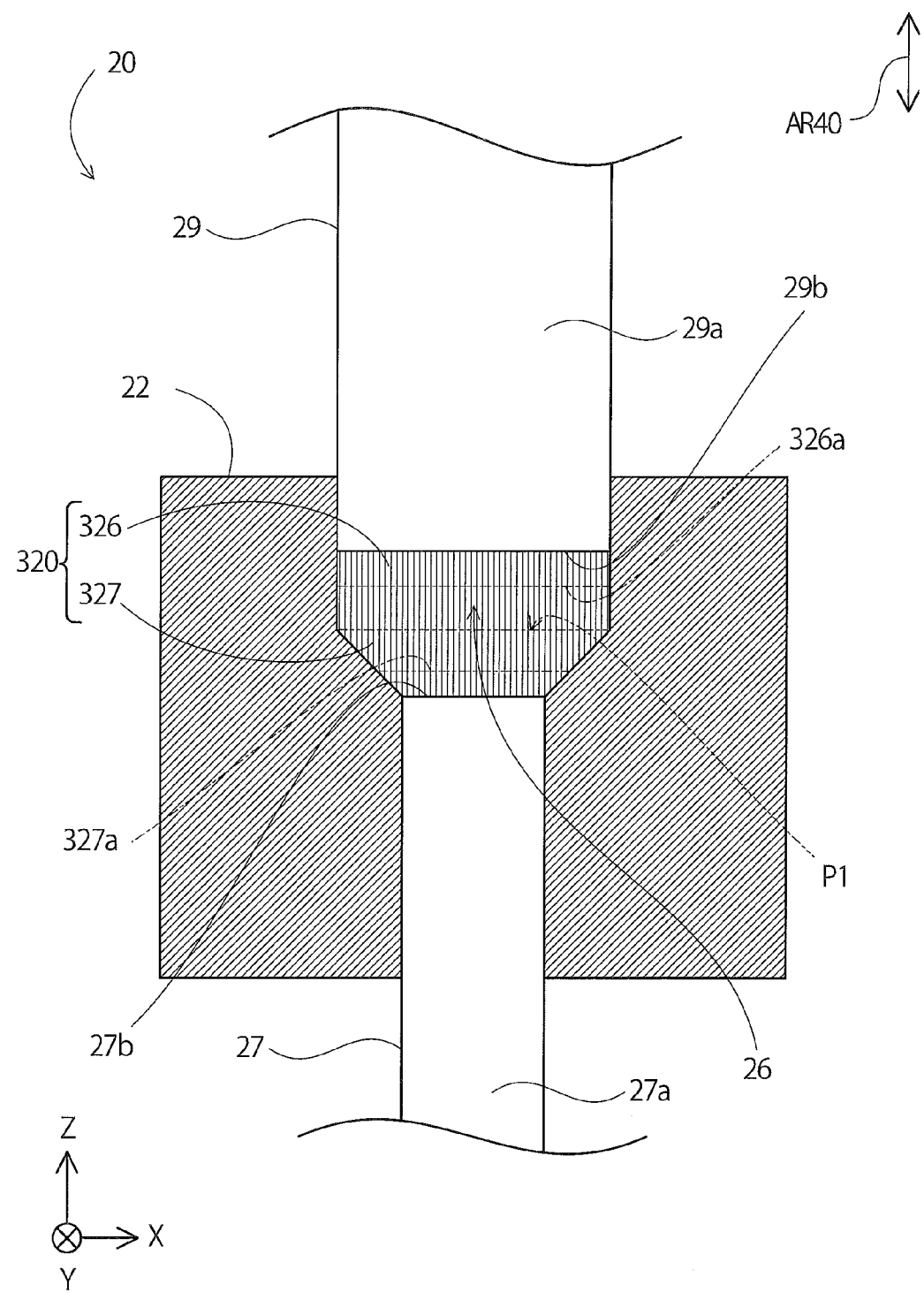
FIG. 48 is a front cross-sectional view of a fourth forging die assembly, illustrating a forging step by the fourth forging die assembly according to the second embodiment.
Figure 49:
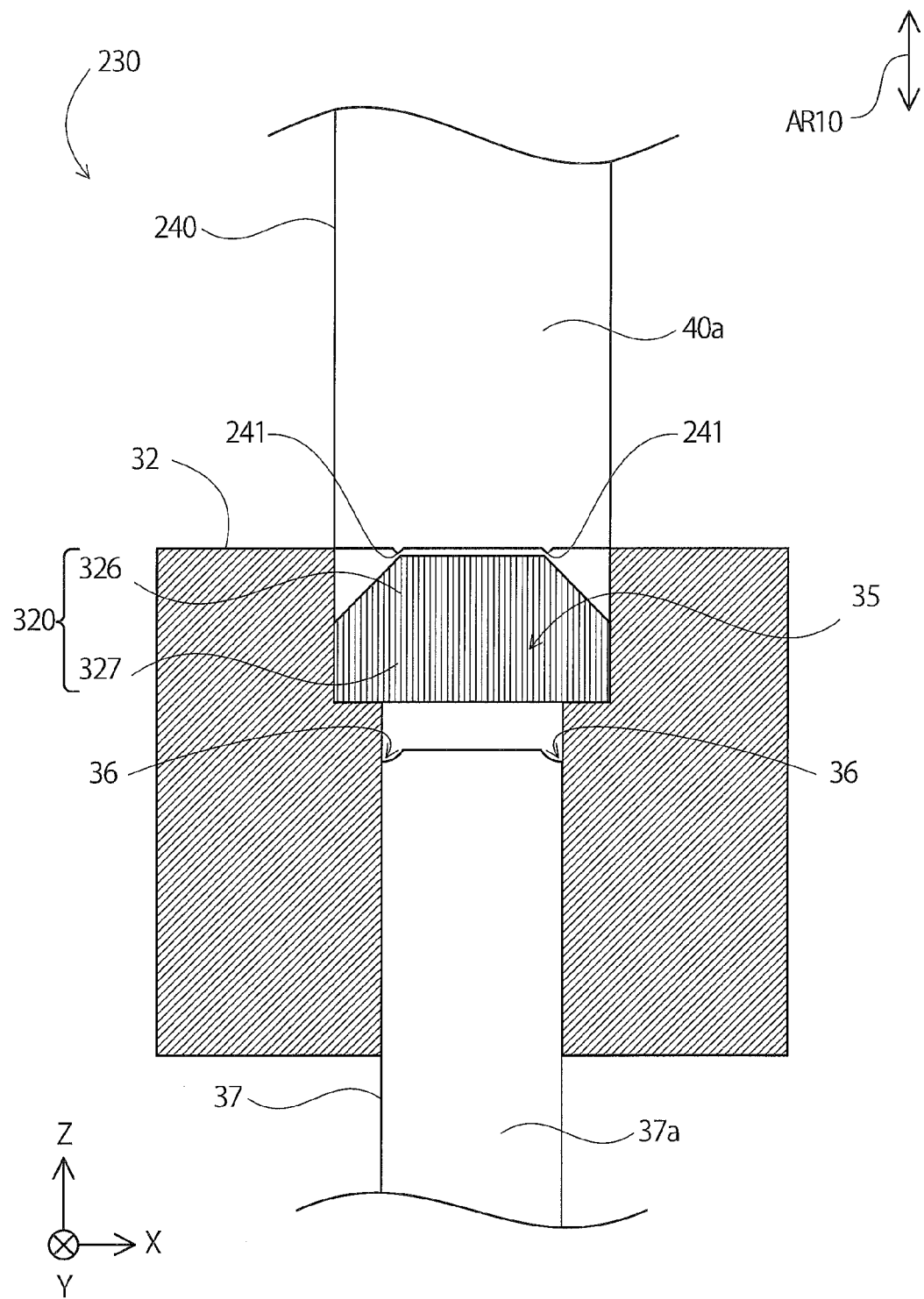
FIG. 49 is a front cross-sectional view of the first forging die assembly, illustrating a forging step by the first forging die assembly according to the second embodiment.
Figure 50:
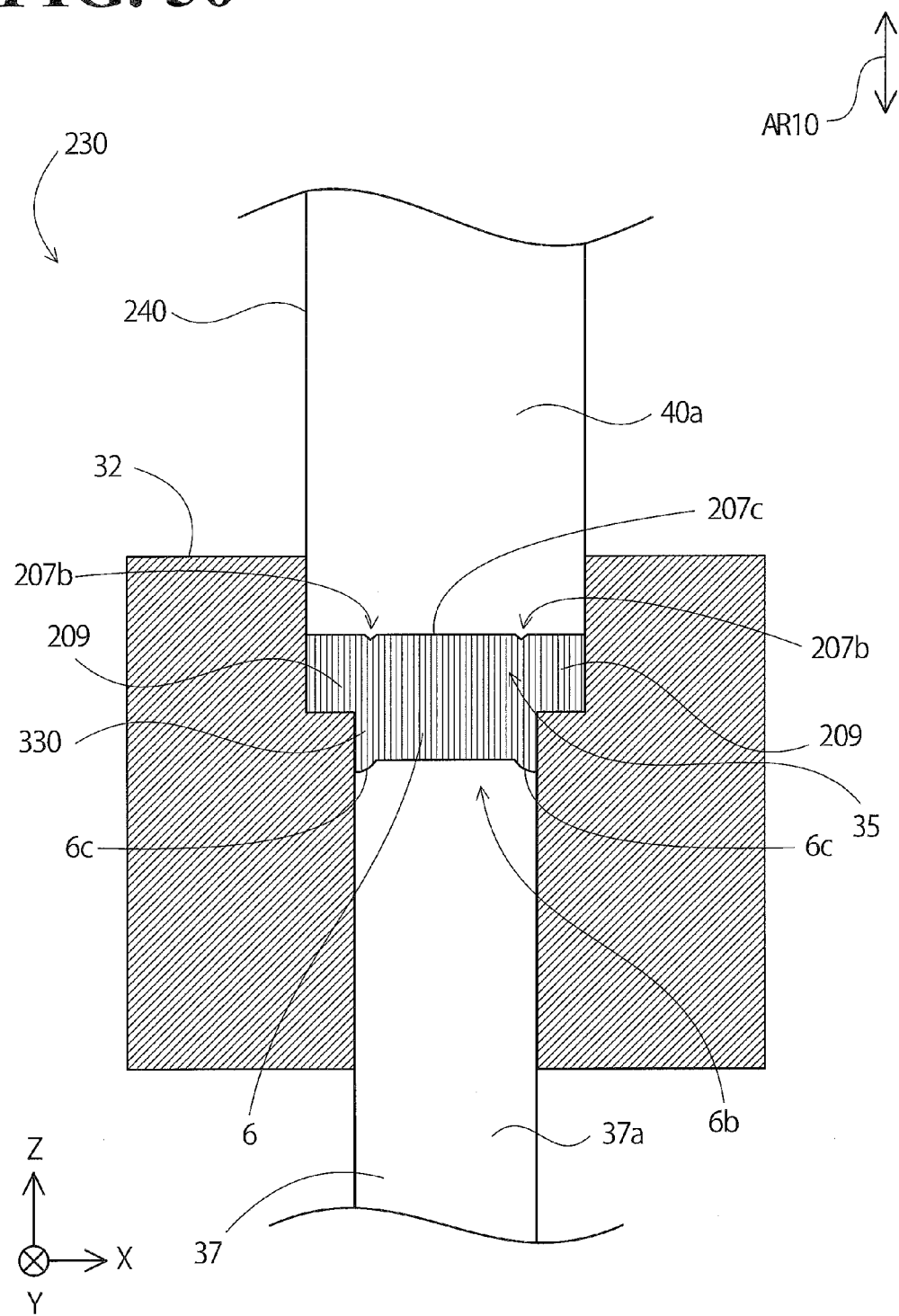
FIG. 50 is a front cross-sectional view of the first forging die assembly, illustrating the forging step by the first forging die assembly according to the second embodiment.
Figure 51:
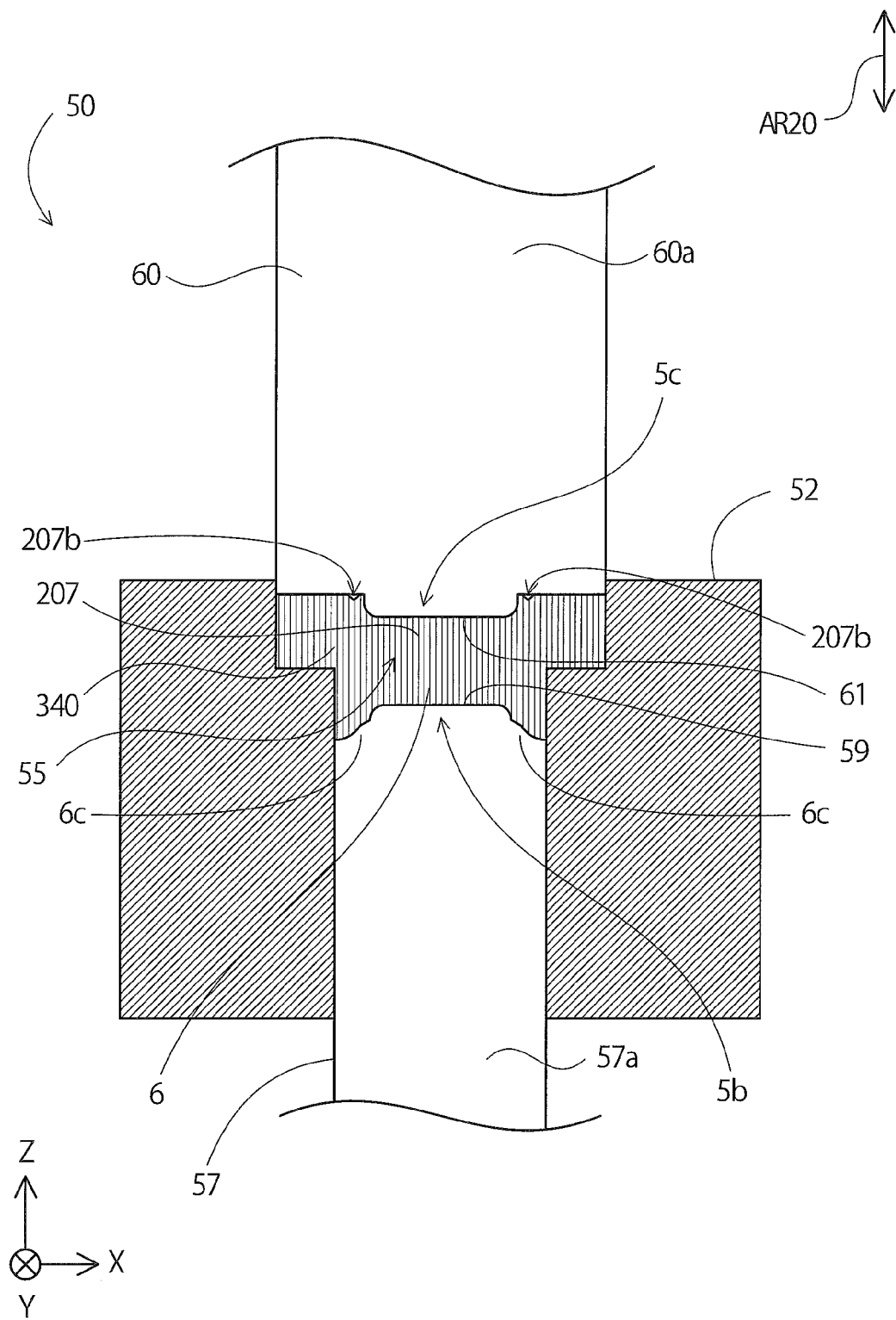
FIG. 51 is a front cross-sectional view of a second forging die assembly, illustrating a forging step by the second forging die assembly according to the second embodiment.
Figure 52:
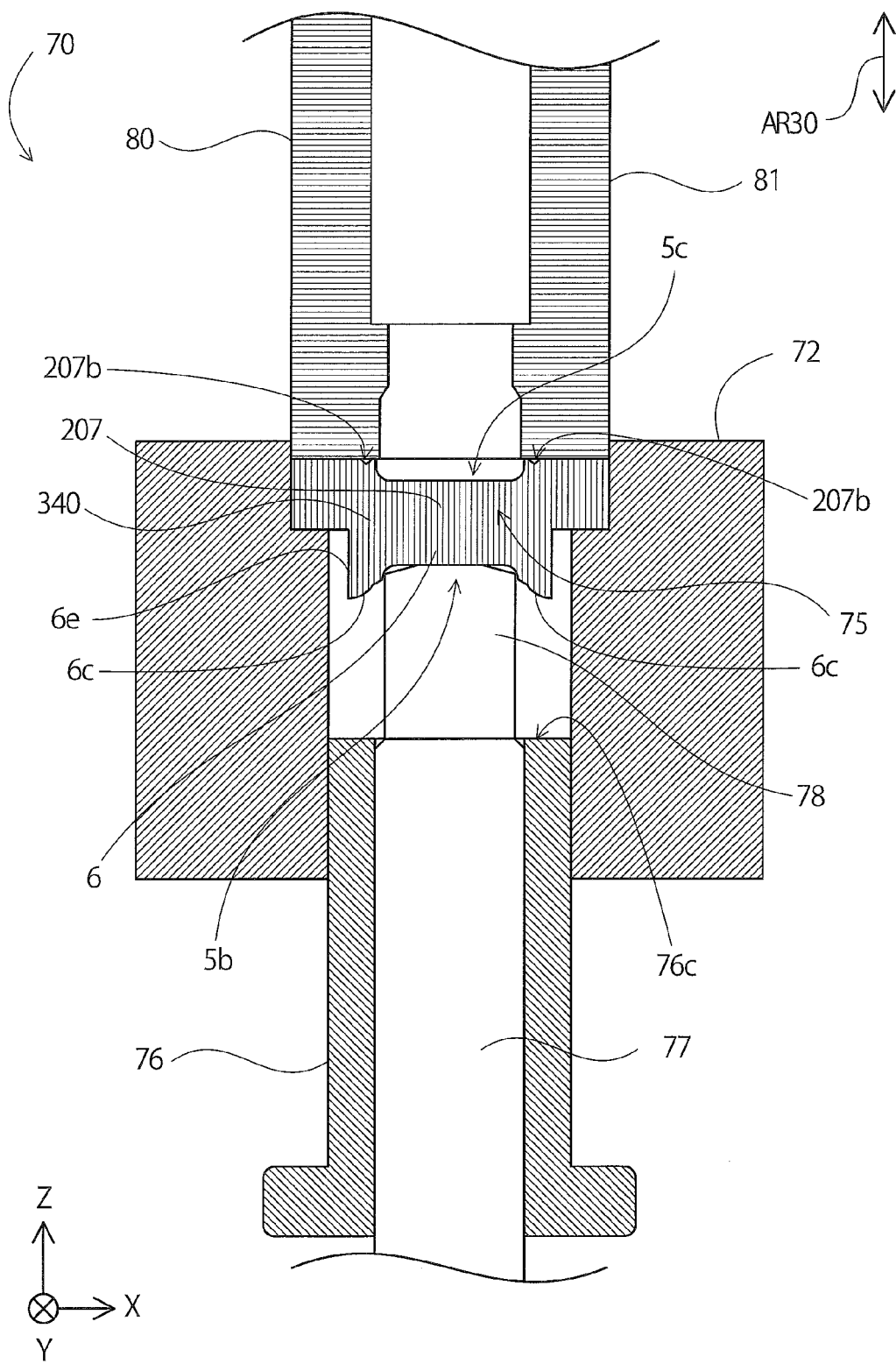
FIG. 52 is a front cross-sectional view of a third forging die assembly, illustrating a forging step by the third forging die assembly according to the second embodiment.
Figure 53:
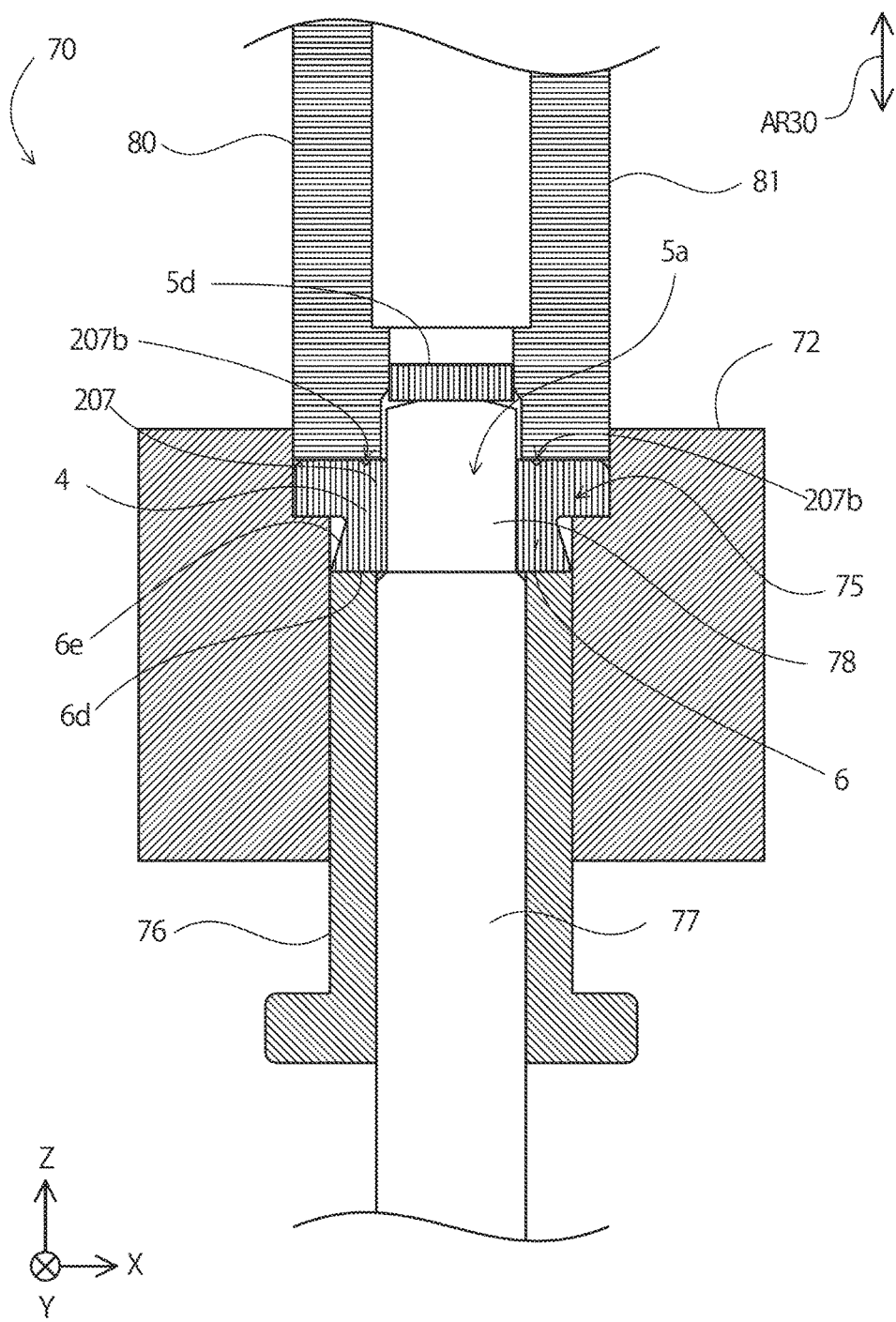
FIG. 53 is a front cross-sectional view of the third forging die assembly, illustrating the forging step by the third forging die assembly according to the second embodiment.

FIGS. 47 and 48 are respectively front cross-sectional views of the forging die assemblies 10 and 20, illustrating forging steps by the forging die assemblies 10 and 20. FIGS. 49 and 50 are front cross-sectional views of the first forging die assembly 230, illustrating a forging step by the first forging die assembly 230. FIG. 51 is a front cross-sectional view of the second forging die assembly 50, illustrating a forging step by the second forging die assembly 50. FIGS. 52 and 53 are front cross-sectional views of the third forging die assembly 70, illustrating a forging step by the third forging die assembly 70. By referring to FIGS. 47 to 53, the forging steps performed by the production apparatus 200 will be described.

First, in the forging step (fifth processing) by the forging die assembly 10, as illustrated in FIG. 47, each cut piece in the processing space 15 is clamped between the pin 17 and the punch 19. Thus, the cut piece is formed into a blank 310 having a rectangular parallelepiped or cubic shape.

Subsequently, the punch 19 is withdrawn from the processing space 15, and the pin 17 is moved toward the punch 19. Then, the blank 310, which has been processed preliminarily, is discharged from the processing space 15 and gripped by the gripper 96a of the transfer mechanism 95 (see FIG. 4). The blank 310, which has been gripped by the gripper 96a, is transferred from the forging die assembly 10 to the forging die assembly 20 (see FIG. 5).

Next, in the forging step (fourth processing) by the forging die assembly 20, the blank 310, which has been transferred from the processing space 15 and disposed in the processing space 26, is clamped between the pin 27 and the punch 29, as illustrated in FIG. 48. Thus, the blank 310, which has been processed by the forging die assembly 10, is formed into the blank 320 (first blank).

As illustrated in FIG. 48, the blank 320 at this stage includes a base 326 and a mountain-shaped portion 327 connected to the base 326. A first cross-section 326a of the base 326 in a direction perpendicular to the penetration direction has a rectangular shape. The area of the first region 326a is approximately the same at each portion of the base 326 (at each position in the penetration direction).

A second cross-section 327a of the mountain-shaped portion 327 in the direction perpendicular to the penetration direction has a rectangular shape. The area of the second cross-section 327a gradually decreases as the distance from the base 326 increases. At a position P1 where the base 326 and the mountain-shaped portion 327 are connected to each other, the first cross-section 326a has approximately the same area as the second cross-section 327a.

Subsequently, the punch 29 is withdrawn from the processing space 26, and the pin 27 is moved toward the punch 29. Then, the blank 320, which has been processed preliminarily, is discharged from the processing space 26 and gripped by the gripper 96b of the transfer mechanism 95 (see FIG. 4). At this time, the gripper 96b turns the gripped blank 320 by 180 degrees about the turning axis parallel to the first cross-section 326a (turning axis parallel to the Y-axis in FIG. 48, for example). Then, the blank 320 gripped by the gripper 96b is transferred from the forging die assembly 20 to the first forging die assembly 230 (see FIG. 5)

Subsequently, in the forging step (first processing) by the first forging die assembly 230, the blank 320, which has been forged in the forging die assembly 20 and disposed in the first processing space 35, is clamped between the first pin 37 and the first punch 240, as illustrated in FIG. 49.

At this time, the two protrusion rows 241 formed on the first punch 240 press the mountain-shaped portion 327 of the blank 320. Thus, as illustrated in FIG. 50, the two groove rows 207b corresponding to the protrusion rows 241 of the first punch 240 are formed in the first outer surface 207c of the main body 207.

The pilot portion 6 is preliminarily formed (see FIG. 50) from part of the blank that has been pressed from the first movement hole 33 into the first fitting hole 34 (see FIG. 16). On one end 6b of the pilot portion 6 preliminarily formed, the ribs 6c are formed from part of the blank that has been pressed into the first processing grooves 36 (see FIG. 49). Further, flanges 209 are formed from part of the blank that has been pressed along the inner surface 33b of the first die 32 which faces the first movement hole 33.

Subsequently, the first punch 240 is withdrawn from the first processing space 35, and the first pin 37 is moved toward the first punch 240. Then, the blank 330, which has undergone the first processing, is discharged from the first processing space 35 and gripped by the gripper 96c of the transfer mechanism 95 (see FIG. 4). The blank 330, which has been gripped by the gripper 96c, is transferred from the first forging die assembly 230 to the second forging die assembly 50 (see FIG. 5).

Subsequently, in the forging step (second processing) by the second forging die assembly 50, the blank, which has been forged in the first forging die assembly 230 and disposed in the second processing space 55, is clamped between the second pin 57 and the second punch 60, as illustrated in FIG. 51. At this time, the pressing force from the second punch 60 moves the second die 52 in a direction of arrow AR20 toward the second pin 57.

Thus, the ribs 6c formed in the first forging die assembly 230 are pressed into the second processing grooves 56 (see FIGS. 21 and 22). The depressions 5b and 5c are respectively formed on the second pin 57 side of the pilot portion 6 and on the second punch 60 side of the main body 207. The depressions 5b and 5c are to be part of the through hole 5a (see FIGS. 42 and 43).

Subsequently, the second punch 60 is withdrawn from the second processing space 55, and the second pin 57 is moved toward the second punch 60. Then, the blank 340, which has undergone the second processing, is discharged from the second processing space 55 and gripped by the gripper 96d of the transfer mechanism 95 (see FIG. 4). The blank 340, which has been gripped by the gripper 96d, is transferred from the second forging die assembly 50 to the third forging die assembly 70 (see FIG. 5).

Subsequently, in the forging step (third processing) by the third forging die assembly 70, the blank 340, which has been forged in the second forging die assembly 50 and disposed in the third processing space 75, is clamped between the guide 76 and the fourth punch 77, and the third punch 80, as illustrated in FIG. 52. At this time, the pressing force from the third punch 80 moves the third die 72 in a direction of arrow AR30 toward the guide 76 and the fourth punch 77.

Thus, the through hole 5a is formed in the center of the pilot portion 6 and the main body 207, and a scrap 5e is caught by the hollow cylindrical portion 81 of the third punch 80. The inner surface 74b (see FIG. 32) of the third die 72 which faces the third fitting hole 74 and one end 76c of the guide 76 press the pilot portion 6 and the ribs 6c so as to flatten the end surface 6d of the pilot portion 6 on the guide 76 side. As illustrated in FIGS. 52 and 53, the outer surfaces 6e of the pilot portion 6 along the ribs 6c are inclined relative to the penetration direction of the through hole 5a.

When the third punch 80 is withdrawn from the third processing space 75 and when the guide 76 is moved toward the third punch 80, the self-piercing and clinch nut produced by the production apparatus 200 is discharged from the third processing space 75.

2.5. Advantages of the Production Apparatus in the Second Embodiment

As has been described heretofore, the production apparatus 200 in this embodiment performs the following processing:

(1) in the first processing space 35 of the first forging die assembly 230, mainly, processing the blank (first processing) to form the flanges 209, to preliminarily form the pilot portion 6, and to form the ribs 6c;

(2) in the second processing space 55 of the second forging die assembly 50, mainly, processing the blank (second processing) to preliminarily form the through hole 5a (specifically, to respectively form the depressions 5b and 5c, which are to be part of the through hole 5a, on the second pin 57 side of the pilot portion 6 and on the second punch 60 side of the main body 207); and (3) in the third processing space 75 of the third forging die assembly 70, mainly, processing the blank (third processing) to form the through hole 5a, to flatten the end surface 6d of the pilot portion 6, and to incline the outer surfaces 6e of the pilot portion 6 along the ribs 6c relative to the penetration direction.

That is, the production apparatus 200 in this embodiment forms the ribs 6c and preliminarily forms the through hole 5a in different steps. In the step for preliminarily form the through hole 5a (second processing), the second die 52 is movable in the direction of arrow AR20 toward the second pin 57 by the pressing force from the second punch 60.

Thus, the ribs 6c are formed to extend in a predetermined direction (extending direction) without meandering in the vicinity of the through hole 5a (meandering in a direction away from the axis 5d (see FIG. 43) of the through hole 5a in the penetration direction, for example). This improves flatness of the outer surfaces 6e of the pilot portion 6 and uniformness in thickness of the pilot portion 6.

In the step of forming the ribs 6c (first processing), the two protrusion rows 241 formed on the first punch 240 are respectively opposed to the corresponding first processing grooves 36 across the first processing space 35.

With this configuration, regions corresponding to the ribs 6c (for example, regions including intersections of straight lines passing through the ribs 6c and extending in the direction of arrow AR10 with the first outer surface 207c of the main body 207) are pressed from the opposite side of the pilot portion 6 (namely, the main body 207 side). This contributes to forming the ribs 6c of desired shapes.

In this manner, the production apparatus 200 in this embodiment desirably forms the ribs 6c, which may otherwise affect the flatness of the outer surfaces 6e of the pilot portion 6 and uniformness in thickness of the pilot portion 6. This improves securing strength of the produced self-piercing and clinch nut 204.

In the first processing space 35 of the first forging die assembly 230, the blank 320 including the base 326 and the mountain-shaped portion 327 is disposed. This configuration, which is different from the technique of patent document 1, makes uniform the thickness (dimension in the penetration direction) of the flanges 209. This further improves securing strength of the produced self-piercing and clinch nut 204.

3. Modifications

The present invention should not be limited to the embodiments that have been described heretofore. Various modifications are possible.

(1) In the third forging die assembly 70 in the first and second embodiments, the guide 76 and the fourth punch 77 are elements separate from each other. This, however, should not be construed in a limiting sense.

Figure 54:
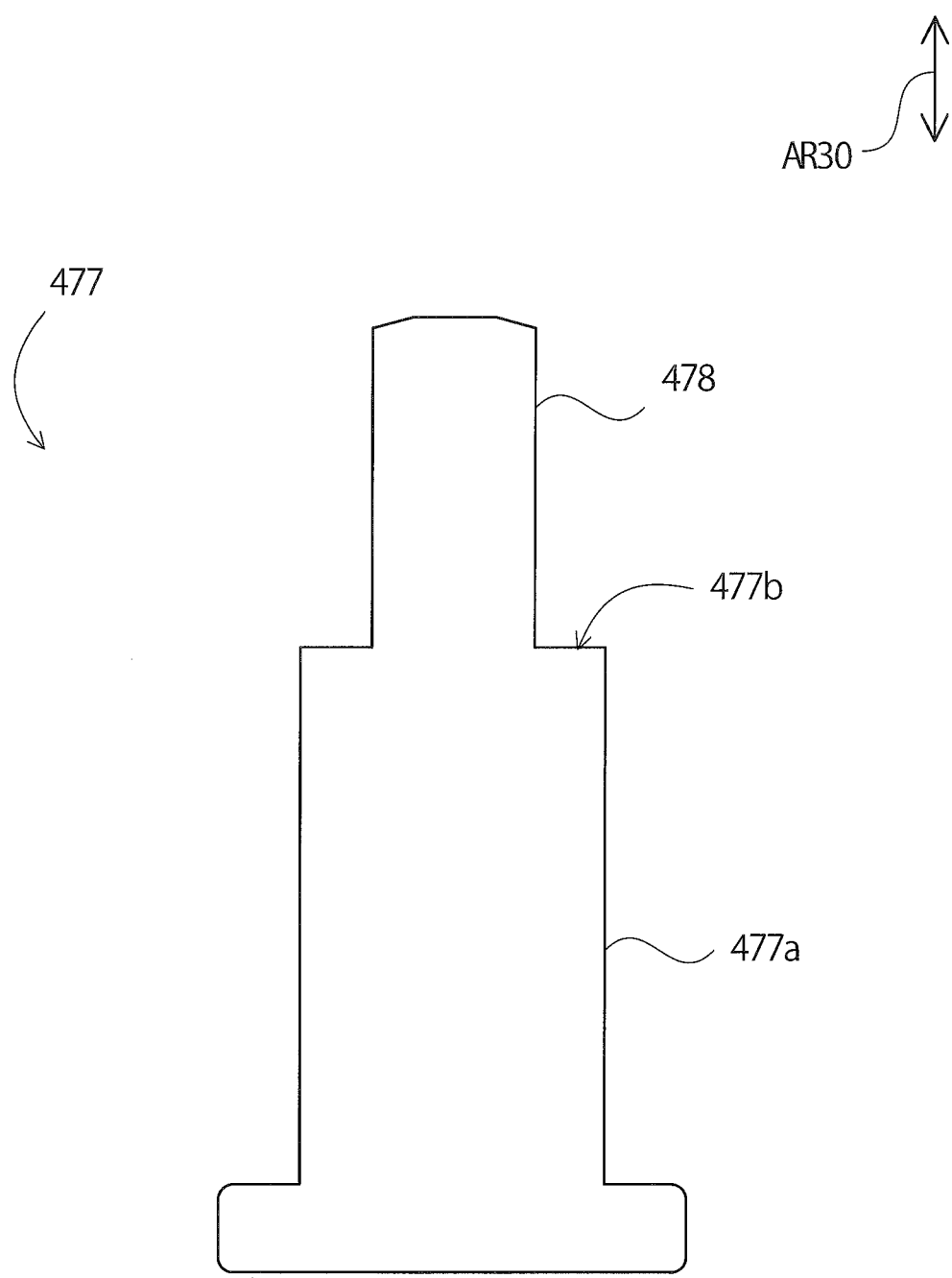
FIG. 54 is a front view of another exemplary configuration of a fourth punch of the third forging die assembly according to the first and second embodiments.

FIG. 54 is a front view of another exemplary configuration of a fourth punch. As illustrated in FIG. 54, the fourth punch 477 mainly includes a shank 477a and a terrace surface 477b. The shank 477a is a rod-shaped member extending in a direction of arrow AR30 and has a rectangular external shape. A distal end 478 protrudes from the terrace surface 477b of the shank 477a and has a circular external shape. In this manner, as the fourth punch, the guide 76 and the fourth punch 77 integral to each other (namely, the fourth punch 477 in FIG. 54), for example, may be employed.

In this case, the fourth punch 477 is fitted in the third insertion hole 72a of the third die 72. When the third processing is performed in the third processing space 75 of the third forging die assembly 70, the inner surface 74b of the third die 72 that faces the third fitting hole 74 and the terrace surface 477b of the fourth punch 477 press the pilot portion 6 and the ribs 6c. Thus, while the end surface 6d of the pilot portion 6 on the terrace surface 477b side is flattened, the outer surfaces 6e of the pilot portion 6 along the ribs 6c are inclined relative to the penetration direction of the through hole 5a.

(2) In the first and second embodiments, the punch 19 is movable to and away from the processing space 15. This, however, should not be construed in a limiting sense. For example, the die case 11 side may be movable to and away from the punch 19. Both the die case 11 side and the punch 19 may be movable. That is, it suffices that the punch 19 is movable relative to the processing space 15.

Similarly, it suffices that the punch 29 is movable relative to the processing space 26, that the first punches 40 and 240 are movable relative to the first processing space 35, that the second punch 60 is movable relative to the second processing space 55, and that the third punch 80 is movable relative to the third processing space 75.

(3) In the first and second embodiments, the second die 52 is movable to the second pin 57. This, however, should not be construed in a limiting sense. For example, the second pin 57 may be movable to the second die 52. Both the second die 52 and the second pin 57 may be movable. That is, it suffices that the second die 52 is movable relative to the second pin 57.

Similarly, it suffices that the third die 72 is movable relative to the guide 76 and the fourth punch 77.

(4) In the first embodiment, when the blank 140 in the third processing space 75 is clamped, the pressing force of the third punch 80 moves the third die 72 to the guide 76 and the fourth punch 77. This, however, should not be construed in a limiting sense.

For example, a hardware configuration may be employed in which the third die 72 is secured to the die case 71. That is, when the blank 140 is clamped between the guide 76 and the fourth punch 77, and the third punch 80, the third die 72 may be movable to the guide 76 and the fourth punch 77 or stay still.

(5) In the second embodiment, when the blank 340 in the third processing space 75 is clamped, the pressing force of the third punch 80 moves the third die 72 to the guide 76 and the fourth punch 77. This, however, should not be construed in a limiting sense.

For example, a hardware configuration may be employed in which the third die 72 is secured to the die case 71. That is, when the blank 340 is clamped between the guide 76 and the fourth punch 77, and the third punch 80, the third die 72 may be movable to the guide 76 and the fourth punch 77 or stay still.

(6) In the second embodiment, the dimension of the protrusion rows 241 in the extending direction is approximately the same as the dimension of the main body 207 in the extending direction. This, however, should not be construed in a limiting sense. For example, the dimension of the protrusion rows 241 in the extending direction may be smaller than the dimension of the main body 207 in the extending direction.

Figure 55:
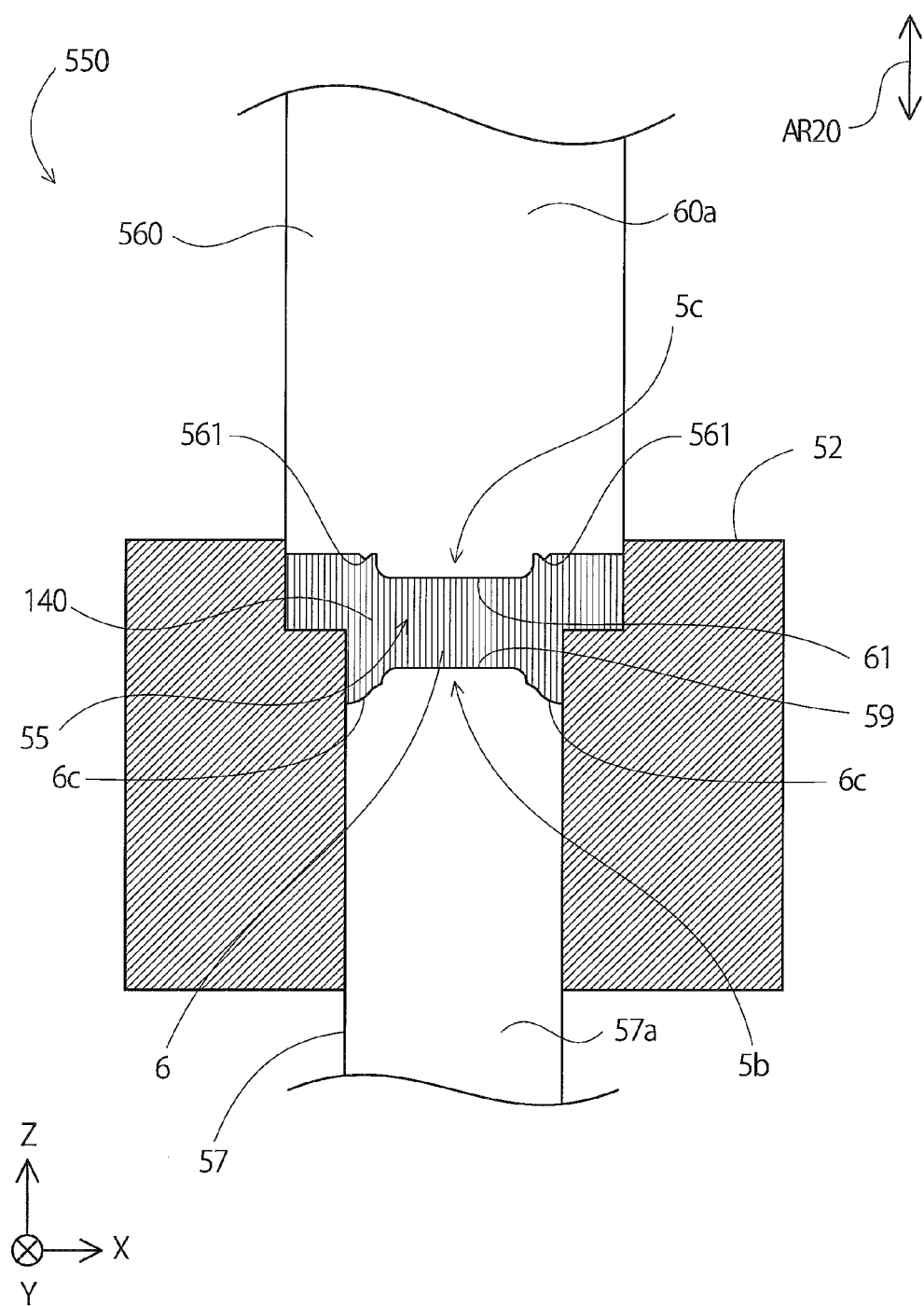
FIG. 55 is a front cross-sectional view of another exemplary configuration of a second forging die assembly according to the second embodiment.

(7) In the second embodiment, only the first punch 240 of the first forging die assembly 230 includes the protrusion rows 241. This, however, should not be construed in a limiting sense. FIG. 55 is a front cross-sectional view of another exemplary configuration of a second forging die assembly. As illustrated in FIG. 55, since the second forging die assemblies 50 and 550 have similar configurations except for the second punch, only the second punch will be described here.

As illustrated in FIG. 55, the second punch 560 is movable to and away from the second processing space 55. The second punch 560 mainly includes the second punch shank 60*a*, the second protrusion 61, and two protrusion rows 561. The movement direction of the second punch 560 is set to be a direction of arrow AR20.

The two protrusion rows 561 are on opposite sides of the second protrusion 61. As illustrated in FIG. 55, the protrusion rows 561 extend in the extending direction and are respectively opposed to the corresponding second processing grooves 56 (FIGS. 21 and 22).

Thus, in a manner similar to the forging step by the second forging die assembly 50, the protrusion rows 561 press regions corresponding to the protrusions 6*c* from the opposite side of the pilot portion 6. Therefore, this modification, which is similar to the first forging die assembly 230, contributes to forming the ribs 6*c* of desired shapes.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. An apparatus to produce a self-piercing and clinch nut comprising a main body comprising a central portion and flanges on both sides of the central portion, and a pilot portion protruding from the central portion, the main body and the pilot portion having a through hole in a center of the main body and the pilot portion, the main body having a rectangular external shape in a direction perpendicular to a penetration direction of the through hole, the external shape of the main body having approximately a same area in each portion of the main body, the pilot portion having a rectangular external shape in the direction perpendicular to the penetration direction, the external shape of the pilot portion having an area that increases as a distance from the main body increases, the apparatus comprising:

a first forging die assembly configured to subject a blank to first processing, the first forging die assembly comprising:
  a first die comprising a first insertion hole comprising:
    a first movement hole in which a first punch is movable, the first movement hole comprising a rectangular first region in a direction perpendicular to a movement direction of the first punch defined as a first movement direction, the first region comprising approximately a same area in each portion of the first movement hole; and
    a first fitting hole in which a first pin is fitted, the first fitting hole comprising a rectangular second region in the direction perpendicular to the first movement direction, the second region comprising approximately a same area in each portion of the first fitting hole, the area of the first region being larger than the area of the second region at a position where the first movement hole is connected to the first fitting hole;
  the first pin fitted in the first insertion hole so as to define a first processing space for processing the blank, the first pin comprising:
    a first pin shank; and
    a first platform on one end of the first pin shank, the first pin being fitted in the first fitting hole to make the first platform opposed to the blank, an inner surface of the first die that faces the first fitting hole and first inclined walls on both sides of the first platform defining first processing grooves;
  the first punch movable relative to the first processing space;

a second forging die assembly adjacent to the first forging die assembly and configured to subject the blank, which has undergone the first processing in the first forging die assembly, to second processing, the second forging die assembly comprising:
  a second die comprising a second insertion hole comprising:
    a second movement hole in which a second punch is movable, the second movement hole comprising a rectangular third region in a direction perpendicular to a movement direction of the second punch defined as a second movement direction, the third cross-section having approximately a same area in each portion of the second movement hole; and
    a second fitting hole in which a second pin is fitted, the second fitting hole comprising a rectangular fourth region in the direction perpendicular to the second movement direction, the fourth cross-section comprising approximately a same area in each portion of the second fitting hole, the area of the third cross-section being larger than the area of the fourth cross-section at a position where the second movement hole is connected to the second fitting hole;
  the second pin fitted in the second insertion hole so as to define a second processing space for processing the blank, the second pin comprising:
    a second pin shank;
    a second platform on one end of the second pin shank; and
    a first protrusion protruding from the second platform, the second pin being fitted in the second fitting hole to make the first protrusion and the second platform opposed to the blank;
a first support supporting the second pin;
a first biasing portion comprising one end secured to the second die and another end secured to the first support; and
the second punch movable relative to the second processing space, the second punch comprising:
a second punch shank; and
a second protrusion protruding from one end of the second punch shank, the second punch being movable in the second movement hole to make the second protrusion opposed to the blank, an inner surface of the second die that faces the second fitting hole and second inclined walls on both sides of the second platform defining second processing grooves;
a third forging die assembly adjacent to the second forging die assembly and configured to subject the blank, which has undergone the second processing in the second forging die assembly, to third processing, the third forging die assembly comprising:
a third die comprising a third insertion hole comprising:
a third movement hole in which a third punch is movable, the third movement hole comprising a rectangular fifth region in a direction perpendicular to a movement direction of the third punch defined as a third movement direction, the fifth cross-section comprising approximately a same area in each portion of the third movement hole; and
a third fitting hole in which a fourth punch is fitted, the third fitting hole comprising a rectangular sixth region in the direction perpendicular to the third movement direction, the sixth cross-section comprising approximately a same area in each portion of the third fitting hole, the area of the fifth cross-section being larger than the area of the sixth cross-section at a position where the third movement hole is connected to the third fitting hole;
the fourth punch fitted in the third insertion hole so as to define a third processing space for processing the blank; and
the third punch comprising a hollow cylindrical portion and movable relative to the third processing space;
a transfer mechanism configured to transfer the blank between two adjacent forging die assemblies among the first to third forging die assemblies; and
a controller configured to control operations of the first to third forging die assemblies and the transfer mechanism.

2. The apparatus according to claim 1,
wherein the controller is configured to cause the first pin and the first punch to clamp the blank in the first processing space so as to preliminarily form the pilot portion from part of the blank that is pressed from the first movement hole side to the first fitting hole side, to form ribs on one end of the pilot portion, which has been preliminarily formed, from part of the blank that is pressed into the first processing grooves, and to form the flanges from part of the blank that is pressed along an inner surface of the first die that faces the first movement hole,
wherein the controller is configured to cause the second pin and the second punch to clamp the blank in the second processing space and move the second die relative to the second pin in the second movement direction so as to press the ribs, which have been formed in the first processing, into the second processing grooves, and to form depressions on the second pin side of the pilot portion and on the second punch side of the main body, the depressions being to be part of the through hole, and
wherein the controller is configured to cause the fourth punch and the third punch to clamp the blank in the third processing space so as to form the through hole in the blank and to cause an inner surface of the third die that faces the third fitting hole, and a terrace surface of the fourth punch side to press the pilot portion and the ribs so as to flatten an end surface of the pilot portion on the terrace surface side and to incline outer surfaces of the pilot portion along the ribs relative to the penetration direction.

3. The apparatus according to claim 2, further comprising a fourth forging die assembly adjacent to the first forging die assembly and configured to form the blank having a rectangular parallelepiped or cubic shape into a first blank comprising a base and a mountain-shaped portion connected to the base, the base comprising a first cross-section of a rectangular shape in a direction perpendicular to the penetration direction, the first cross-section having approximately a same area in each portion of the base, the mountain-shaped portion comprising a second cross-section of a rectangular shape in the direction perpendicular to the penetration direction, the second cross-section having an area that decreases as a distance from the base increases,
the fourth forging die assembly comprising:
a fourth die comprising a fourth insertion hole comprising:
a fourth movement hole in which a fifth punch is movable, the fourth movement hole comprising a rectangular internal shape in a direction perpendicular to a movement direction of the fifth punch defined as a fourth movement direction, the internal shape of the fourth movement hole comprising approximately a same area in each portion of the fourth movement hole;
a fourth fitting hole in which a fourth pin is fitted; and
a tapered hole interposed between the fourth movement hole and the fourth fitting hole, the tapered hole comprising a rectangular internal shape in the direction perpendicular to the fourth movement direction, the internal shape of the tapered hole comprising an area that decreases from the fourth movement hole side to the fourth fitting hole side;
the fourth pin fitted in the fourth insertion hole so as to define a fourth processing space for processing the blank; and
the fifth punch movable relative to the fourth processing space,
wherein the transfer mechanism is configured to transfer the blank between two adjacent forging die assemblies among the first to fourth forging die assemblies.

4. The apparatus according to claim 3,
wherein the controller is configured to control operations of the first to fourth forging die assemblies and the transfer mechanism and to cause the fourth pin and the fifth punch to clamp the blank in the fourth processing space so as to form the blank in the fourth processing space into the first blank, and
wherein the transfer mechanism is configured to turn the first blank by 180 degrees about a turning axis parallel to the first cross-section and to transfer the first blank to the first forging die assembly as the blank.

5. A method of producing a self-piercing and clinch nut by a production apparatus, the self-piercing and clinch nut comprising a main body comprising a central portion and flanges on both sides of the central portion, and a pilot portion protruding from the central portion, the main body and the pilot portion having a through hole in a center of the main body and the pilot portion, the main body having a rectangular external shape in a direction perpendicular to a penetration direction of the through hole, the external shape of the main body having approximately a same area in each portion of the main body, the pilot portion having a rectangular external shape in the direction perpendicular to the penetration direction, the external shape of the pilot portion having an area that increases as a distance from the main body increases, the production apparatus comprising:
a first forging die assembly comprising:
a first die comprising a first insertion hole comprising:
a first movement hole in which a first punch is movable, the first movement hole comprising a rectangular first region in a direction perpendicular to a movement direction of the first punch defined as a first movement direction, the first region comprising approximately a same area in each portion of the first movement hole; and
a first fitting hole in which a first pin is fitted, the first fitting hole comprising a rectangular second region in the direction perpendicular to the first movement direction, the second region comprising approximately a same area in each portion of the first fitting hole, the area of the first region being larger than the area of the second region at a position where the first movement hole is connected to the first fitting hole;
the first pin fitted in the first insertion hole so as to define a first processing space for processing a blank, the first pin comprising:
a first pin shank; and
a first platform on one end of the first pin shank, the first pin being fitted in the first fitting hole to make the first platform opposed to the blank, an inner surface of the first die that faces the first fitting hole and first inclined walls on both sides of the first platform defining first processing grooves; and
the first punch movable relative to the first processing space;
a second forging die assembly comprising:
a second die comprising a second insertion hole comprising:
a second movement hole in which a second punch is movable, the second movement hole comprising a rectangular third region in a direction perpendicular to a movement direction of the second punch defined as a second movement direction, the third cross-section having approximately a same area in each portion of the second movement hole; and
a second fitting hole in which a second pin is fitted, the second fitting hole comprising a rectangular fourth region in the direction perpendicular to the second movement direction, the fourth cross-section comprising approximately a same area in each portion of the second fitting hole, the area of the third cross-section being larger than the area of the fourth cross-section at a position where the second movement hole is connected to the second fitting hole;
the second pin fitted in the second insertion hole so as to define a second processing space for processing the blank, the second pin comprising:
a second pin shank;
a second platform on one end of the second pin shank; and
a first protrusion protruding from the second platform, the second pin being fitted in the second fitting hole to make the first protrusion and the second platform opposed to the blank;
a first support supporting the second pin;
a first biasing portion comprising one end secured to the second die and another end secured to the first support; and
the second punch movable relative to the second processing space, the second punch comprising:
a second punch shank; and
a second protrusion protruding from one end of the second punch shank, the second punch being movable in the second movement hole to make the second protrusion opposed to the blank, an inner surface of the second die that faces the second fitting hole and second inclined walls on both sides of the second platform defining second processing grooves; and
a third forging die assembly comprising:
a third die comprising a third insertion hole comprising:
a third movement hole in which a third punch is movable, the third movement hole comprising a rectangular fifth region in a direction perpendicular to a movement direction of the third punch defined as a third movement direction, the fifth cross-section comprising approximately a same area in each portion of the third movement hole; and
a third fitting hole in which a fourth punch is fitted, the third fitting hole comprising a rectangular sixth region in the direction perpendicular to the third movement direction, the sixth cross-section comprising approximately a same area in each portion of the third fitting hole, the area of the fifth cross-section being larger than the area of the sixth cross-section at a position where the third movement hole is connected to the third fitting hole;
the fourth punch fitted in the third insertion hole so as to define a third processing space for processing the blank; and
the third punch comprising a hollow cylindrical portion and movable relative to the third processing space,
the method comprising:
clamping the blank in the first processing space by the first pin and the first punch so as to preliminarily form the pilot portion from part of the blank that is pressed from the first movement hole side to the first fitting hole side, to form ribs on one end of the pilot portion, which has been preliminarily formed, from part of the blank that is pressed into the first processing grooves, and to form the flanges from part of the blank that is pressed along an inner surface of the first die that faces the first movement hole;
disposing the blank, which has undergone the first clamping step, in the second processing space;
after performing the first disposing step, clamping the blank by the second pin and the second punch and moving the second die relative to the second pin in the second movement direction so as to press the ribs, which have been formed in the first clamping step, into the second processing grooves, and to form depressions on the second pin side of the pilot portion and on the second punch side of the main body, the depressions being to be part of the through hole;

disposing the blank, which has undergone the second clamping step, in the third processing space; and after performing the second disposing step, clamping the blank by the fourth punch and the third punch so as to form the through hole in the blank and to cause an inner surface of the third die that faces the third fitting hole, and a terrace surface of the fourth punch side to press the pilot portion and the ribs so as to flatten an end surface of the pilot portion on the terrace surface side and to incline outer surfaces of the pilot portion along the ribs relative to the penetration direction.

6. The method according to claim 5, wherein the production apparatus further comprises a fourth forging die assembly comprising:
 a fourth die comprising a fourth insertion hole comprising:
  a fourth movement hole in which a fifth punch is movable, the fourth movement hole comprising a rectangular internal shape in a direction perpendicular to a movement direction of the fifth punch defined as a fourth movement direction, the internal shape of the fourth movement hole comprising approximately a same area in each portion of the fourth movement hole;
  a fourth fitting hole in which a fourth pin is fitted; and
  a tapered hole interposed between the fourth movement hole and the fourth fitting hole, the tapered hole comprising a rectangular internal shape in the direction perpendicular to the fourth movement direction, the internal shape of the tapered hole comprising an area that decreases from the fourth movement hole side to the fourth fitting hole side;
 the fourth pin fitted in the fourth insertion hole so as to define a fourth processing space for processing the blank; and
 the fifth punch movable relative to the fourth processing space, the method further comprising:

clamping the blank of a rectangular parallelepiped or cubic shape by the fourth pin and the fifth punch so as to form the blank into a first blank comprising a base and a mountain-shaped portion connected to the base, the base comprising a first cross-section of a rectangular shape in a direction perpendicular to the penetration direction, the first cross-section having approximately a same area in each portion of the base, the mountain-shaped portion comprising a second cross-section of a rectangular shape in the direction perpendicular to the penetration direction, the second cross-section having an area that decreases as a distance from the base increases;

turning the first blank, which has undergone the fourth clamping step, by 180 degrees about a turning axis parallel to the first cross-section; and disposing the first blank, which has undergone the turning step, in the first processing space as the blank.

7. An apparatus to produce a self-piercing and clinch nut comprising a main body comprising a central portion and flanges on both sides of the central portion, and a pilot portion protruding from the central portion, the main body and the pilot portion having a through hole in a center of the main body and the pilot portion, the main body having a rectangular external shape in a direction perpendicular to a penetration direction of the through hole, the external shape of the main body having approximately a same area in each portion of the main body, the pilot portion having a rectangular external shape in the direction perpendicular to the penetration direction, the external shape of the pilot portion having an area that increases as a distance from the main body increases, two groove rows being formed in a first outer surface among outer surfaces of the main body that intersects the through hole, the two groove rows extending in an extending direction along borderlines between the flanges and the central portion, the apparatus comprising:

a first forging die assembly configured to subject a blank to first processing, the first forging die assembly comprising:
 a first die comprising a first insertion hole comprising:
  a first movement hole in which a first punch is movable, the first movement hole comprising a rectangular first region in a direction perpendicular to a movement direction of the first punch defined as a first movement direction, the first region comprising approximately a same area in each portion of the first movement hole; and
  a first fitting hole in which a first pin is fitted, the first fitting hole comprising a rectangular second region in the direction perpendicular to the first movement direction, the second region comprising approximately a same area in each portion of the first fitting hole, the area of the first region being larger than the area of the second region at a position where the first movement hole is connected to the first fitting hole;
 the first pin fitted in the first insertion hole so as to define a first processing space for processing the blank, the first pin comprising:
  a first pin shank; and
  a first platform on one end of the first pin shank, the first pin being fitted in the first fitting hole to make the first platform opposed to the blank, an inner surface of the first die that faces the first fitting hole and first inclined walls on both sides of the first platform defining first processing grooves;
 the first punch movable relative to the first processing space and comprising:
  a first punch shank; and
  two protrusion rows on one end of the first punch shank,
  the protrusion rows being opposed to the corresponding first processing grooves across the first processing space;

a second forging die assembly adjacent to the first forging die assembly and configured to subject the blank, which has undergone the first processing in the first forging die assembly, to second processing, the second forging die assembly comprising:
 a second die comprising a second insertion hole comprising:
  a second movement hole in which a second punch is movable, the second movement hole comprising a rectangular third region in a direction perpendicular to a movement direction of the second punch defined as a second movement direction, the third cross-section having approximately a same area in each portion of the second movement hole; and a second fitting hole in which a second pin is fitted, the second fitting hole comprising a rectangular fourth region in the direction perpendicular to the second movement direction, the fourth cross-section comprising approximately a same area in each portion of the second fitting hole, the area of the third cross-section being larger than the area of the fourth cross-section at a position where the second movement hole is connected to the second fitting hole;

the second pin fitted in the second insertion hole so as to define a second processing space for processing the blank, the second pin comprising:
a second pin shank;
a second platform on one end of the second pin shank; and
a first protrusion protruding from the second platform, the second pin being fitted in the second fitting hole to make the first protrusion and the second platform opposed to the blank;
a first support supporting the second pin;
a first biasing portion comprising one end secured to the second die and another end secured to the first support; and
the second punch movable relative to the second processing space, the second punch comprising:
a second punch shank; and
a second protrusion protruding from one end of the second punch shank, the second punch being movable in the second movement hole to make the second protrusion opposed to the blank, an inner surface of the second die that faces the second fitting hole and second inclined walls on both sides of the second platform defining second processing grooves;

a third forging die assembly adjacent to the second forging die assembly and configured to subject the blank, which has undergone the second processing in the second forging die assembly, to third processing, the third forging die assembly comprising:
a third die comprising a third insertion hole comprising:
a third movement hole in which a third punch is movable, the third movement hole comprising a rectangular fifth region in a direction perpendicular to a movement direction of the third punch defined as a third movement direction, the fifth cross-section comprising approximately a same area in each portion of the third movement hole; and
a third fitting hole in which a fourth punch is fitted, the third fitting hole comprising a rectangular sixth region in the direction perpendicular to the third movement direction, the sixth cross-section comprising approximately a same area in each portion of the third fitting hole, the area of the fifth cross-section being larger than the area of the sixth cross-section at a position where the third movement hole is connected to the third fitting hole;
the fourth punch fitted in the third insertion hole so as to define a third processing space for processing the blank; and
the third punch comprising a hollow cylindrical portion and movable relative to the third processing space;
a transfer mechanism configured to transfer the blank between two adjacent forging die assemblies among the first to third forging die assemblies; and a controller configured to control operations of the first to third forging die assemblies and the transfer mechanism.

8. The apparatus according to claim 7,
wherein the controller is configured to cause the first pin and the first punch to clamp the blank in the first processing space so as to cause the two protrusion rows on the first punch to press the blank to form the two groove rows in the first outer surface of the main body, to preliminarily form the pilot portion from part of the blank that is pressed from the first movement hole side to the first fitting hole side, to form ribs on one end of the pilot portion, which has been preliminarily formed, from part of the blank that is pressed into the first processing grooves, and to form the flanges from part of the blank that is pressed along an inner surface of the first die that faces the first movement hole,
wherein the controller is configured to cause the second pin and the second punch to clamp the blank in the second processing space and move the second die relative to the second pin in the second movement direction so as to press the ribs, which have been formed in the first processing, into the second processing grooves, and to form depressions on the second pin side of the pilot portion and on the second punch side of the main body, the depressions being to be part of the through hole, and
wherein the controller is configured to cause the fourth punch and the third punch to clamp the blank in the third processing space so as to form the through hole in the blank and to cause an inner surface of the third die that faces the third fitting hole, and a terrace surface of the fourth punch side to press the pilot portion and the ribs so as to flatten an end surface of the pilot portion on the terrace surface side and to incline outer surfaces of the pilot portion along the ribs relative to the penetration direction.

9. The apparatus according to claim 8, further comprising a fourth forging die assembly adjacent to the first forging die assembly and configured to form the blank having a rectangular parallelepiped or cubic shape into a first blank comprising a base and a mountain-shaped portion connected to the base, the base comprising a first cross-section of a rectangular shape in a direction perpendicular to the penetration direction, the first cross-section having approximately a same area in each portion of the base, the mountain-shaped portion comprising a second cross-section of a rectangular shape in the direction perpendicular to the penetration direction, the second cross-section having an area that decreases as a distance from the base increases,
the fourth forging die assembly comprising:
a fourth die comprising a fourth insertion hole comprising:
a fourth movement hole in which a fifth punch is movable, the fourth movement hole comprising a rectangular internal shape in a direction perpendicular to a movement direction of the fifth punch defined as a fourth movement direction, the internal shape of the fourth movement hole comprising approximately a same area in each portion of the fourth movement hole;
a fourth fitting hole in which a fourth pin is fitted; and
a tapered hole interposed between the fourth movement hole and the fourth fitting hole, the tapered hole comprising a rectangular internal shape in the direction perpendicular to the fourth movement direction, the internal shape of the tapered hole comprising an area that decreases from the fourth movement hole side to the fourth fitting hole side;

the fourth pin fitted in the fourth insertion hole so as to define a fourth processing space for processing the blank; and the fifth punch movable relative to the fourth processing space, wherein the transfer mechanism is configured to transfer the blank between two adjacent forging die assemblies among the first to fourth forging die assemblies.

10. The apparatus according to claim 9, wherein the controller is configured to control operations of the first to fourth forging die assemblies and the transfer mechanism and to cause the fourth pin and the fifth punch to clamp the blank in the fourth processing space so as to form the blank in the fourth processing space into the first blank, and wherein the transfer mechanism is configured to turn the first blank by 180 degrees about a turning axis parallel to the first cross-section and to transfer the first blank to the first forging die assembly as the blank.

11. A method of producing a self-piercing and clinch nut by a production apparatus, the self-piercing and clinch nut comprising a main body comprising a central portion and flanges on both sides of the central portion, and a pilot portion protruding from the central portion, the main body and the pilot portion having a through hole in a center of the main body and the pilot portion, the main body having a rectangular external shape in a direction perpendicular to a penetration direction of the through hole, the external shape of the main body having approximately a same area in each portion of the main body, the pilot portion having a rectangular external shape in the direction perpendicular to the penetration direction, the external shape of the pilot portion having an area that increases as a distance from the main body increases, two groove rows being formed in a first outer surface among outer surfaces of the main body that intersects the through hole, the two groove rows extending in an extending direction along borderlines between the flanges and the central portion, the production apparatus comprising:

a first forging die assembly comprising:
a first die comprising a first insertion hole comprising:
a first movement hole in which a first punch is movable, the first movement hole comprising a rectangular first region in a direction perpendicular to a movement direction of the first punch defined as a first movement direction, the first region comprising approximately a same area in each portion of the first movement hole; and
a first fitting hole in which a first pin is fitted, the first fitting hole comprising a rectangular second region in the direction perpendicular to the first movement direction, the second region comprising approximately a same area in each portion of the first fitting hole, the area of the first region being larger than the area of the second region at a position where the first movement hole is connected to the first fitting hole;

the first pin fitted in the first insertion hole so as to define a first processing space for processing a blank, the first pin comprising:
a first pin shank; and
a first platform on one end of the first pin shank, the first pin being fitted in the first fitting hole to make the first platform opposed to the blank, an inner surface of the first die that faces the first fitting hole and first inclined walls on both sides of the first platform defining first processing grooves;

the first punch movable relative to the first processing space and comprising:
a first punch shank; and
two protrusion rows on one end of the first punch shank, the protrusion rows being opposed to the corresponding first processing grooves across the first processing space;

a second forging die assembly comprising:
a second die comprising a second insertion hole comprising:
a second movement hole in which a second punch is movable, the second movement hole comprising a rectangular third region in a direction perpendicular to a movement direction of the second punch defined as a second movement direction, the third cross-section having approximately a same area in each portion of the second movement hole; and
a second fitting hole in which a second pin is fitted, the second fitting hole comprising a rectangular fourth region in the direction perpendicular to the second movement direction, the fourth cross-section comprising approximately a same area in each portion of the second fitting hole, the area of the third cross-section being larger than the area of the fourth cross-section at a position where the second movement hole is connected to the second fitting hole;

the second pin fitted in the second insertion hole so as to define a second processing space for processing the blank, the second pin comprising:
a second pin shank;
a second platform on one end of the second pin shank; and
a first protrusion protruding from the second platform, the second pin being fitted in the second fitting hole to make the first protrusion and the second platform opposed to the blank;

a first support supporting the second pin;

a first biasing portion comprising one end secured to the second die and another end secured to the first support; and the second punch movable relative to the second processing space, the second punch comprising:
a second punch shank; and
a second protrusion protruding from one end of the second punch shank, the second punch being movable in the second movement hole to make the second protrusion opposed to the blank, an inner surface of the second die that faces the second fitting hole and second inclined walls on both sides of the second platform defining second processing grooves; and a third forging die assembly comprising:
a third die comprising a third insertion hole comprising:
a third movement hole in which a third punch is movable, the third movement hole comprising a rectangular fifth region in a direction perpendicular to a movement direction of the third punch defined as a third movement direction, the fifth cross-section comprising approximately a same area in each portion of the third movement hole; and
a third fitting hole in which a fourth punch is fitted, the third fitting hole comprising a rectangular sixth region in the direction perpendicular to the third movement direction, the sixth cross-section comprising approximately a same area in each portion of the third fitting hole, the area of the fifth cross-section being larger than the area of the sixth cross-section at a position where the third movement hole is connected to the third fitting hole;

the fourth punch fitted in the third insertion hole so as to define a third processing space for processing the blank; and the third punch comprising a hollow cylindrical portion and movable relative to the third processing space, the method comprising:

clamping the blank in the first processing space by the first pin and the first punch so as to cause the two protrusion rows on the first punch to press the blank to form the two groove rows in the first outer surface of the main body, to preliminarily form the pilot portion from part of the blank that is pressed from the first movement hole side to the first fitting hole side, to form ribs on one end of the pilot portion, which has been preliminarily formed, from part of the blank that is pressed into the first processing grooves, and to form the flanges from part of the blank that is pressed along an inner surface of the first die that faces the first movement hole;

disposing the blank, which has undergone the first clamping step, in the second processing space;

after performing the first disposing step, clamping the blank by the second pin and the second punch and moving the second die relative to the second pin in the second movement direction so as to press the ribs, which have been formed in the first clamping step, into the second processing grooves, and to form depressions on the second pin side of the pilot portion and on the second punch side of the main body, the depressions being to be part of the through hole;

disposing the blank, which has undergone the second clamping step, in the third processing space; and after performing the second disposing step, clamping the blank by the fourth punch and the third punch so as to form the through hole in the blank and to cause an inner surface of the third die that faces the third fitting hole, and a terrace surface of the fourth punch side to press the pilot portion and the ribs so as to flatten an end surface of the pilot portion on the terrace surface side and to incline outer surfaces of the pilot portion along the ribs relative to the penetration direction.

12. The method according to claim 11, wherein the production apparatus further comprises a fourth forging die assembly comprising:

a fourth die comprising a fourth insertion hole comprising:

a fourth movement hole in which a fifth punch is movable, the fourth movement hole comprising a rectangular internal shape in a direction perpendicular to a movement direction of the fifth punch defined as a fourth movement direction, the internal shape of the fourth movement hole comprising approximately a same area in each portion of the fourth movement hole;

a fourth fitting hole in which a fourth pin is fitted; and a tapered hole interposed between the fourth movement hole and the fourth fitting hole, the tapered hole comprising a rectangular internal shape in the direction perpendicular to the fourth movement direction, the internal shape of the tapered hole comprising an area that decreases from the fourth movement hole side to the fourth fitting hole side;

the fourth pin fitted in the fourth insertion hole so as to define a fourth processing space for processing the blank; and the fifth punch movable relative to the fourth processing space, the method further comprising:

clamping the blank of a rectangular parallelepiped or cubic shape by the fourth pin and the fifth punch so as to form the blank into a first blank comprising a base and a mountain-shaped portion connected to the base, the base comprising a first cross-section of a rectangular shape in a direction perpendicular to the penetration direction, the first cross-section having approximately a same area in each portion of the base, the mountain-shaped portion comprising a second cross-section of a rectangular shape in the direction perpendicular to the penetration direction, the second cross-section having an area that decreases as a distance from the base increases;

turning the first blank, which has undergone the fourth clamping step, by 180 degrees about a turning axis parallel to the first cross-section; and disposing the first blank, which has undergone the turning step, in the first processing space as the blank.

* * * * *